(12) United States Patent
Fennell

(10) Patent No.: US 8,615,854 B2
(45) Date of Patent: *Dec. 31, 2013

(54) FIXTURING APPARATUS

(76) Inventor: Michael P. Fennell, San Anselmo, CA (US)

( * ) Notice: Subject to any disclaimer, the term of this patent is extended or adjusted under 35 U.S.C. 154(b) by 212 days.

This patent is subject to a terminal disclaimer.

(21) Appl. No.: 12/741,821

(22) PCT Filed: Nov. 6, 2008

(86) PCT No.: PCT/US2008/082685
§ 371 (c)(1),
(2), (4) Date: Sep. 13, 2010

(87) PCT Pub. No.: WO2009/061957
PCT Pub. Date: May 14, 2009

(65) Prior Publication Data
US 2010/0325847 A1    Dec. 30, 2010

Related U.S. Application Data

(60) Provisional application No. 60/985,881, filed on Nov. 6, 2007.

(51) Int. Cl.
*A44B 99/00* (2010.01)
(52) U.S. Cl.
USPC ............. 24/449; 24/452; 24/445; 24/442; 24/305; 24/16 R; 24/16 PB
(58) Field of Classification Search
USPC ..... 24/449, 16 R, 16 PB, 305, 442, 452, 451, 24/445
See application file for complete search history.

(56) References Cited

U.S. PATENT DOCUMENTS

| | | | |
|---|---|---|---|
| 2,977,145 | A | 3/1961 | Rifkin |
| 3,214,816 | A | 11/1965 | Mathison |
| 3,247,848 | A | 4/1966 | Mathison |
| 3,261,069 | A | 7/1966 | Mathison |
| 3,581,347 | A | 6/1971 | Verspieren |
| 3,900,923 | A | 8/1975 | Thomas |

(Continued)

FOREIGN PATENT DOCUMENTS

| | | |
|---|---|---|
| CH | 682450 | 9/1993 |
| JP | 2001521771 A | 11/2001 |
| JP | 2002529123 A | 9/2002 |
| WO | WO2009061957 | 5/2009 |

OTHER PUBLICATIONS

Supplementary European Search Report dated Feb. 24, 2012.

(Continued)

*Primary Examiner* — Robert J Sandy
*Assistant Examiner* — Michael Lee
(74) *Attorney, Agent, or Firm* — Dale F. Regelman; Quarles & Brady LLP

(57) ABSTRACT

A fixturing apparatus (100), including a first fixturing surface (230), and a plurality of locking teeth (210) attached to and extending outwardly from that fixturing surface, wherein each locking tooth includes a parallelepiped comprising a rectangular base (310), a first rectangular side (320) attached to a first end of that rectangular base and extending outwardly therefrom, and a second rectangular side (330) attached to an opposing end of the rectangular base and extending outwardly therefrom, wherein a first rectangular side distal end (324) is attached to a second rectangular side distal end 336.

15 Claims, 71 Drawing Sheets

(56) References Cited

U.S. PATENT DOCUMENTS

| | | | |
|---|---|---|---|
| 3,931,838 A | | 1/1976 | Bakermans |
| 4,008,512 A | | 2/1977 | Prodel |
| 4,154,418 A | | 5/1979 | Wiese |
| 4,393,548 A | | 7/1983 | Herb |
| 4,680,838 A | * | 7/1987 | Astl ............................. 24/442 |
| 4,882,813 A | | 11/1989 | Nakamura |
| 5,419,744 A | * | 5/1995 | Kagebeck .................... 474/253 |
| 5,755,016 A | | 5/1998 | Provost |
| 5,887,320 A | | 3/1999 | Provost |
| 6,478,784 B1 | * | 11/2002 | Johnson et al. .......... 604/385.01 |
| 6,668,429 B2 | * | 12/2003 | Fujisawa et al. ................ 24/303 |
| 7,263,745 B2 | | 9/2007 | Mori |
| 7,444,722 B2 | | 11/2008 | McDaniel et al. |
| 7,478,460 B2 | * | 1/2009 | Gallant et al. .................. 24/452 |
| 2003/0182771 A1 | | 10/2003 | Leach et al. |
| 2005/0241119 A1 | | 11/2005 | Efremova et al. |
| 2007/0054538 A1 | | 3/2007 | Smith et al. |

OTHER PUBLICATIONS

PCT/US08182685—International Search Report and Written Opinion dated Jan. 6, 2009.
PCT/US08/82685—International Preliminary Report on Patentability dated May 11, 2010.
International Search Report and Written Opinion dated Apr. 25, 2012.
European Application No. 088471032—European Office Action dated Nov. 8, 2012.
Japanese Application No. 2010-533248—Japanese Office Action dated Feb. 19, 2013.

* cited by examiner

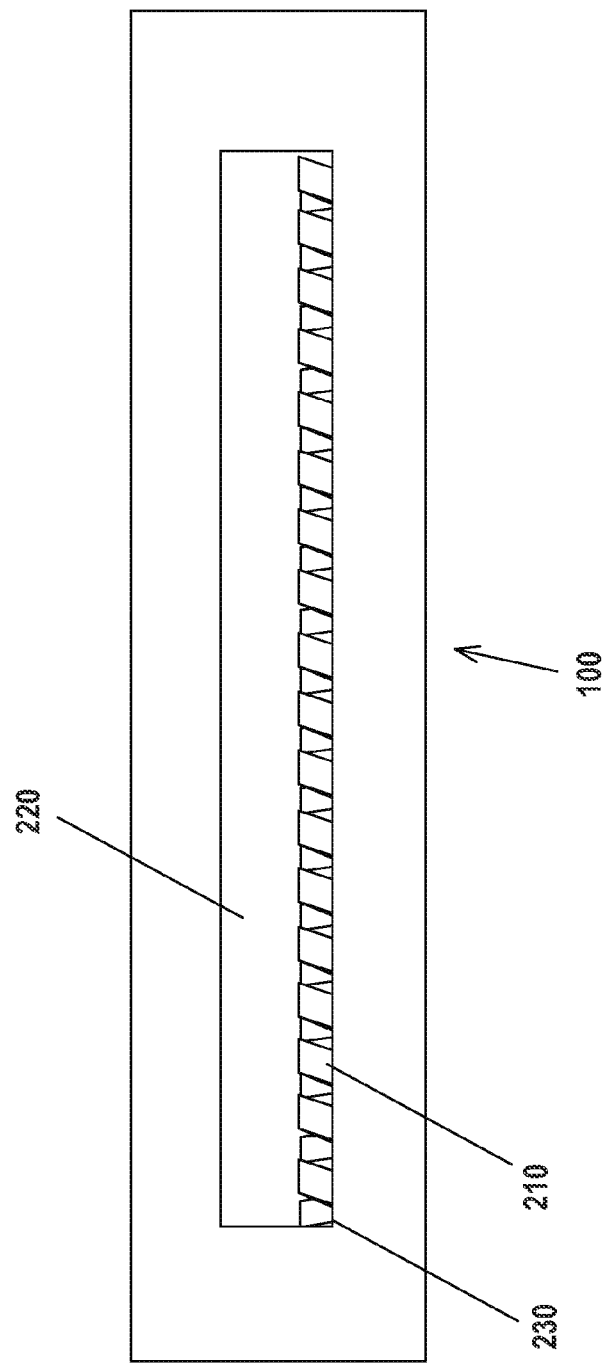

304

306

1000

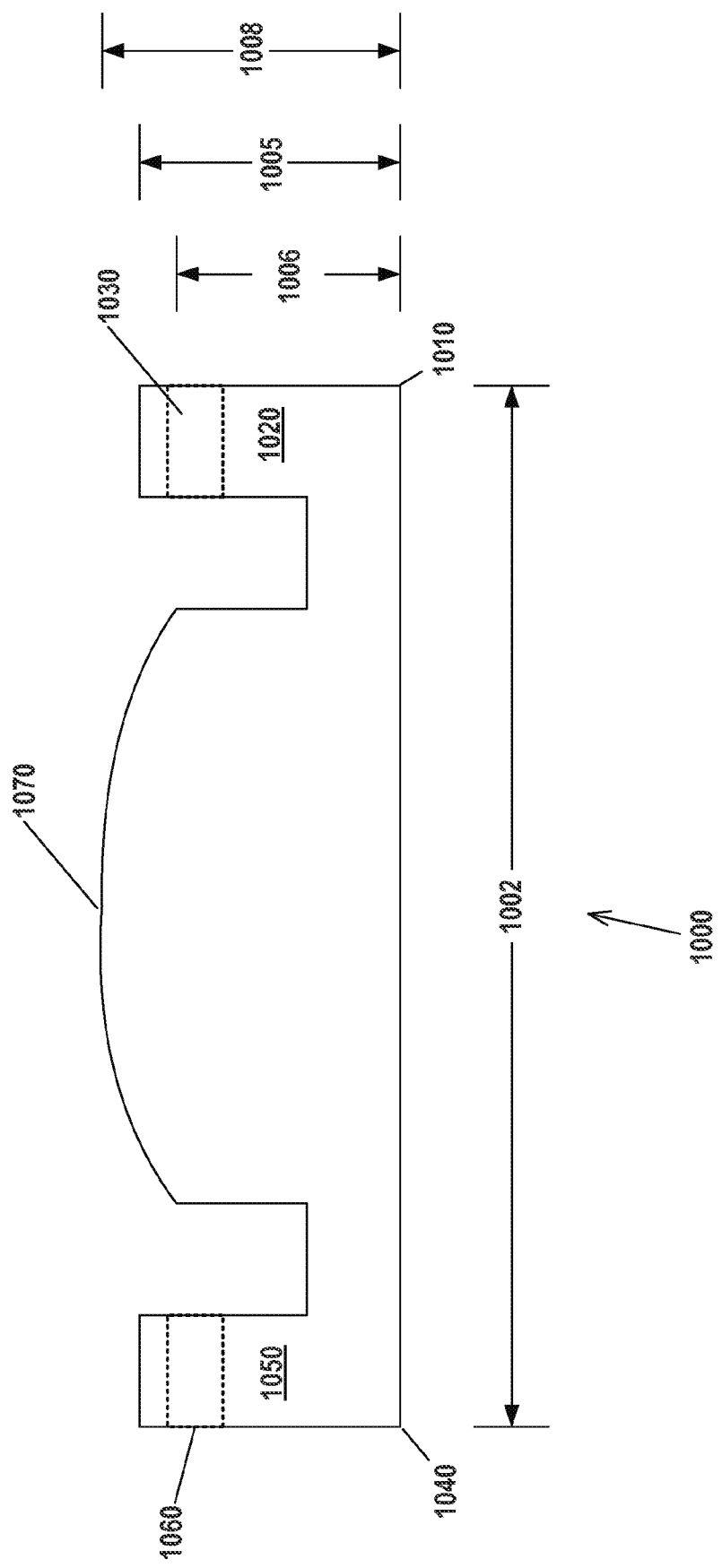

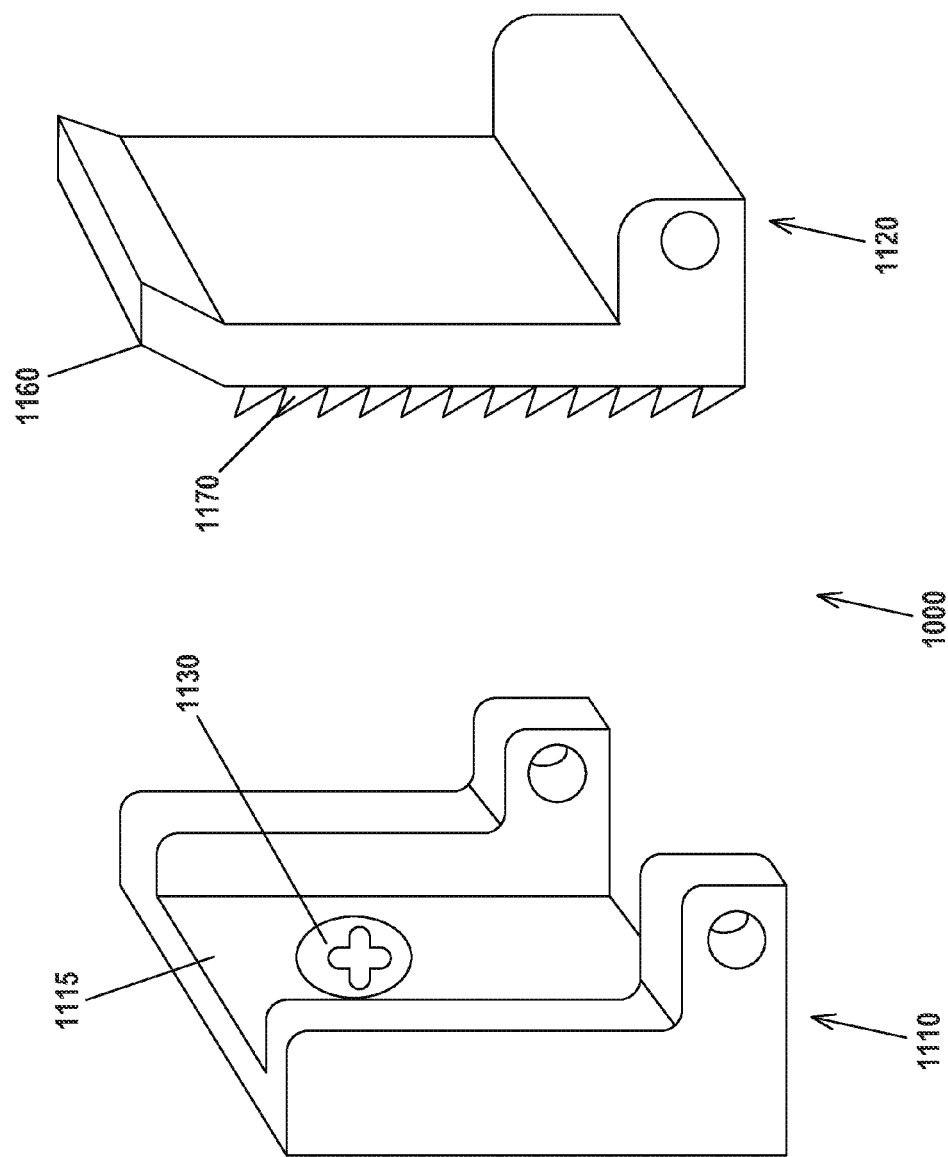

1400

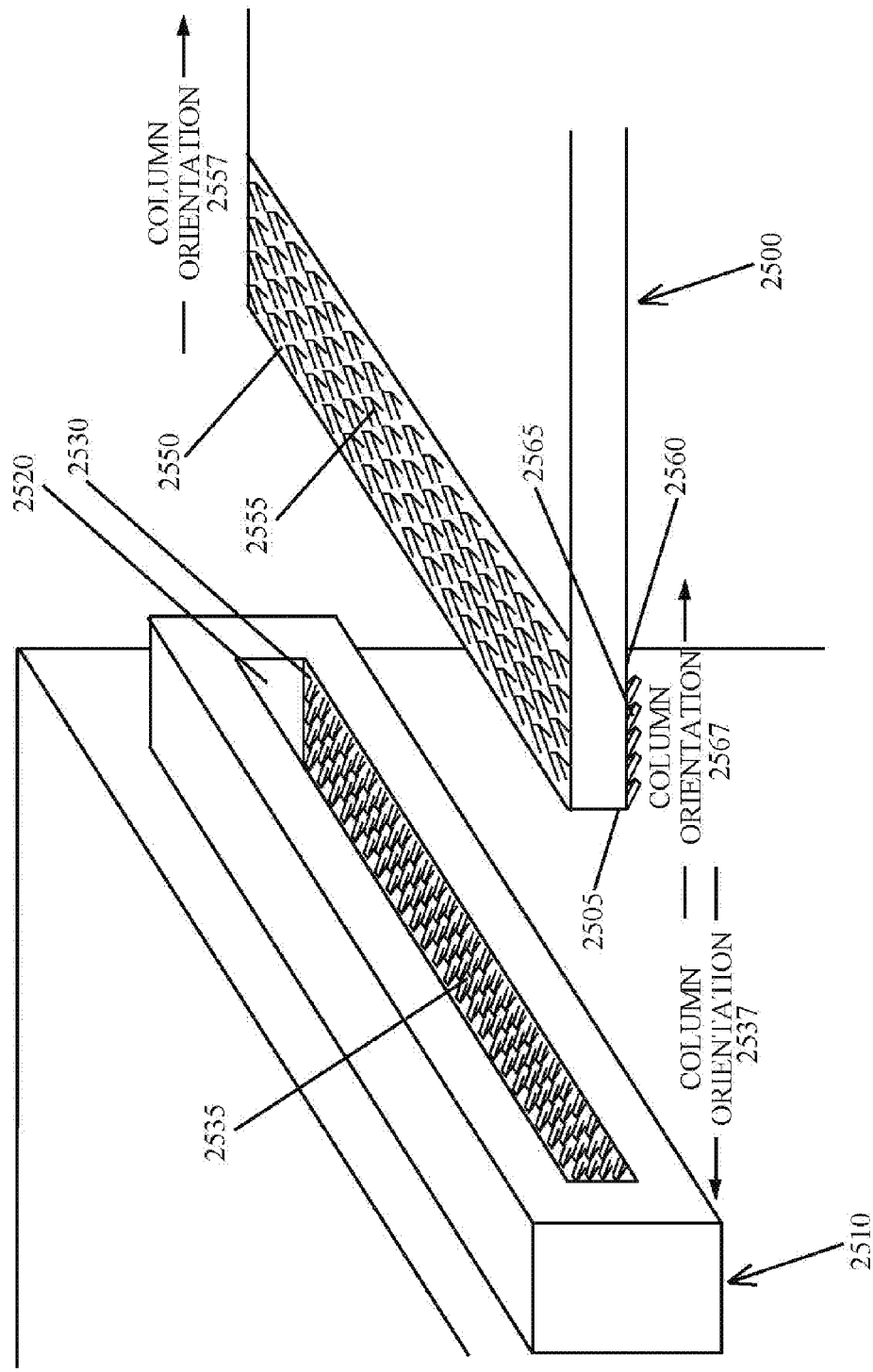

FIXTURING APPARATUS

CROSS REFERENCE TO RELATED APPLICATIONS

This Application claims priority from a U.S. Provisional Application having Ser. No. 60/985,881 filed Nov. 6, 2007.

FIELD OF THE INVENTION

This invention relates to a fixturing apparatus. In certain embodiments, the invention relates to a fixturing apparatus for cables.

BACKGROUND OF THE INVENTION

It is known in the art to releaseably attached a first surface to a second surface by disposing a plurality of loop-type fasteners on one of the surfaces and a plurality of hook-type fasteners on the other surface. When mated, the plurality of hook-type fasteners engage with the plurality of loop-type fasteners to releaseably secure the first surface to the second surface.

BRIEF DESCRIPTION OF THE DRAWINGS

The invention will be better understood from a reading of the following detailed description taken in conjunction with the drawings in which like reference designators are used to designate like elements, and in which:

FIG. 2A is a front view of the fixturing apparatus of FIG. 1;

FIG. 10C is a side view of the fixturing apparatus of FIGS. 10A and 10B;

FIG. 11A is a perspective view showing the elements of Applicant's fixturing apparatus 1100;

FIG. 25A shows a member comprising a first plurality of locking teeth having a first column orientation disposed on surface at a first end and a second plurality of locking teeth having the same first column orientation disposed on an opposing second surface at the first end being inserted into a fixturing assembly formed to include a fixturing slot, wherein a third plurality of locking teeth having a second column orientation are disposed on a first wall defining the fixturing slot and a fourth plurality of locking teeth disposed on an opposing second wall defining said fixturing slot;

DETAILED DESCRIPTION OF THE PREFERRED EMBODIMENTS

The invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1A:
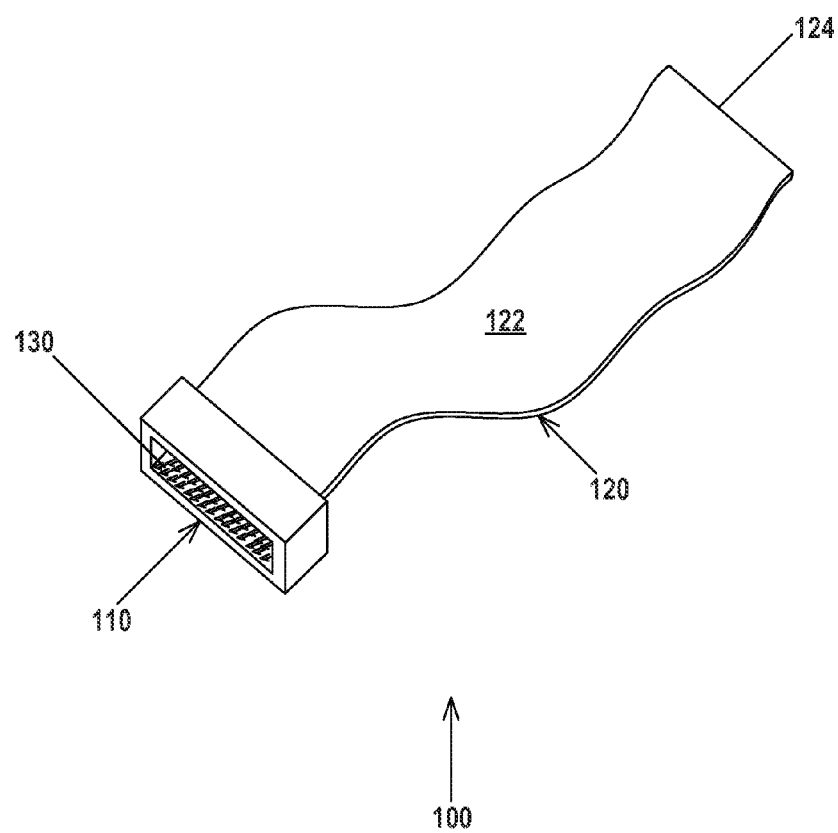
FIG. 1A is a first perspective view of Applicant's fixturing apparatus 100.

Referring now to FIGS. 1A, Applicant's fixturing apparatus 100 comprises locking assembly 110 and flexible strap 120. In certain embodiments, flexible strap 120 comprises a fabric. By "fabric," Applicant means a flexible, planar material formed by weaving or felting or knitting or crocheting natural and/or synthetic fibers. In certain embodiments, strap 120 comprises a nylon fabric. In certain embodiments, strap 120 comprises a cotton or polyester fabric.

Figure 1B:
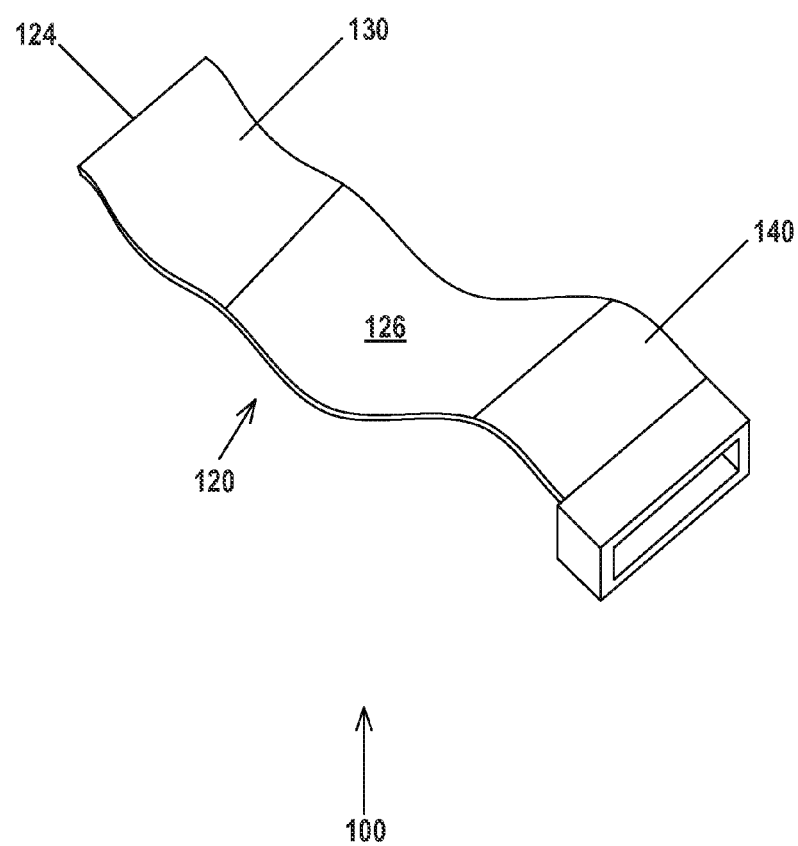
FIG. 1B is a second perspective view of the fixturing apparatus of FIG. 1.

Referring now to FIGS. 1A and 1B, flexible strap comprises first surface 122, distal end 124, and opposing second surface 126. In the illustrated embodiment of FIG. 1B, flexible strap 120 further comprises a plurality of hook-type fasteners 130 disposed on surface 126 adjacent distal end 124, and a plurality of loop-type fasteners 140 disposed on the opposite end of flexible strap 120.

Figure 2B:
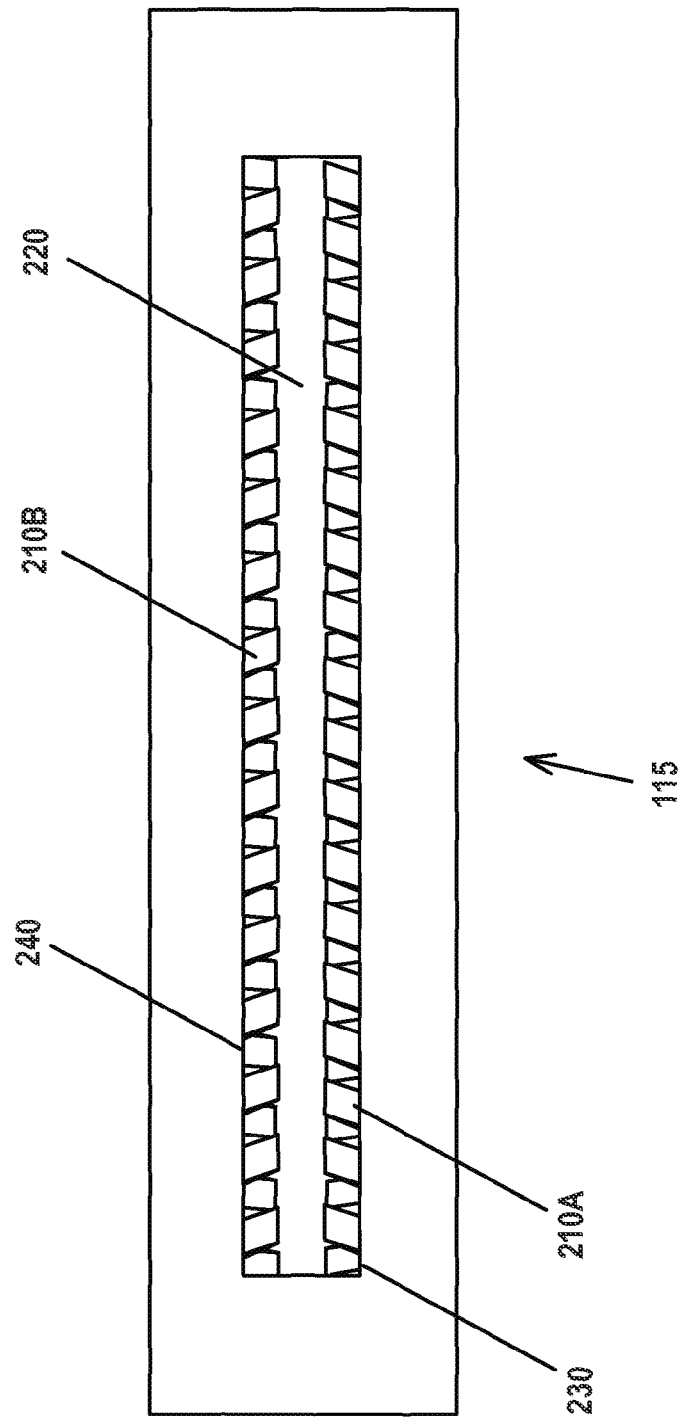
FIG. 2B is a front view of Applicant's fixturing apparatus 115.

Referring now to FIG. 2A, locking assembly 110 is formed to include an aperture 220 extending therethrough. Fixturing surface 230 comprises a portion of the wall defining aperture 220. In the illustrated embodiment of FIG. 2A, a first plurality of locking teeth 210 are disposed on fixturing surface 230 of aperture 220, and extend inwardly therefrom. Referring now to FIG. 2B, Applicant's locking assembly 115 comprises a first plurality of locking teeth 210A disposed on fixturing surface 230, and second plurality of locking teeth 210B disposed on fixturing surface 240 of aperture 220, and extend inwardly therefrom, wherein fixturing surface 240 comprises a second portion of the wall defining aperture 220.

In certain embodiments, Applicant's plurality of locking teeth are formed from one or more metals. In certain embodiments, Applicant's plurality of locking teeth are formed from one or more ceramic materials. In certain embodiments, Applicant's plurality of locking teeth are formed from a polymeric material selected from a group consisting of nylon, polyamide, polyimide, polyamideimide, polyurethane, polyethylene, polypropylene, polycarbonate, polystyrene, and combinations thereof. In certain embodiments, locking assembly 110/115 is formed as an integral unit from a polymeric material selected from the group consisting of nylon, polyamide, polyimide, polyamideimide, polyurethane, polyethylene, polypropylene, polycarbonate, polystyrene, and combinations thereof.

Figure 2C:
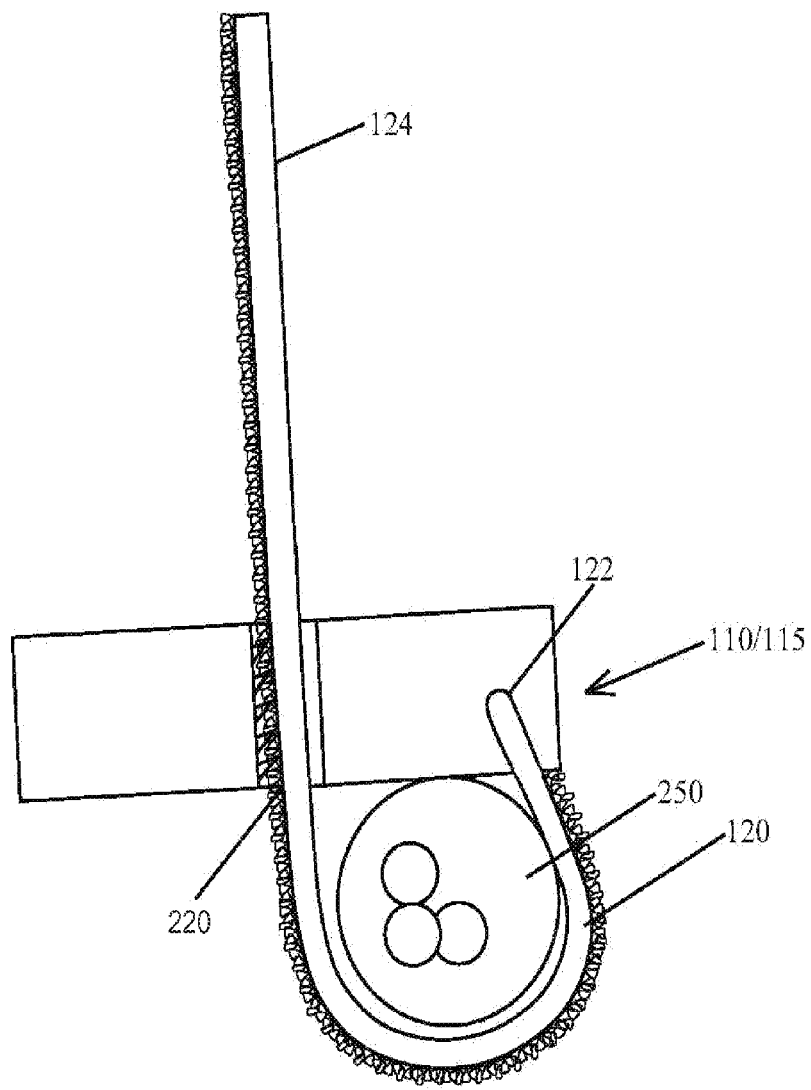
FIG. 2C is a side view of the fixturing apparatus of FIG. 1A/2B shown locked to a single cable.

In the illustrated embodiment of FIG. 2C, flexible strap 120 is shown encircling cable 250. Proximal end 122 of strap 124 is molded into assembly 110/115. Distal end 124 of strap 120 is inserted into and through aperture 220, and pulled outwardly from locking assembly 110/115 until strap 120 tightly encircles cable 250. Each of the plurality of locking teeth 210 physically engage the plurality of loop fasteners, thereby preventing strap 120 from moving backwardly through aperture 220.

Figure 2D:
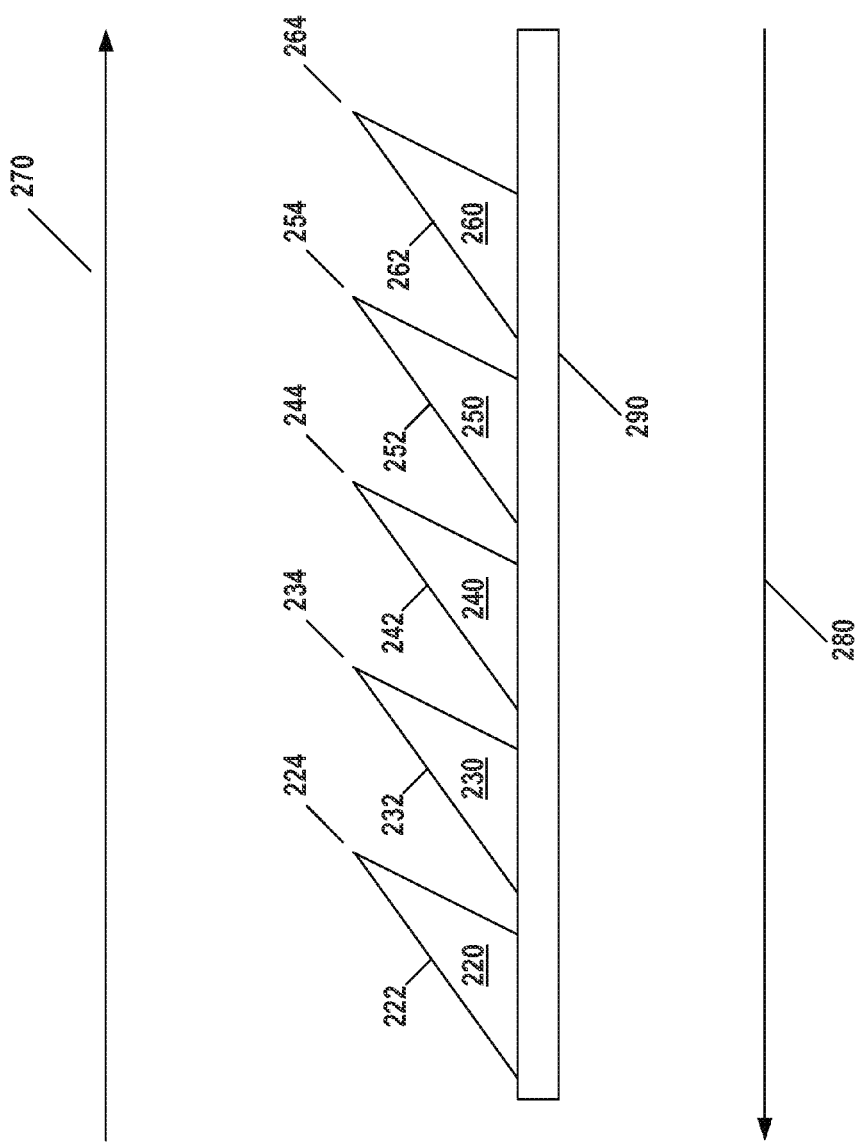
FIG. 2D is a side view of a plurality of Applicant's locking teeth.

FIG. 2D shows a plurality locking teeth comprising locking teeth 220, 230, 240, 250, and 260, disposed on fixturing surface 290. Locking tooth 220 comprises a sloping side portion 222, and a gripping portion 224. Similarly, locking teeth 230, 240, 250, and 260, comprise sloping side portions 232, 242, 252, and 262, respectively. Locking teeth 230, 240, 250, and 260, further comprise gripping portions 234, 244, 254, and 264, respectively.

A fabric material, such as for example and without limitation strap 120, will slide across locking teeth 220, 230, 240, 250, and 260 in the non-fixturing direction 270, wherein that fabric moves across the sloping side portion of a locking tooth before contacting the gripping portion of that locking tooth. A fabric material will not, however, slide across locking teeth 220, 230, 240, 250, and 260 in the opposite, or fixturing direction 280. Rather when a force is applied to the fabric along the fixturing direction 280, portions of the fabric will engage gripping portions 224, 234, 244, 254, and 264, thereby preventing movement of the fabric along the fixturing direction. In embodiments wherein the fabric material comprise a plurality of loop-type fasteners disposed on the surface in contact with Applicant's locking teeth, gripping portions 224, 234, 244, 254, and 264, engage those loop-type fasteners thereby preventing movement of the fabric in the fixturing direction. Applicant has found that fixturing is extremely strong when the strap is confined to an enclosed channel.

Figure 2E:
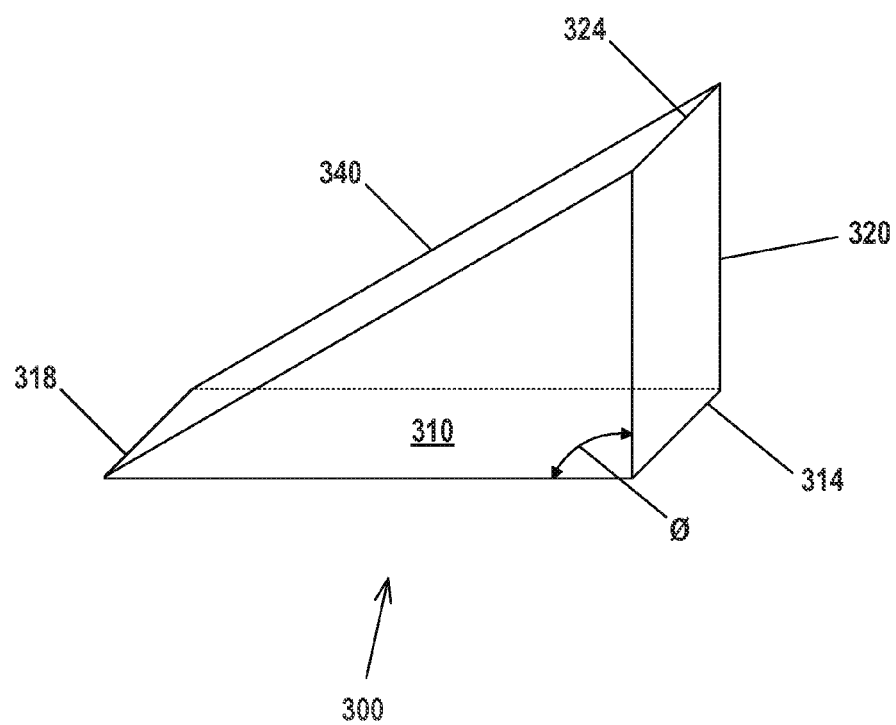
FIG. 2E shows a first embodiment of Applicant's locking tooth.
Figure 2F:
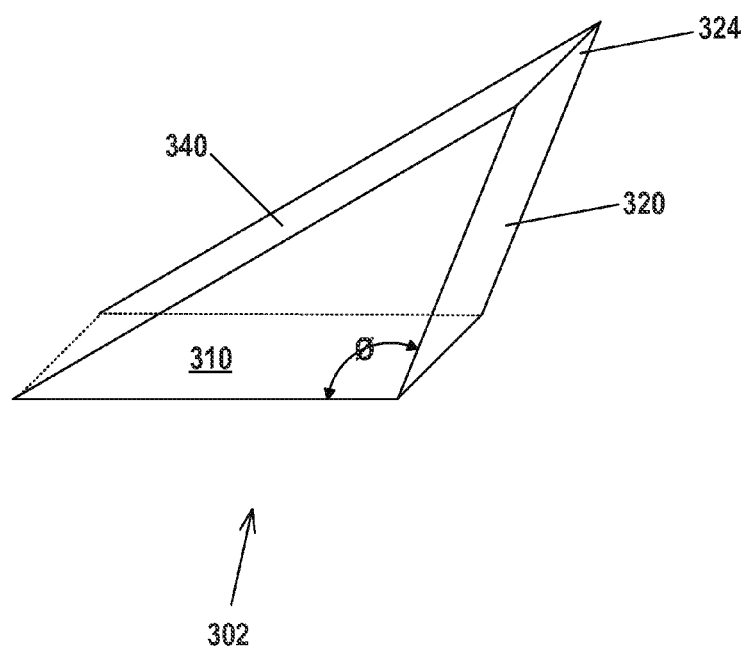
FIG. 2F shows a second embodiment of Applicant's locking tooth.

In certain embodiments, one or more of Applicant's locking teeth comprises a parallelepiped comprising a rectangular base, a first rectangular surface attached to a first end of said rectangular base and extending outwardly therefrom, and a second rectangular surface attached to an opposing end of said rectangular base and extending outwardly therefrom, wherein a first rectangular surface distal end is attached to a said second rectangular surface distal end to form a gripping edge. For example and referring now to FIG. 2E, in certain embodiments Applicant's fixturing apparatus comprises one or more looking teeth 300. Locking tooth 300 comprises a first embodiment of a five-sided, non-rectangular parallelepiped. Referring now to FIG. 2F, in certain embodiments Applicant's fixturing apparatus comprises one or more looking teeth 302. Locking tooth 302 comprises a second embodiment of a five-sided, non-rectangular parallelepiped.

Locking teeth 300 and 302 comprise a rectangular base 310, a first rectangular surface 320 attached to a first end 314 of rectangular base 310 and extending outwardly therefrom, a second rectangular surface 340 attached to a second end 318 of rectangular base 310 and extending outwardly therefrom, wherein a first rectangular surface distal end is attached to a said second rectangular surface distal end to form a gripping edge 324. With respect to locking tooth 300, the first rectangular surface 320 in combination with rectangular base 310 define an internal dihedral angle Φ of about 90 degrees. With respect to locking tooth 302, the first rectangular surface 320 in combination with rectangular base 310 define an internal dihedral angle Φ greater than 90 degrees. In certain embodiments, Φ is about 110 degrees. In certain embodiments, Φ is about 120 degrees.

Figure 2G:
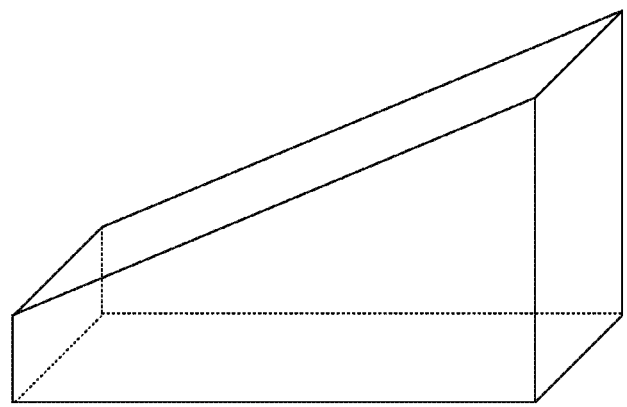
FIG. 2G shows a third embodiment of Applicant's locking tooth.
Figure 2H:
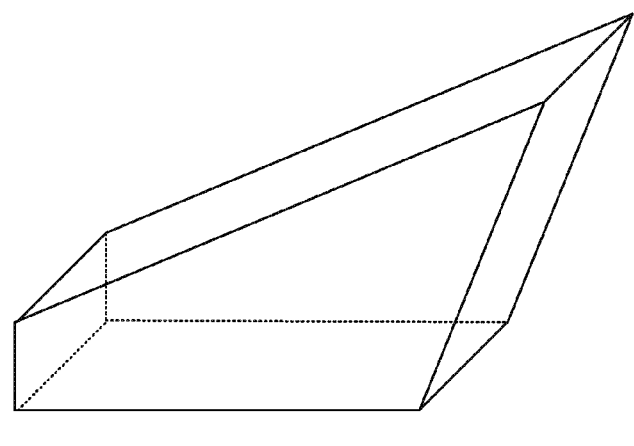
FIG. 2H shows a fourth embodiment of Applicant's locking tooth.
Figure 2H:

Referring now to FIG. 2G, in certain embodiments Applicant's fixturing apparatus comprises one or more locking teeth 304. Locking tooth 304 comprises a first embodiment of a six-sided, non-rectangular parallelepiped. Referring now to FIG. 2H, in certain embodiments Applicant's fixturing apparatus comprises one or more looking teeth 306. Locking tooth 306 comprises a second embodiment of a six-sided, non-rectangular parallelepiped.

In certain embodiments, Applicant's fixturing apparatus comprises zero or more locking teeth 300, in combination with zero or more locking teeth 302, in combination with zero or more locking teeth 304, in combination with zero or more locking teeth 306.

Figure 3A:
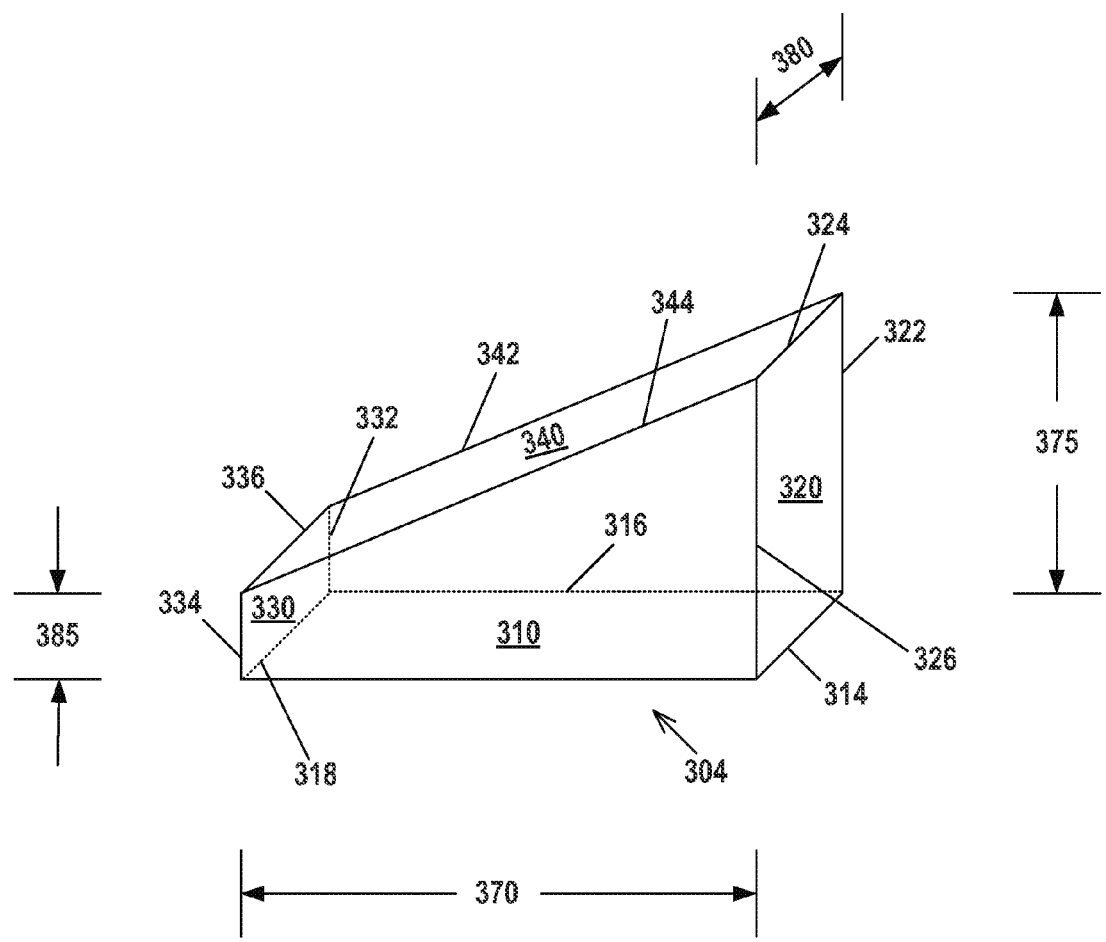
FIG. 3A is a first perspective view of the locking tooth of FIG. 2G.

FIG. 3A shows Applicant's locking tooth 304. The lengths, widths, heights, and axes, described with respect to locking tooth 304 also apply to locking teeth 300, 302, and 306. Base 310 comprises a rectangular shape defined by sides 312, 314, 316, and 318. Base 310 comprises a length 370 and a width 380. In certain embodiments, length 370 is between about 0.0002 mm and about 5.0 mm. In certain embodiments, width 380 is between about 0.0001 mm and about 2.5 mm.

Rectangular-shaped side 320, defined by sides 314, 322, 324, and 326, is attached to edge 314 of base 310 and extends upwardly therefrom. In the illustrated embodiment of FIG. 3A, side 320 and base 310 intersect to form a dihedral angle of about ninety degrees (90°). Side 320 comprises a height 375 and width 380.

In certain embodiments, height 375 is between about 0.0001 mm and about 5 mm. In certain embodiments, height 375 is about 0.0001 mm. In certain embodiments, length 375 is about 0.001 mm. In certain embodiments, height 375 is about 0.01 mm. In certain embodiments, height 375 is about 0.1 mm. In certain embodiments, height 375 is about 1 mm.

Rectangular-shaped side 330, defined by sides 318, 332, 334, and 336, is attached edge 318 of base 310, and extends upwardly therefrom. In the illustrated embodiment of FIG. 3A, side 330 and base 310 intersect to form a dihedral angle of about ninety degrees (90°). Side 330 comprises a height 385 and width 380. In certain embodiments, height 385 is between about 0 mm and about 2.0 mm.

As those skilled in the art will appreciate, where height 385 is 0 mm, locking tooth 304 becomes locking tooth 300. Where height 385 is 0 mm, sides 336 and 318 are the same, and top portion 340 intersects with base portion 310. The dimensions and axes described in FIGS. 3A through 3B are applicable to both locking tooth 300 and locking tooth 305.

Sides 320 and 330 have a facing relationship, wherein height 320 is greater than height 330. In certain embodiments wherein height 385 is greater than 0, the ratio of height 375 to height 385 is between about 2:1 to about 6:1.

Top 340 comprises a rectangular shape, and is defined by sides 324, 342, 336, and 344. Top 340 comprises width 380. Referring now to FIGS. 3A and 3D, side 350 comprises a quadrilateral shape with two parallel sides 326 and 334, and is defined by sides 312, 326, 334, and 344. Referring now to FIGS. 3A and 3E, side 360 comprises a quadrilateral shape with two parallel sides 322 and 332, and is defined by sides 316, 322, 332, and 342.

Figure 3B:
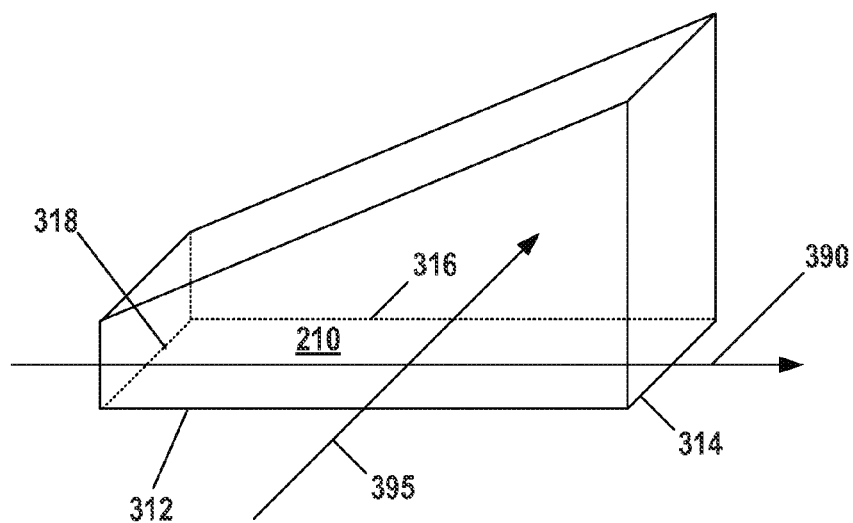
FIG. 3B is a second perspective view of the locking tooth of FIG. 3A.

Referring now to FIG. 3B, locking tooth 300 comprises a long axis 390 comprising a first center line of base 210, wherein that long axis 390 is parallel to sides 312 and 316 and bisects sides 314 and 318. Locking tooth 300 further comprises short axis 395 comprising a second center line of base 210, wherein that short axis 395 is parallel to sides 314 and 318 bisects sides 312 and 316.

Figure 3C:
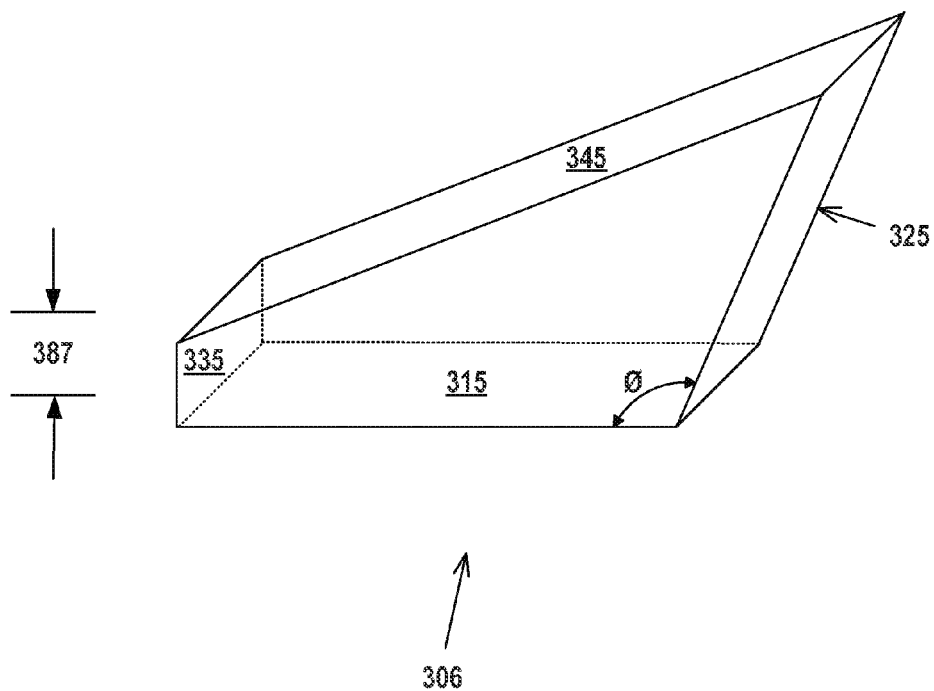
FIG. 3C is a first perspective view of the locking tooth of FIG. 2H.
Figure 3D:
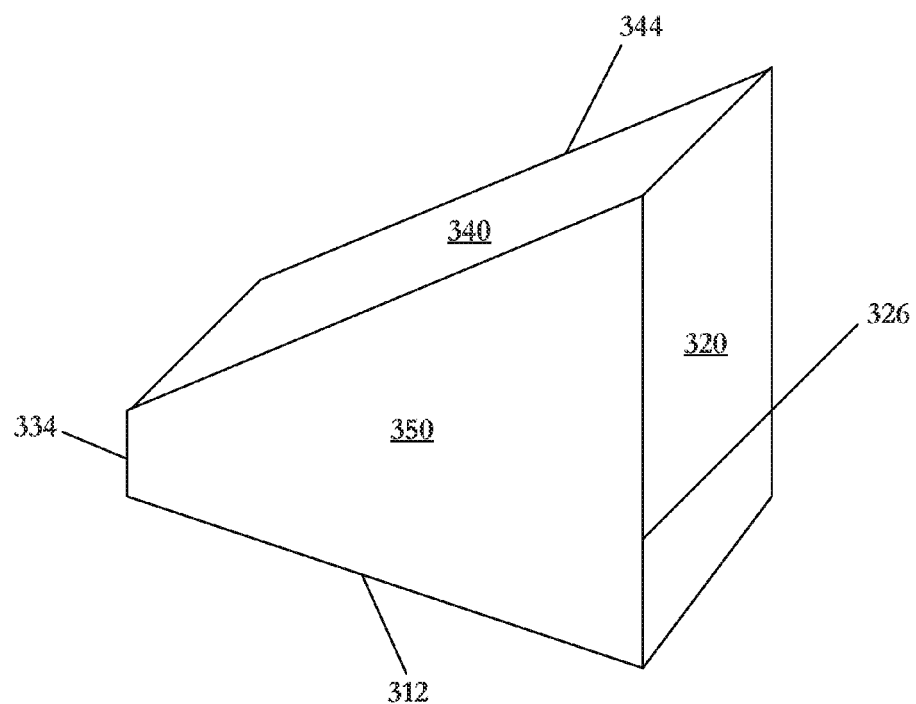
FIG. 3D is a third perspective view of the locking tooth of FIG. 3A.
Figure 3E:
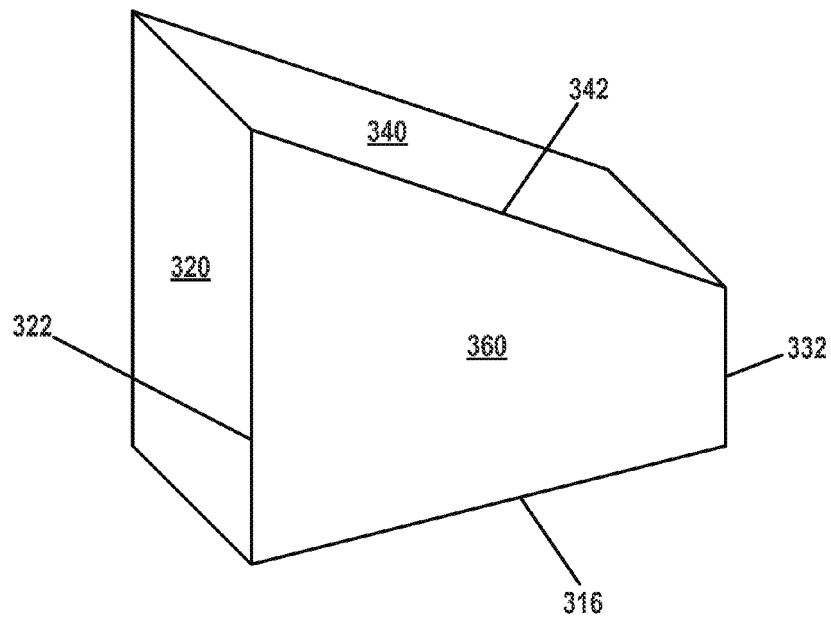
FIG. 3E is a fourth perspective view of the locking tooth of FIG. 3A.
Figure 3F:
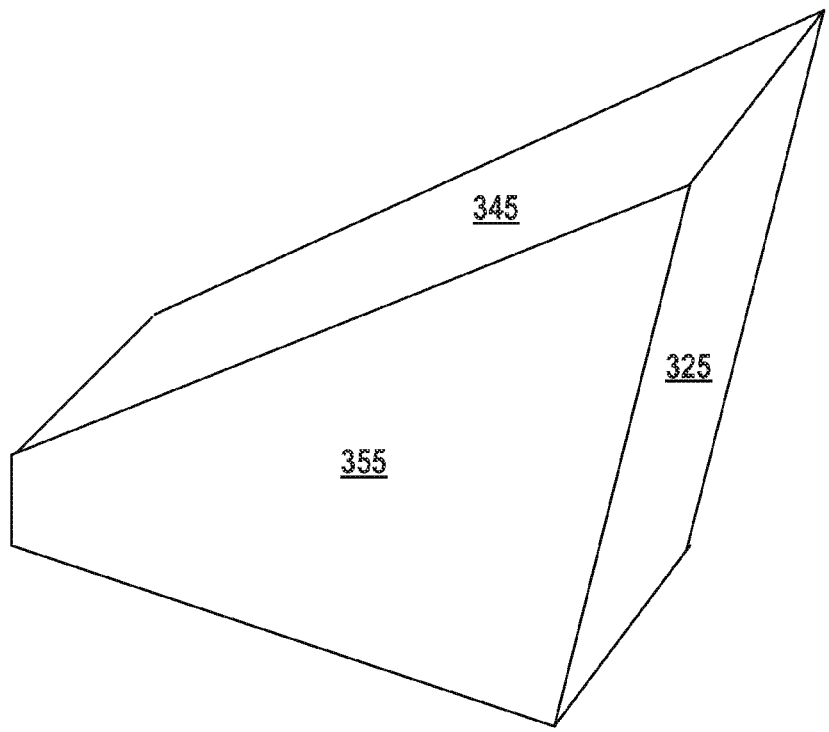
FIG. 3F is a second perspective view of the locking tooth of FIG. 3C.
Figure 3G:
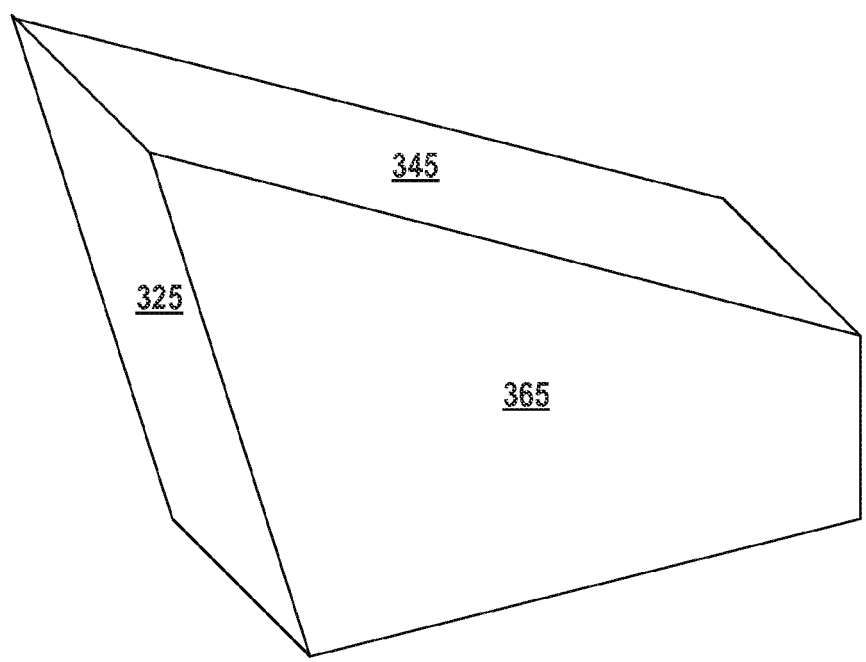
FIG. 3G is a third perspective view of the locking tooth of FIG. 3C.

FIGS. 3C, 3F, and 3G, illustrate Applicants' locking teeth 302 and 306. Locking tooth 302 comprises base 315, sides 325, 355, 365, and top 345. Locking tooth 306 comprises base 315, sides 325, 335, 355, 365, and top 345.

Base 315 comprises length 370 (FIG. 3A) and width 380 (FIG. 3A). Side 325 comprises height 375 (FIG. 3A) and width 380 (FIG. 3A). Side 335 comprises height 385 (FIG. 3A) and width 380 (FIG. 3A). If height 385 is 0 mm, then locking tooth 306 becomes locking tooth 302.

Side 325 intersects base 315 to form an internal dihedral angle θ, wherein angle θ is greater than ninety degrees (90°). In certain embodiments, angle θ is about 100 degrees. In certain embodiments, angle θ is about 110 degrees. In certain embodiments, angle θ is about 120 degrees.

Referring once again to FIGS. 1A, 2A, 2B, and 2C, Applicant has found that, depending on the dimensions of locking assembly 110 (FIGS. 1A, 2A, 2C)/115 (FIGS. 2B, 2C), and the width of strap 120 (FIGS. 1A, 1B, 2C), and the thickness of strap 120, and the circumference of the fixtured objects 250 (FIG. 2C), and the weight of the fixtured objects 250 (FIG. 2C), that differing orientations of the plurality of locking teeth 210A/210B with respect to one another are needed. For example, when using locking assembly 115, in certain embodiments Applicant has found optimal fixturing is achieved when locking teeth disposed in first plurality of locking teeth 210A are offset from the locking teeth disposed in the second plurality of locking teeth 210B.

As a general matter, individual locking teeth 300/305 disposed in any given plurality of locking teeth 210A and 210B are arranged in a pattern of columns and rows. In various embodiments of Applicant's invention, the orientations of individual locking teeth disposed in such columns and rows differ. These various orientations are described herein with reference to the relationship of the long axes 390 (FIG. 3B) and short axes 395 (FIG. 3B) of adjacent locking teeth in the same column, and the relationship of the long axes 390 and short axes 395 of adjacent locking teeth in the same row.

References herein to axes being "aligned" mean that those axes are coaxial, i.e. overlap one another. Axes described herein as not being aligned are not coaxial, i.e. do not overlap. In orientations 400 (FIG. 4A) and 700 (FIG. 7A), the long axes of adjacent locking teeth disposed in the same column are aligned. In orientations 500, 600, 800, and 900, the long axes of adjacent locking teeth disposed in the same column are not aligned. In orientations 400, 500, 700, and 800, the long axes of adjacent locking teeth disposed in the same row are parallel. In orientations 600 and 900, the long axes of adjacent locking teeth disposed in the same row are not parallel.

In orientations 400, the short axes of adjacent locking teeth disposed in the same row are aligned. In orientations 500, 600, 700, 800, and 900, the short axes of adjacent locking teeth disposed in the same row are not aligned.

Figure 4A:
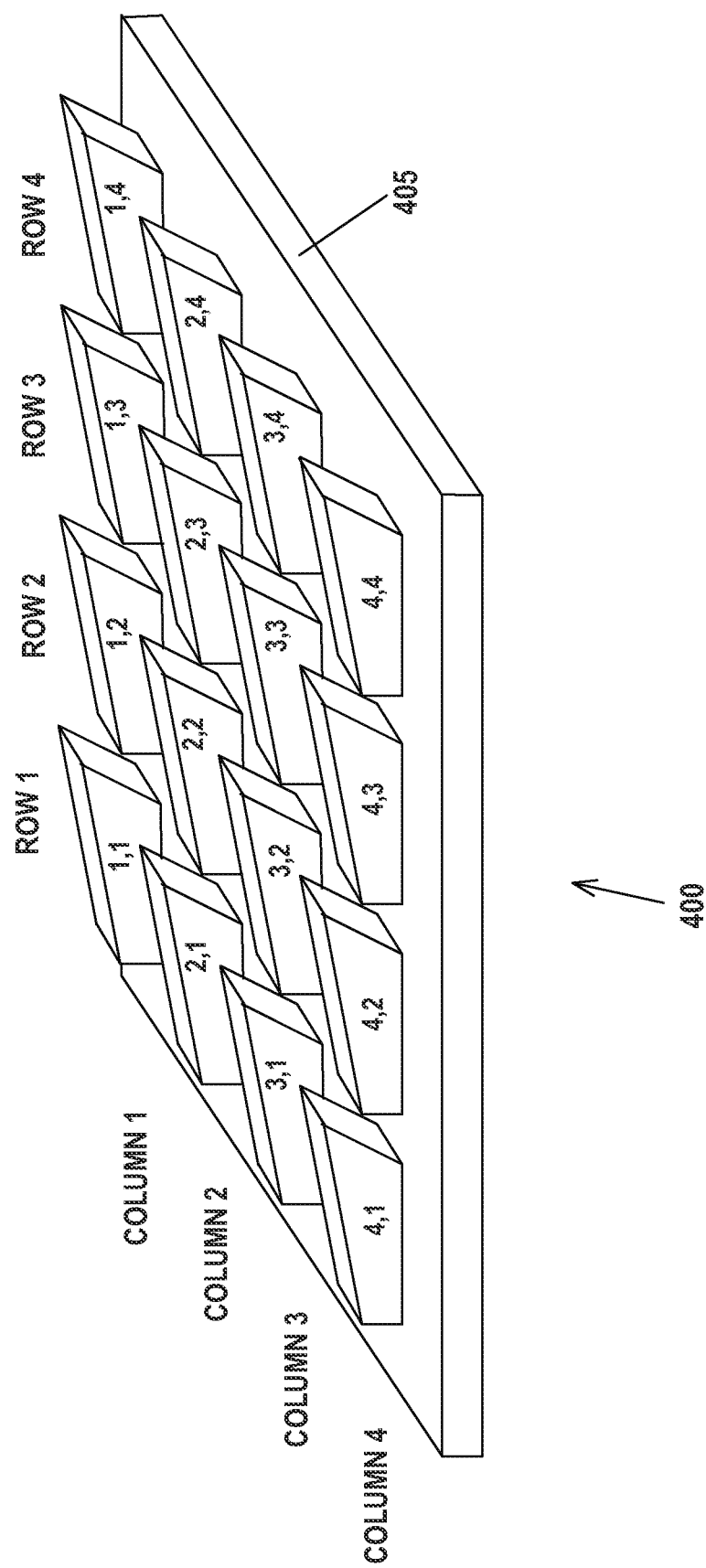
FIG. 4A is a perspective view of a plurality of Applicant's locking teeth arranged in a first orientation.

FIG. 4A shows a portion of plurality of Applicant's locking teeth, such as plurality of locking teeth 210, wherein that plurality of locking teeth comprise orientation 400. In certain embodiments, each of the plurality of locking teeth shown in FIG. 4A comprises a locking tooth 300. In certain embodiments, each of the plurality of locking teeth shown in FIG. 4A comprises a locking tooth 302. In certain embodiments, each of the plurality of locking teeth shown in FIG. 4A comprises a locking tooth 304. In certain embodiments, each of the plurality of locking teeth shown in FIG. 4A comprises a locking tooth 306. In certain embodiments, each of the plurality of locking teeth shown in FIG. 4A is selected from the group consisting of a locking tooth 300, a locking tooth 302, a locking tooth 304, and a locking tooth 306.

In the illustrated embodiment of FIG. 4A, the plurality of locking teeth are arranged in columns and rows, namely columns 1, 2, 3, and 4, and rows 1, 2, 3, and 4. In the illustrated embodiment of FIG. 4A, locking tooth 1,1 for example is disposed in column 1 and row 1. For the sake of clarity, FIG. 4A shows a total of 16 locking teeth. In actual implementation, Applicant's plurality of locking teeth 210 comprises between about one hundred, and about ten thousand individual locking teeth, per square inch.

Figure 4B:
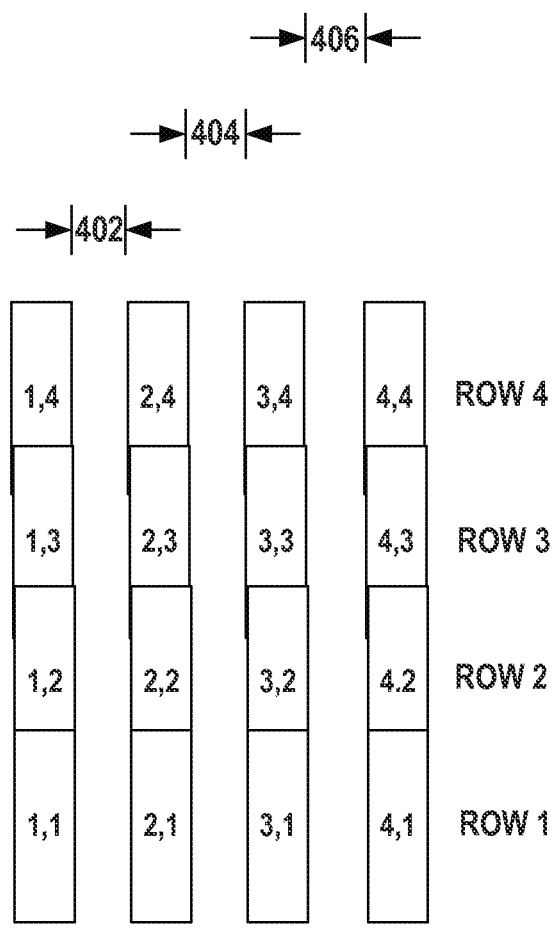
FIG. 4B is a first top view of the plurality of Applicants' locking teeth shown in FIG. 4A.
Figure 4C:
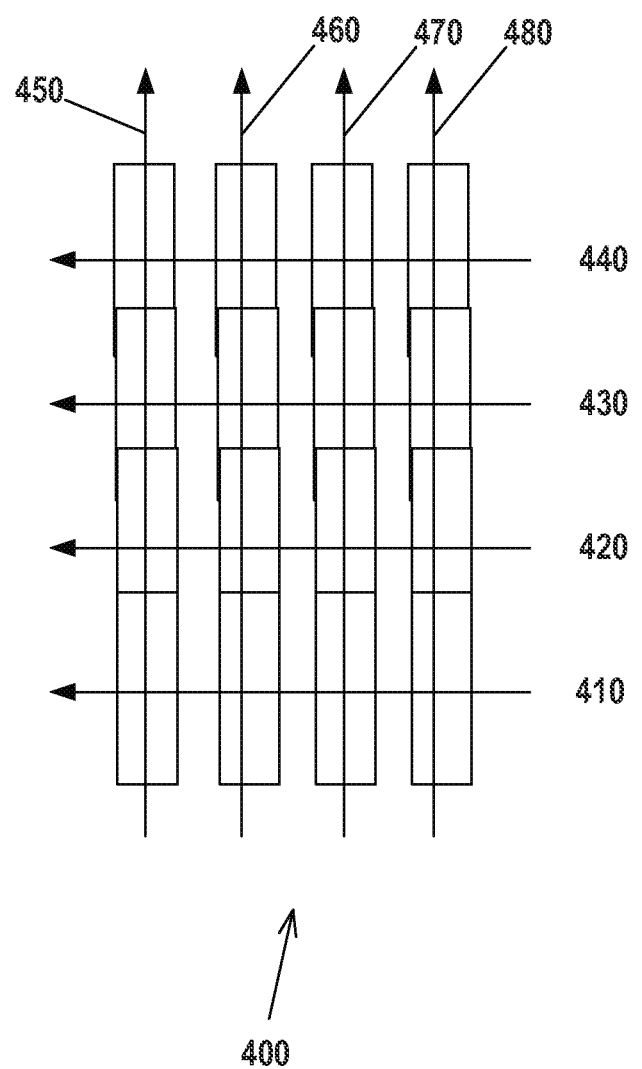
FIG. 4C is a second top view of the plurality of Applicants' locking teeth shown in FIG. 4A.

FIGS. 4B and 4C comprise top views of orientation 400 shown in FIG. 4A. Referring now to FIG. 4B, the locking teeth comprising column 1 are separated from the locking teeth comprising column 2 by a spacing 402. In certain embodiments, spacing 402 is substantially the same as the width 380 (FIG. 3A) of the individual locking teeth. By "substantially the same," Applicant means within plus or minus ten percent (10%). In other embodiments, spacing 402 is less than width 380. In still other embodiments, spacing 402 is greater than width 380.

Similarly, column 2 and 3 are separated by spacing 404, and column 3 and column 4 are separated by spacing 406. In certain embodiments, spacing 404 is substantially the same as the width 380 (FIG. 3A) of the individual locking teeth. In other embodiments, spacing 404 is less than width 380. In still other embodiments, spacing 404 is greater than width 380. In certain embodiments, spacing 406 is substantially the same as the width 380 (FIG. 3A) of the individual locking teeth. In other embodiments, spacing 406 is less than width 380. In still other embodiments, spacing 406 is greater than width 380.

In orientation 400 shown in FIGS. 4A, 4B, and 4C, the long axes 390 (FIG. 3B) of each locking tooth disposed in a column are aligned, and the short axis 395 (FIG. 3B) of each locking tooth disposed in a row are aligned. For example, locking teeth 1,1; 1,2; 1,3; and 1,4; are each disposed in column 1. Aggregate long axis 450 comprises the individual long axis 390 of each of locking teeth 1,1; 1,2; 1,3; and 1,4. Similarly, aggregate long axes 460, 470, and 480, comprise the individual long axis 390 of each locking tooth disposed in columns 2, 3, and 4, respectively.

Locking teeth 1,1; 2,1; 3,1; and 4,1; are disposed in row 1. Aggregate short axis 410 comprises the individual short axis 395 (FIG. 3B) of each of locking teeth 1,1; 2,1; 3,1; and 4,1. Similarly, aggregate short axes 420, 430, and 440, comprise the individual short axis 395 of each tooth disposed in rows 2, 3, and 4, respectively.

Figure 5A:
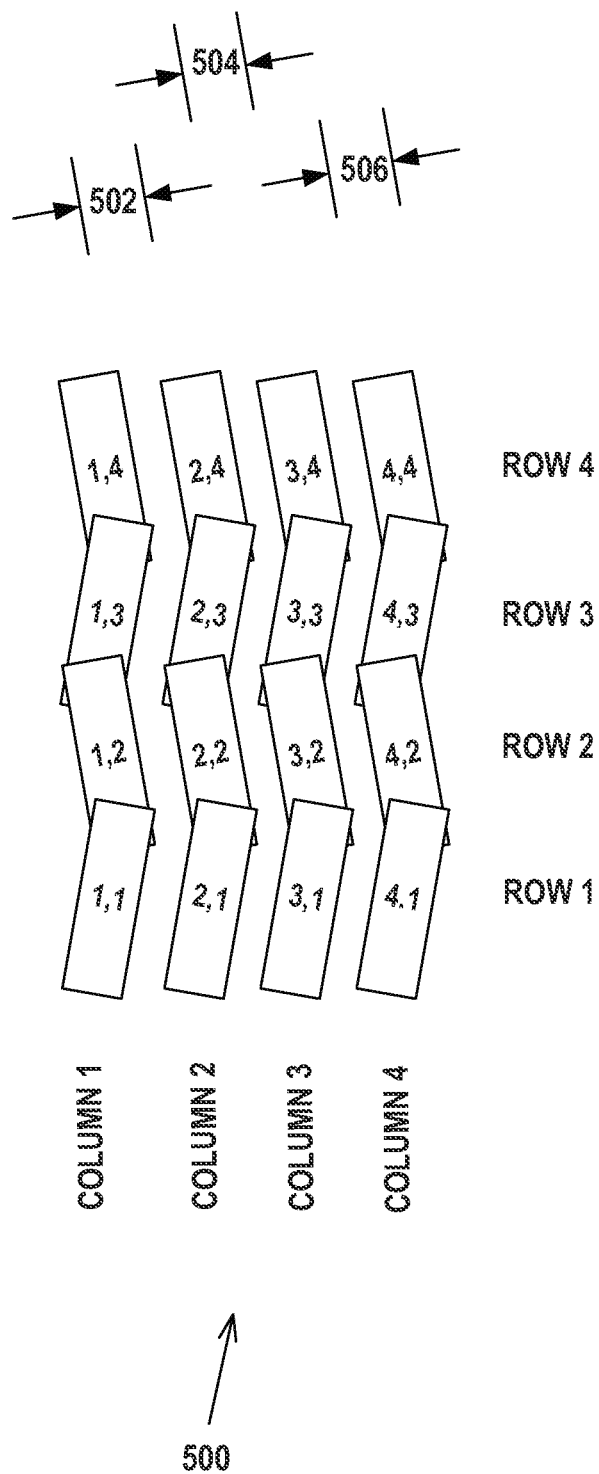
FIG. 5A is a first top view of the plurality of Applicants' locking teeth arranged in a second orientation.

FIG. 5A shows a portion of plurality of Applicant's locking teeth, wherein that plurality of locking teeth comprise orientation 500. In certain embodiments, each of the plurality of locking teeth shown in FIG. 5A comprises a locking tooth 300. In certain embodiments, each of the plurality of locking teeth shown in FIG. 5A comprises a locking tooth 302. In certain embodiments, each of the plurality of locking teeth shown in FIG. 5A comprises a locking tooth 304. In certain embodiments, each of the plurality of locking teeth shown in FIG. 5A comprises a locking tooth 306. In certain embodiments, each of the plurality of locking teeth shown in FIG. 5A is selected from the group consisting of a locking tooth 300, a locking tooth 302, a locking tooth 304, and a locking tooth 306.

In the illustrated embodiment of FIG. 5A, the plurality of locking teeth are arranged in columns and rows, namely columns 1, 2, 3, and 4, and rows 1, 2, 3, and 4. In the illustrated embodiment of FIG. 5A, locking tooth 1,1 for example is disposed in column 1 and row 1. For the sake of clarity, FIG. 5A shows a total of 16 locking teeth.

The locking teeth comprising column 1 are separated from the locking teeth comprising column 2 by a spacing 502. In certain embodiments, spacing 502 is substantially the same as the width 380 (FIG. 3A) of the individual locking teeth. By "substantially the same," Applicant means within plus or minus ten percent (10%). In other embodiments, spacing 502 is less than width 380. In still other embodiments, spacing 502 is greater than width 380.

Similarly, column 2 and 3 are separated by spacing 504, and column 3 and column 4 are separated by spacing 506. In certain embodiments, spacing 504 is substantially the same as the width 380 (FIG. 3A) of the individual locking teeth. In other embodiments, spacing 504 is less than width 380. In still other embodiments, spacing 504 is greater than width 380. In certain embodiments, spacing 506 is substantially the same as the width 380 (FIG. 3A) of the individual locking teeth. In other embodiments, spacing 506 is less than width 380. In still other embodiments, spacing 506 is greater than width 380.

Figure 5B:
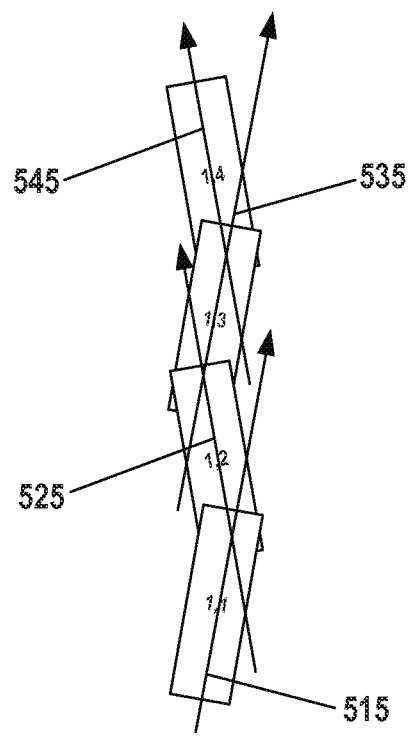
FIG. 5B is a top view of four of Applicants' locking teeth arranged in the orientation of FIG. 5A.
Figure 5C:
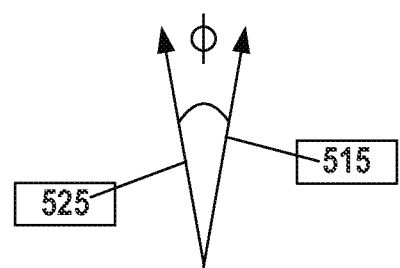
FIG. 5C shows the angle formed by the intersection of the long axes of two adjacent locking teeth in the same column, wherein those locking teeth are arranged in the orientation of FIG. 5A.

FIG. 5B comprise a top view of one column of locking teeth disposed in orientation 500. In orientation 500, the individual long axes 390 (FIG. 3B) of each locking tooth disposed in a column are not aligned. For example, locking tooth 1,1 comprises long axis 515, and the adjacent locking tooth in column 1, namely locking tooth 1,2, comprises long axis 525. As FIGS. 5B and 5C illustrate, long axes 515 and 525 are not aligned. Rather, long axis 525 is offset from long axis 515 by a first offset angle Φ1. In certain embodiments, first offset angle Φ1 is between about 5 degrees and about 45 degrees.

Similarly, long axis 535 is offset from long axis 525 by a second offset angle. In certain embodiments, second offset angle is between about 5 degrees and about 45 degrees. Long axis 545 is offset from long axis 535 by a third offset angle. In certain embodiments, the third offset angle is between about 5 degrees and about 45 degrees. As a general matter, in orientation 500 the long axis for the (i)th locking tooth in (j)th column is offset from the long axis of the adjacent (i+1)th locking tooth in that (j)th column by the (i)th offset angle.

Figure 5D:
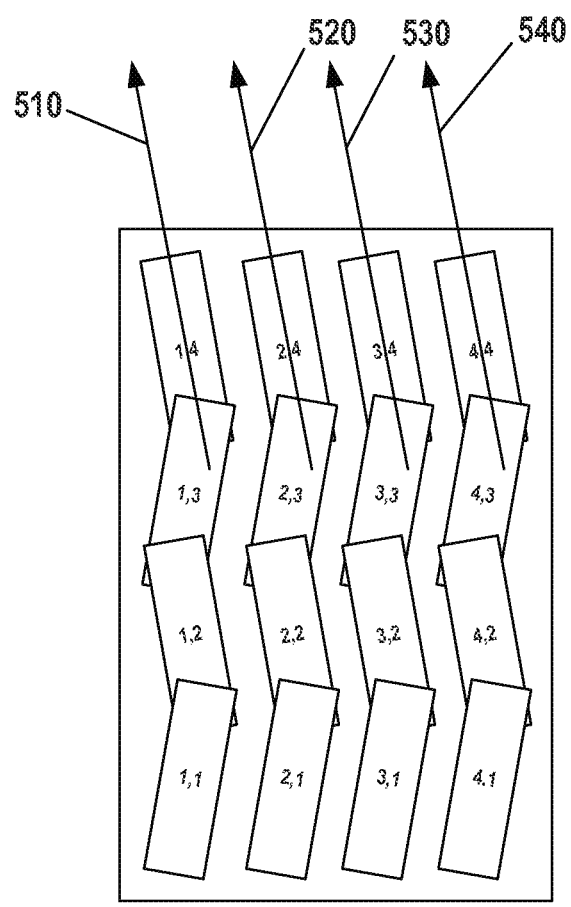
FIG. 5D is a second top view of the plurality of Applicants' locking teeth shown in FIG. 5A.

In orientation 500 illustrated in FIGS. 5A and 5D, the long axes 390 (FIG. 3B) of adjacent locking teeth disposed in the same column are not aligned, however the long axes of the locking teeth in the same row are parallel. Locking teeth 1,4; 2,4; 3,4; and 4,4, are all disposed in row 4, and comprise long axes 510, 520, 530, and 540, respectively. As illustrated in FIG. 5D, long axes 510, 520, 530, and 540, are parallel.

Figure 6A:
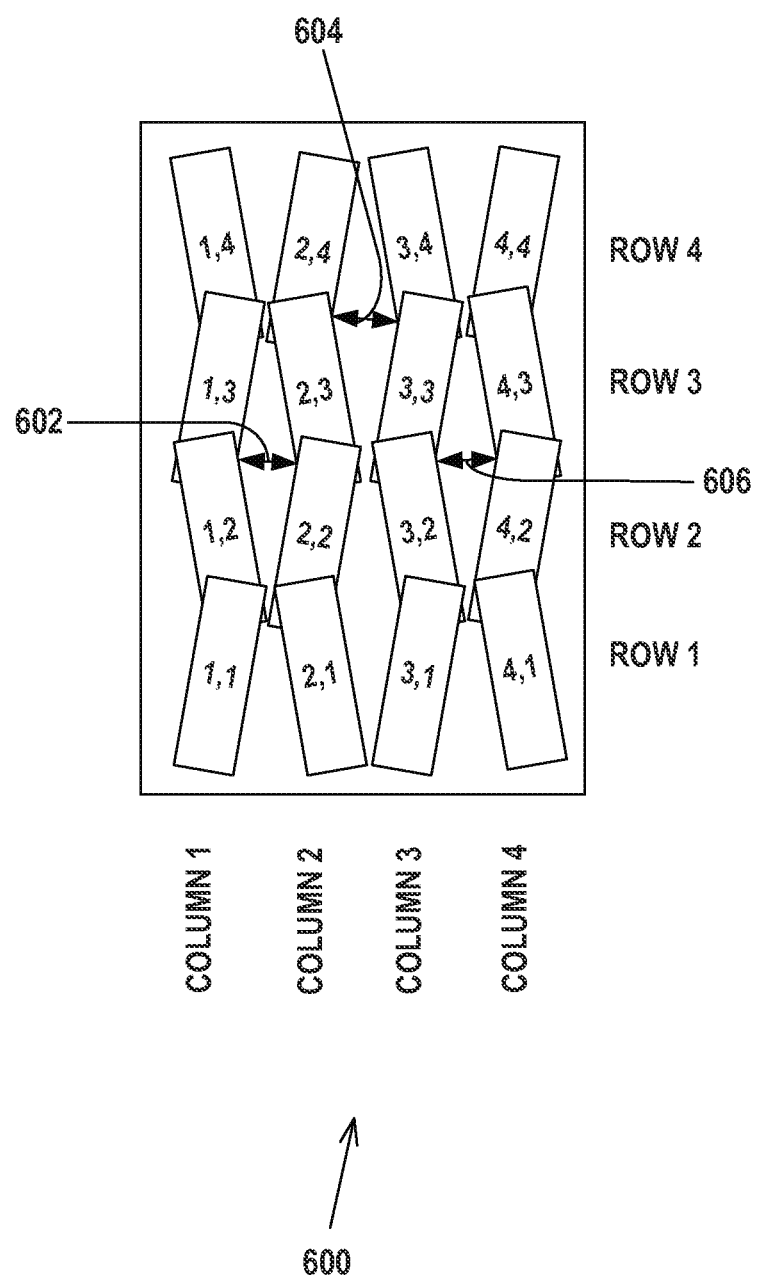
FIG. 6A is a first top view of the plurality of Applicants' locking teeth arranged in a third orientation.

FIG. 6A shows a portion of Applicant's plurality of locking teeth, wherein that plurality of locking teeth comprise orientation 600. In certain embodiments, each of the plurality of locking teeth shown in FIG. 6A comprises a locking tooth 300. In certain embodiments, each of the plurality of locking teeth shown in FIG. 6A comprises a locking tooth 302. In certain embodiments, each of the plurality of locking teeth shown in FIG. 6A comprises a locking tooth 304. In certain embodiments, each of the plurality of locking teeth shown in FIG. 6A comprises a locking tooth 306. In certain embodiments, each of the plurality of locking teeth shown in FIG. 6A is selected from the group consisting of a locking tooth 300, a locking tooth 302, a locking tooth 304, and a locking tooth 306.

In the illustrated embodiment of FIG. 6A, the plurality of locking teeth are arranged in columns and rows, namely columns 1, 2, 3, and 4, and rows 1, 2, 3, and 4. In the illustrated embodiment of FIG. 6A, locking tooth 1,1 for example is disposed in column 1 and row 1. For the sake of clarity, FIG. 6A shows a total of 16 locking teeth. In actual implementation, Applicant's plurality of locking teeth 210 comprises between about one hundred, and about ten thousand individual locking teeth.

The locking teeth comprising column 1 are separated from the locking teeth comprising column 2 by a maximum spacing 602. In certain embodiments, maximum spacing 602 is substantially the same as the width 380 (FIG. 3A) of the individual locking teeth. By "substantially the same," Applicant means within plus or minus twenty percent (20%). In other embodiments, maximum spacing 602 is less than width 380. In still other embodiments, maximum spacing 602 is greater than width 380.

Similarly, column 2 and 3 are separated by spacing maximum 604, and column 3 and column 4 are separated by maximum spacing 606. In certain embodiments, maximum spacing 604 is substantially the same as the width 380 (FIG. 3A) of the individual locking teeth. In other embodiments, maximum spacing 604 is less than width 380. In still other embodiments, maximum spacing 604 is greater than width 380. In certain embodiments, maximum spacing 606 is substantially the same as the width 380 (FIG. 3A) of the individual locking teeth. In other embodiments, maximum spacing 606 is less than width 380. In still other embodiments, maximum spacing 606 is greater than width 380.

Figure 6B:
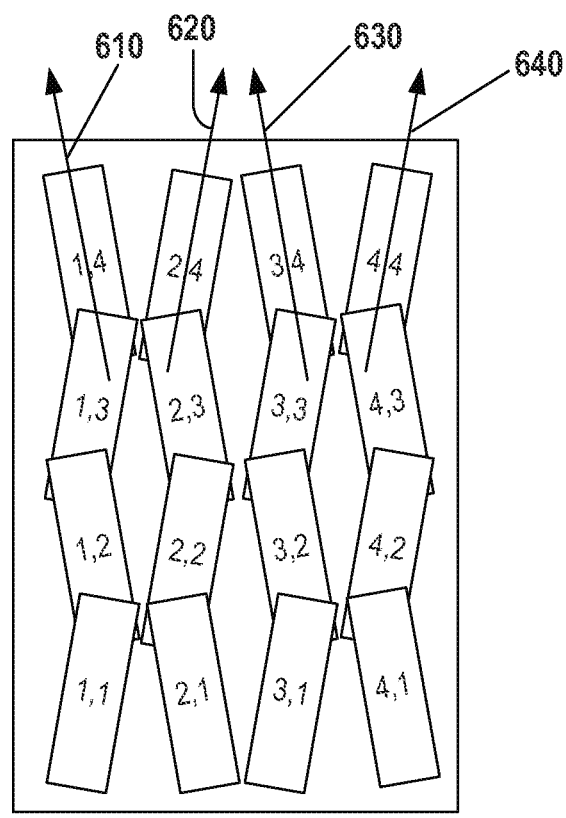
FIG. 6B is a second top view of the plurality of locking teeth shown in FIG. 6A.

In orientation 600 illustrated in FIGS. 6A and 6B, the long axes 390 (FIG. 3B) of adjacent locking teeth disposed in the same column are not aligned. Moreover, the long axes of the locking teeth in the same row are not parallel. Locking teeth 1,4; 2,4; 3,4; and 4,4, are all disposed in row 4, and comprise long axes 610, 620, 630, and 640, respectively. As illustrated in FIG. 6B, long axes 610 is not parallel to long axis 620, which is not parallel to long axis 630, which is not parallel to long axis 640.

Figure 7A:
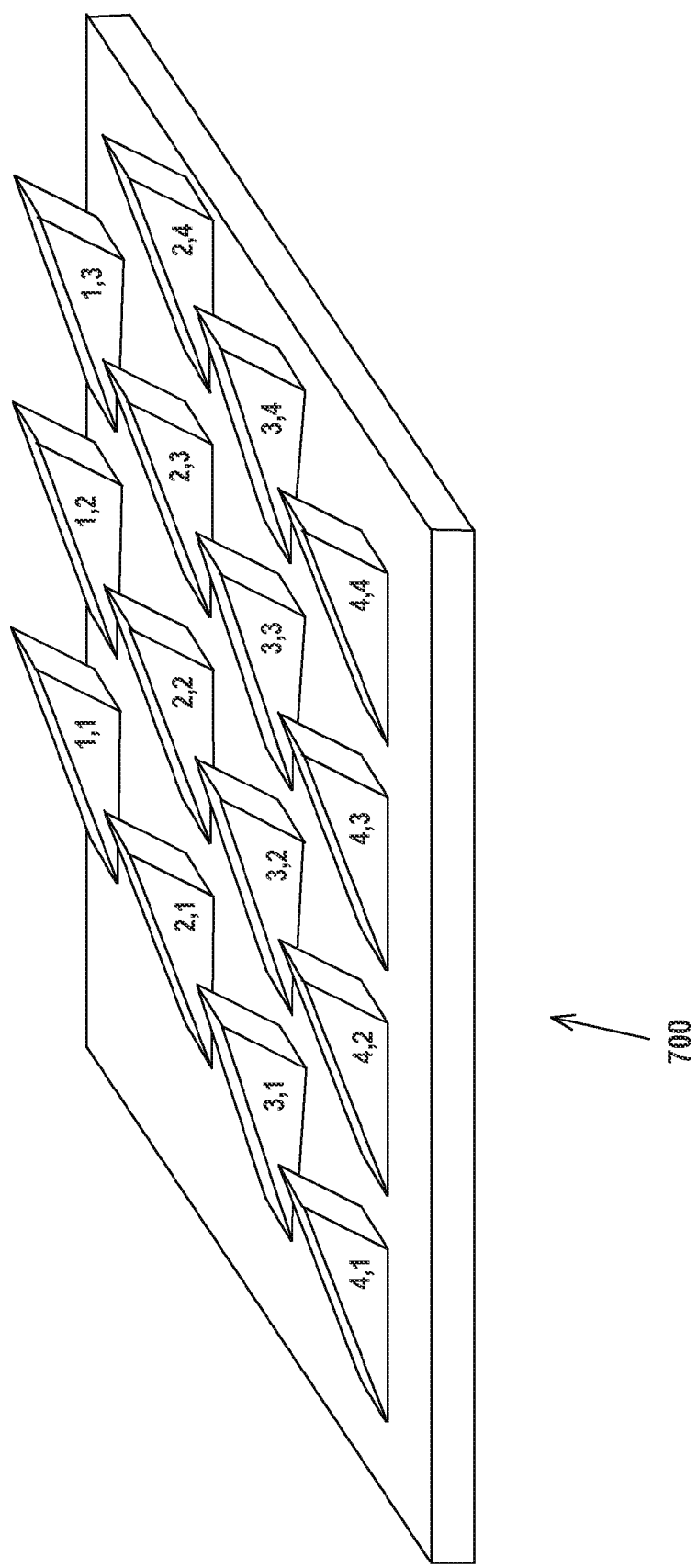
FIG. 7A is a perspective view of Applicant's locking teeth arranged in a fourth orientation.

FIG. 7A shows a portion of Applicant's plurality of locking teeth, wherein that plurality of locking teeth comprise orientation 700. In certain embodiments, each of the plurality of locking teeth shown in FIG. 7A comprises a locking tooth 300. In certain embodiments, each of the plurality of locking teeth shown in FIG. 7A comprises a locking tooth 302. In certain embodiments, each of the plurality of locking teeth shown in FIG. 7A comprises a locking tooth 304. In certain embodiments, each of the plurality of locking teeth shown in FIG. 7A comprises a locking tooth 306. In certain embodiments, each of the plurality of locking teeth shown in FIG. 7A is selected from the group consisting of a locking tooth 300, a locking tooth 302, a locking tooth 304, and a locking tooth 306.

Figure 7B:
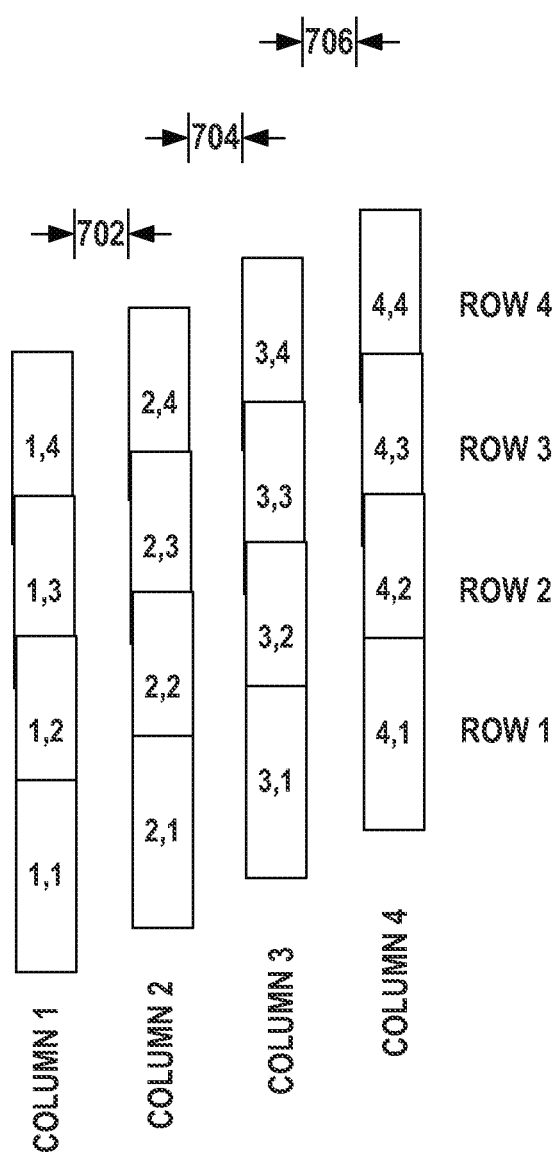
FIG. 7B is a first top view of the plurality of Applicants' locking teeth arranged in the orientation of FIG. 7A.

In the illustrated embodiment of FIG. 7B, the plurality of locking teeth comprising orientation 700 are arranged in columns and rows, namely columns 1, 2, 3, and 4, and rows 1, 2, 3, and 4. In the illustrated embodiment of FIG. 7B, locking tooth 1,1 for example is disposed in column 1 and row 1. For the sake of clarity, FIG. 7B shows a total of 16 locking teeth.

The locking teeth comprising column 1 are separated from the locking teeth comprising column 2 by a spacing 702. In certain embodiments, spacing 702 is substantially the same as the width 380 (FIG. 3A) of the individual locking teeth. By "substantially the same," Applicant means within plus or minus ten percent (10%). In other embodiments, spacing 702 is less than width 380. In still other embodiments, spacing 702 is greater than width 380.

Similarly, column 2 and 3 are separated by spacing 704, and column 3 and column 4 are separated by spacing 706. In certain embodiments, spacing 704 is substantially the same as the width 380 (FIG. 3A) of the individual locking teeth. In other embodiments, spacing 704 is less than width 380. In still other embodiments, spacing 704 is greater than width 380. In certain embodiments, spacing 706 is substantially the same as the width 380 (FIG. 3A) of the individual locking teeth. In other embodiments, spacing 706 is less than width 380. In still other embodiments, spacing 706 is greater than width 380.

Figure 7C:
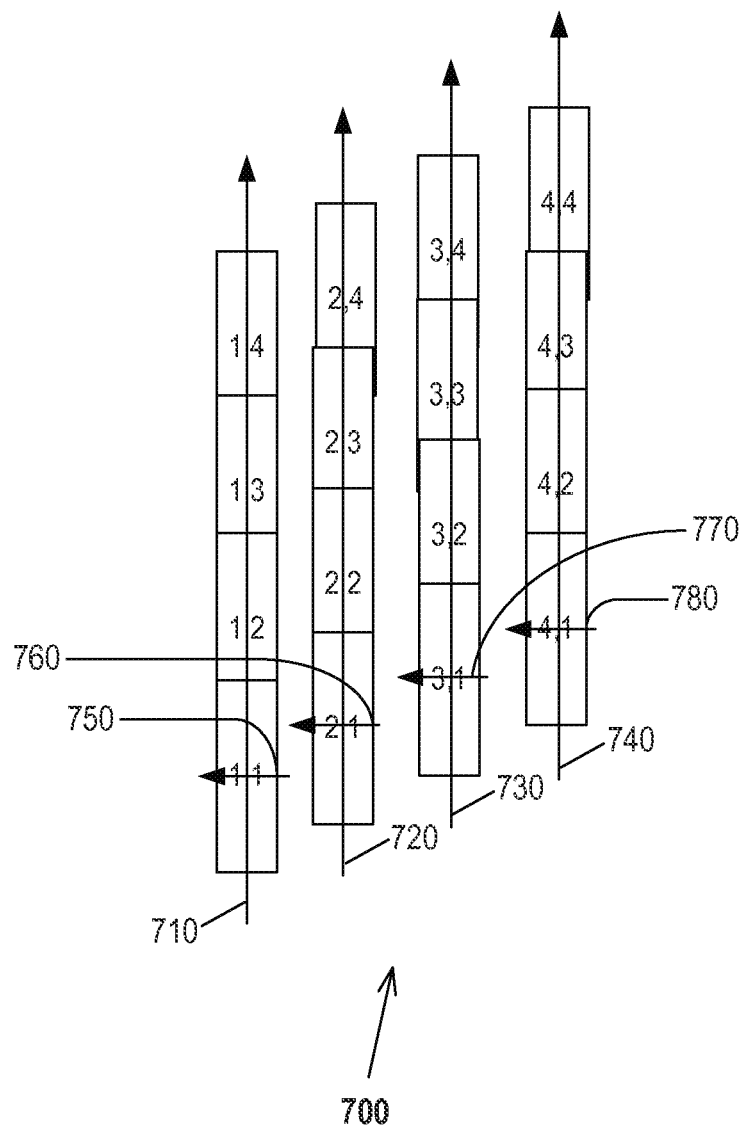
FIG. 7C is a second top view of the plurality of locking teeth shown in FIG. 7A.

In orientation 700 illustrated in FIGS. 7A, 7B, and 7C, the long axes 390 (FIG. 3B) of adjacent locking teeth disposed in the same column are aligned. For example, aggregate long axis 710 comprises the individual long axes 390 (FIG. 3B) of locking teeth 1,1; 1,2; 1,3; and 1,4. Similarly, aggregate long axis 720 comprises the individual long axes 390 (FIG. 3B) of locking teeth 2,1; 2,2; 2,3; and 2,4. Similarly, aggregate long axis 730 comprises the individual long axes 390 (FIG. 3B) of locking teeth 3,1; 3,2; 3,3; and 3,4. Similarly, aggregate long axis 740 comprises the individual long axes 390 (FIG. 3B) of locking teeth 4,1; 2,4; 4,3; and 4,4.

In orientation 700, the short axes 395 (FIG. 3B) of the locking tooth disposed in the same row are not aligned. For example, locking teeth 1,1; 2,1; 3,1; and 4,1, are disposed in row 1. Locking tooth 1,4 comprises short axis 750. Locking tooth 2,4 comprises short axis 760. Locking tooth 3,4 comprises short axis 770. Locking tooth 4,4 comprises short axis 780. In the illustrated embodiment of FIG. 7C, short axis 750 is not aligned with short axis 760, which is not aligned with short axis 770, which is not aligned with short axis 780.

Figure 8A:
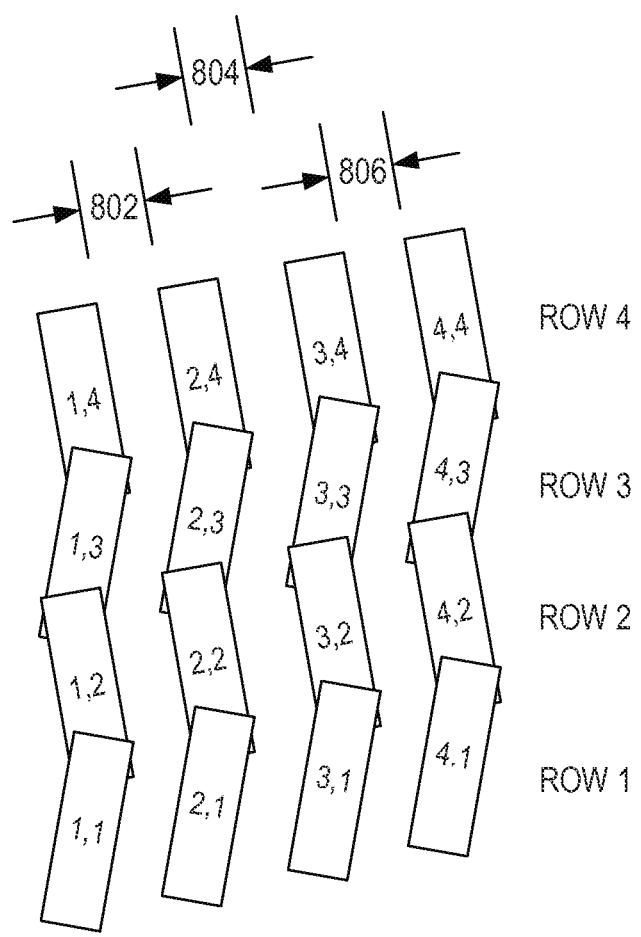
FIG. 8A is a first top view of the plurality of Applicants' locking teeth arranged in a fifth orientation.

FIG. 8A shows a portion of plurality of Applicant's locking teeth, wherein that plurality of locking teeth comprise orientation 800. In certain embodiments, each of the plurality of locking teeth shown in FIG. 8A comprises a locking tooth 300. In certain embodiments, each of the plurality of locking teeth shown in FIG. 8A comprises a locking tooth 302. In certain embodiments, each of the plurality of locking teeth shown in FIG. 8A comprises a locking tooth 304. In certain embodiments, each of the plurality of locking teeth shown in FIG. 8A comprises a locking tooth 306. In certain embodiments, each of the plurality of locking teeth shown in FIG. 8A is selected from the group consisting of a locking tooth 300, a locking tooth 302, a locking tooth 304, and a locking tooth 306.

In the illustrated embodiment of FIG. 8A, the plurality of locking teeth are arranged in columns and rows, namely columns 1, 2, 3, and 4, and rows 1, 2, 3, and 4. In the illustrated embodiment of FIG. 8A, locking tooth 1,1 for example is disposed in column 1 and row 1. For the sake of clarity, FIG. 8A shows a total of 16 locking teeth. In actual implementation, Applicant's plurality of locking teeth 210 comprises between about one hundred, and about ten thousand individual locking teeth.

The locking teeth comprising column 1 are separated from the locking teeth comprising column 2 by a spacing 802. In certain embodiments, spacing 802 is substantially the same as the width 380 (FIG. 3A) of the individual locking teeth. By "substantially the same," Applicant means within plus or minus ten percent (10%). In other embodiments, spacing 802 is less than width 380. In still other embodiments, spacing 802 is greater than width 380.

Similarly, column 2 and 3 are separated by spacing 804, and column 3 and column 4 are separated by spacing 806. In certain embodiments, spacing 804 is substantially the same as the width 380 (FIG. 3A) of the individual locking teeth. In other embodiments, spacing 804 is less than width 380. In still other embodiments, spacing 804 is greater than width 380. In certain embodiments, spacing 806 is substantially the same as the width 380 (FIG. 3A) of the individual locking teeth. In other embodiments, spacing 806 is less than width 380. In still other embodiments, spacing 806 is greater than width 380.

Figure 8B:
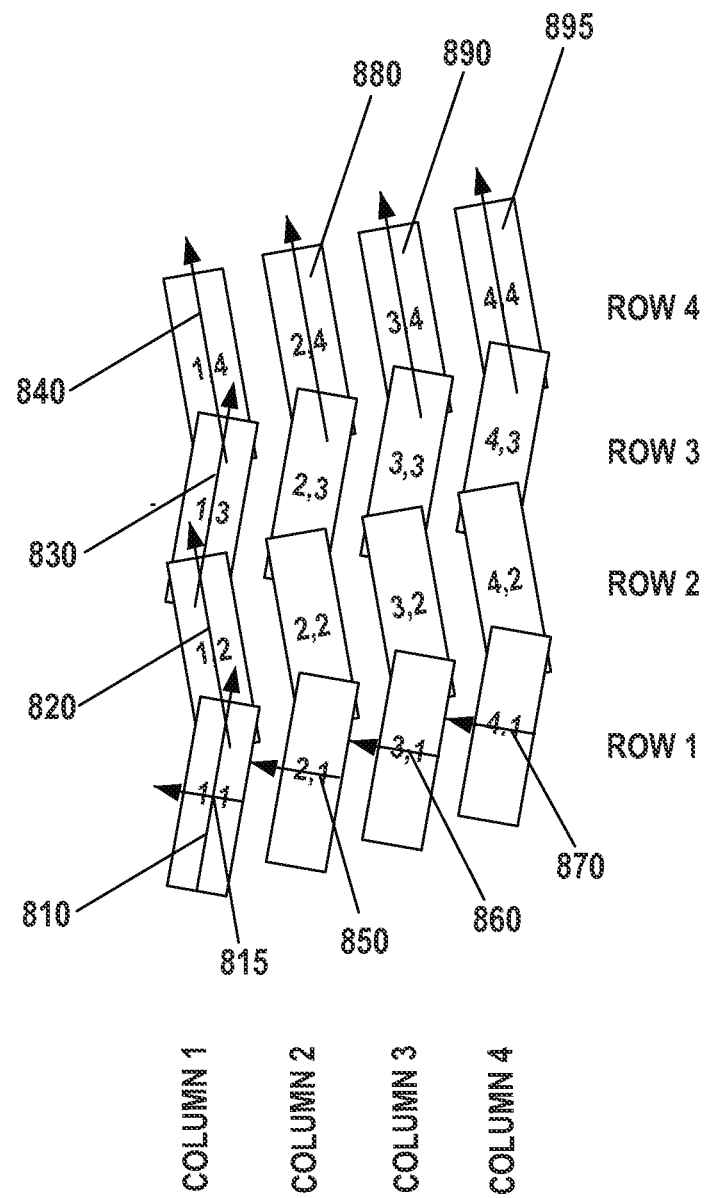
FIG. 8B is a second top view of the plurality of locking teeth shown in FIG. 8A.

In orientation 800 illustrated in FIGS. 8A and 8B, the long axes 390 (FIG. 3B) of adjacent locking teeth disposed in the same column are not aligned. For example, locking teeth 1,1; 1,2; 1,3; and 1,4; comprise long axes 810, 820, 830, and 840, respectively. Long axis 810 is not aligned with long axis 820, which is not aligned with long axis 830, which is not aligned with long axis 840.

In orientation 800, the long axes of the locking teeth in the same row are parallel. Locking teeth 1,4; 2,4; 3,4; and 4,4, are all disposed in row 4, and comprise long axes 840, 880, 890, and 895, respectively. As illustrated in FIG. 8B, long axes 840, 880, 890, and 895, are parallel to one another.

In orientation 800, the short axes 395 (FIG. 3B) of the locking tooth disposed in the same row are not aligned. For example, the locking teeth 1,1; 2,1; 3,1; and 4,1; comprise short axis 815, 850, 860, and 870, respectively, wherein axis 815 is not aligned with axis 850, which is not aligned with axis 860, which is not aligned with axis 870.

Figure 9A:
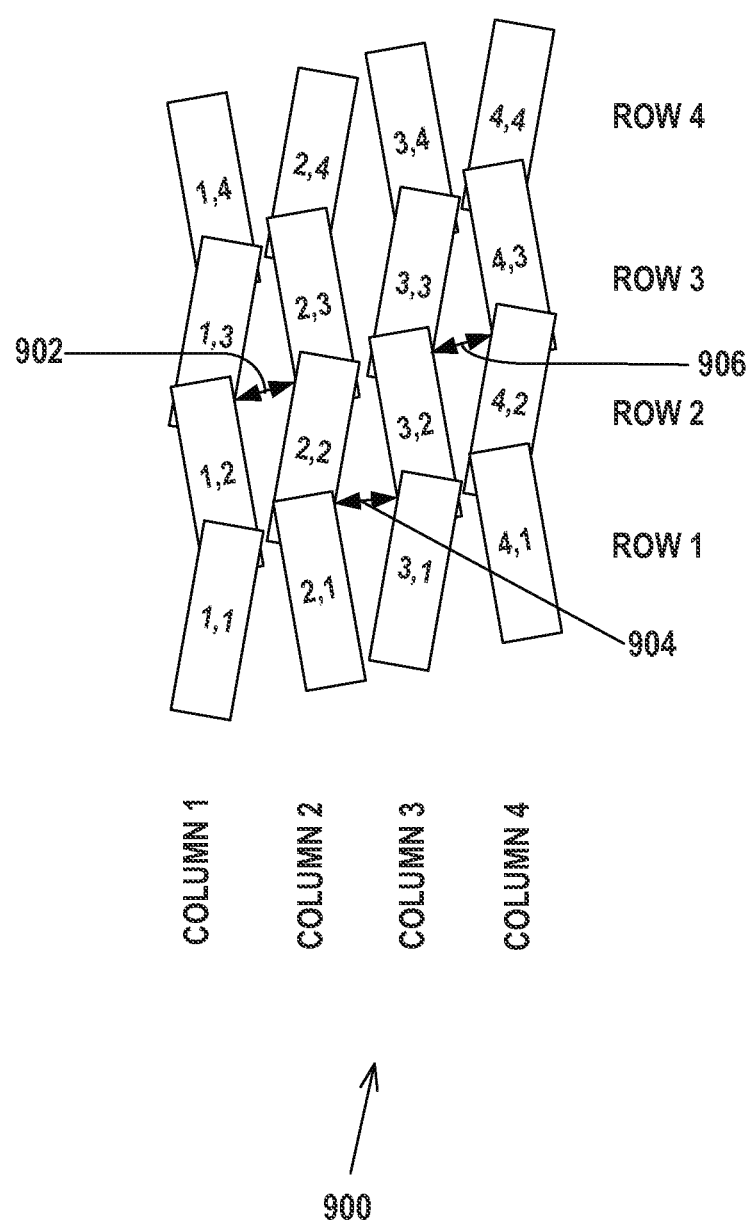
FIG. 9A is a first top view of the plurality of Applicants' locking teeth arranged in a sixth orientation.

FIG. 9A shows a portion of plurality of Applicant's locking teeth, wherein that plurality of locking teeth comprises orientation 900. In certain embodiments, each of the plurality of locking teeth shown in FIG. 9A comprises a locking tooth 300. In certain embodiments, each of the plurality of locking teeth shown in FIG. 9A comprises a locking tooth 302. In certain embodiments, each of the plurality of locking teeth shown in FIG. 9A comprises a locking tooth 304. In certain embodiments, each of the plurality of locking teeth shown in FIG. 9A comprises a locking tooth 306. In certain embodiments, each of the plurality of locking teeth shown in FIG. 9A is selected from the group consisting of a locking tooth 300, a locking tooth 302, a locking tooth 304, and a locking tooth 306.

In the illustrated embodiment of FIG. 9A, the plurality of locking teeth are arranged in columns and rows, namely columns 1, 2, 3, and 4, and rows 1, 2, 3, and 4. In the illustrated embodiment of FIG. 9A, locking tooth 1,1 for example is disposed in column 1 and row 1. For the sake of clarity, FIG. 9A shows a total of 16 locking teeth. In actual implementation, Applicant's plurality of locking teeth 210 comprises between about one hundred, and about ten thousand individual locking teeth.

The locking teeth comprising column 1 are separated from the locking teeth comprising column 2 by a maximum spacing 902. In certain embodiments, maximum spacing 902 is substantially the same as the width 380 (FIG. 3A) of the individual locking teeth. By "substantially the same," Applicant means within plus or minus ten percent (10%). In other embodiments, maximum spacing 902 is less than width 380. In still other embodiments, maximum spacing 902 is greater than width 380.

Similarly, column 2 and 3 are separated by spacing maximum 904, and column 3 and column 4 are separated by maximum spacing 906. In certain embodiments, maximum spacing 904 is substantially the same as the width 380 (FIG. 3A) of the individual locking teeth. In other embodiments, maximum spacing 904 is less than width 380. In still other embodiments, maximum spacing 904 is greater than width 380. In certain embodiments, maximum spacing 906 is substantially the same as the width 380 (FIG. 3A) of the individual locking teeth. In other embodiments, maximum spacing 906 is less than width 380. In still other embodiments, maximum spacing 906 is greater than width 380.

Figure 9B:
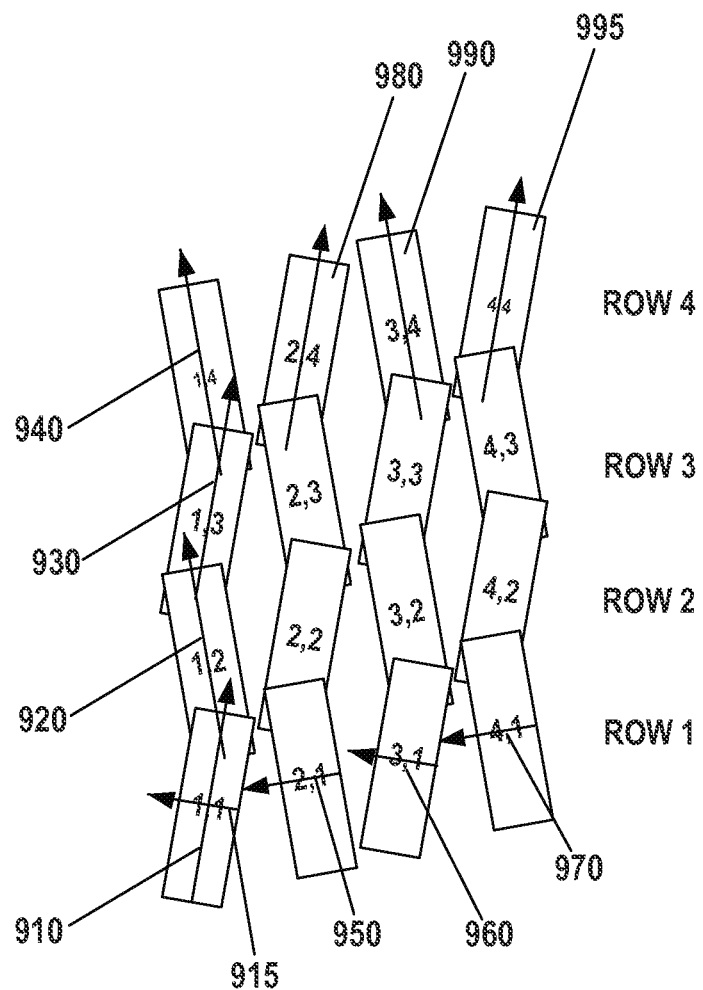
FIG. 9B is a second top view of the plurality of locking teeth shown in FIG. 9A.

In orientation 900 illustrated in FIGS. 9A and 9B, the long axes 390 (FIG. 3B) of adjacent locking teeth disposed in the same column are not aligned. For example, locking teeth 1,1; 1,2; 1,3; and 1,4; comprise long axes 910, 920, 930, and 940, respectively. Long axis 910 is not aligned with long axis 920, which is not aligned with long axis 930, which is not aligned with long axis 940.

In orientation 900, the long axes of the locking teeth in the same row are not parallel. Locking teeth 1,4; 2,4; 3,4; and 4,4, are all disposed in row 4, and comprise long axes 940, 980, 990, and 995, respectively. As illustrated in FIG. 8B, long axis 940 is not parallel with long axis 980, which is not parallel with long axis 990, which is not parallel with long axis 995, Alternate long axes, such as long axes 940 and 990 and long axes 980 and 995, are parallel to one another.

In orientation 900, the short axes 395 (FIG. 3B) of the locking teeth disposed in the same row are not aligned. For example, the locking teeth 1,1; 2,1; 3,1; and 4,1; comprise short axis 915, 950, 960, and 970, respectively, wherein axis 915 is not aligned with axis 950, which is not aligned with axis 960, which is not aligned with axis 970.

Figure 10A:
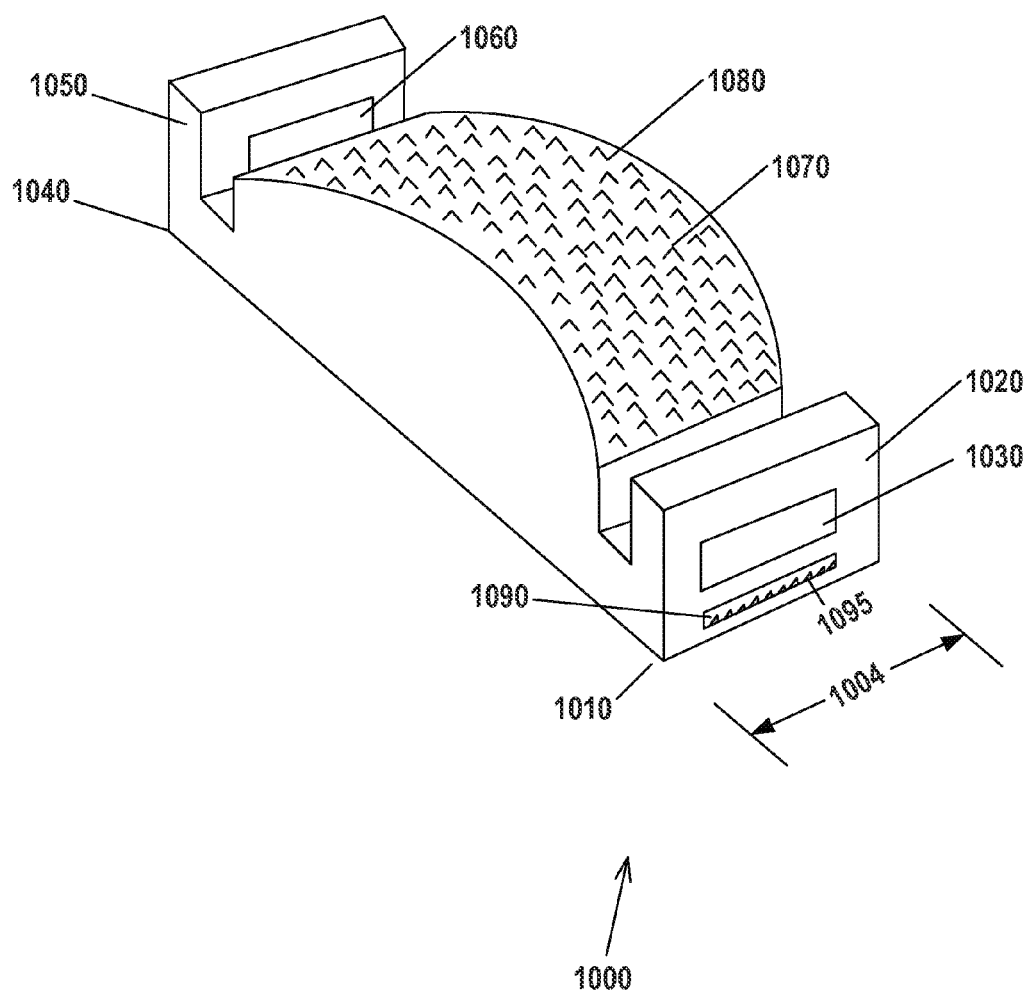
FIG. 10A is a perspective view of Applicant's fixturing apparatus 1000.

Referring now to FIGS. 10A and 10C, fixturing buckle 1000 comprises length 1002 and width 1004. In certain embodiments, length 1002 is between about 0.05 inches and about 14 inches. Width 1004 is between about 0.01 inches and about 6.5 inches.

Fixturing buckle 1000 further comprises first end 1010 comprising member 1020 which is formed to include aperture 1030 extending therethrough. Fixturing buckle 1000 further comprises second end 1040 comprising member 1050 formed to include aperture 1060 extending therethrough. Members 1020 and 1050 comprise a height 1005 and width 1004. Height 1005 is between about 0.05 inches and about 6.5 inches.

Fixturing buckle 1000 further comprises curved fixturing surface 1070 disposed between members 1020 and 1050, wherein the ends of fixturing surface comprise a height 1006, and wherein the midpoint of fixturing surface 1070 comprises a height 1008, wherein height 1008 is greater than height 1005.

A plurality of locking teeth 1080 are disposed on fixturing surface 1070 such that each of Applicant's locking teeth extend upwardly from surface 1070. In certain embodiments, each of the plurality of locking teeth 1080 comprises a locking tooth 300. In certain embodiments, each of the plurality of locking teeth 1080 comprises a locking tooth 302. In certain embodiments, each of the plurality of locking teeth 1080 comprises a locking tooth 304. In certain embodiments, each of the plurality of locking teeth 1080 comprises a locking tooth 306. In certain embodiments, each of the plurality of locking teeth 1080 is selected from the group consisting of a locking tooth 300, a locking tooth 302, a locking tooth 304, and a locking tooth 306.

In certain embodiments, plurality of locking teeth 1080 comprise orientation 400. In certain embodiments, plurality of locking teeth 1080 comprise orientation 500. In certain embodiments, plurality of locking teeth 1080 comprise orientation 600. In certain embodiments, plurality of locking teeth 1080 comprise orientation 700. In certain embodiments, plurality of locking teeth 1080 comprise orientation 800. In certain embodiments, plurality of locking teeth 1080 comprise orientation 900.

A flexible strap, as defined herein, comprising a plurality of loop fasteners 130 (FIG. 1B) disposed on both ends may be threaded through the apertures 1030 and 1060. The flexible strap can be pulled until tight. In certain embodiments, fixturing buckle 1000 further comprises channel 1090 and second plurality of locking teeth 1095 to capture one end of the strap.

Figure 10B:
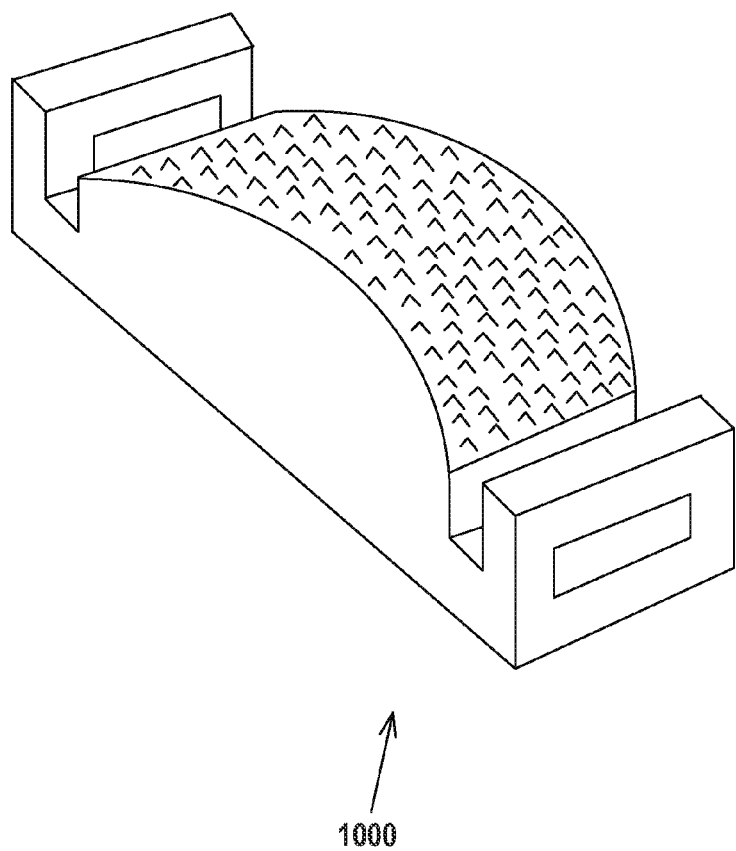
FIG. 10B is a perspective view of a second embodiment of Applicant's fixturing apparatus 1000.

Referring to FIG. 10B, fixturing buckle 1001 comprises the elements of fixturing buckle 1000 with the exception of channel 1090 and second plurality of locking teeth 1095.

Figure 11B:
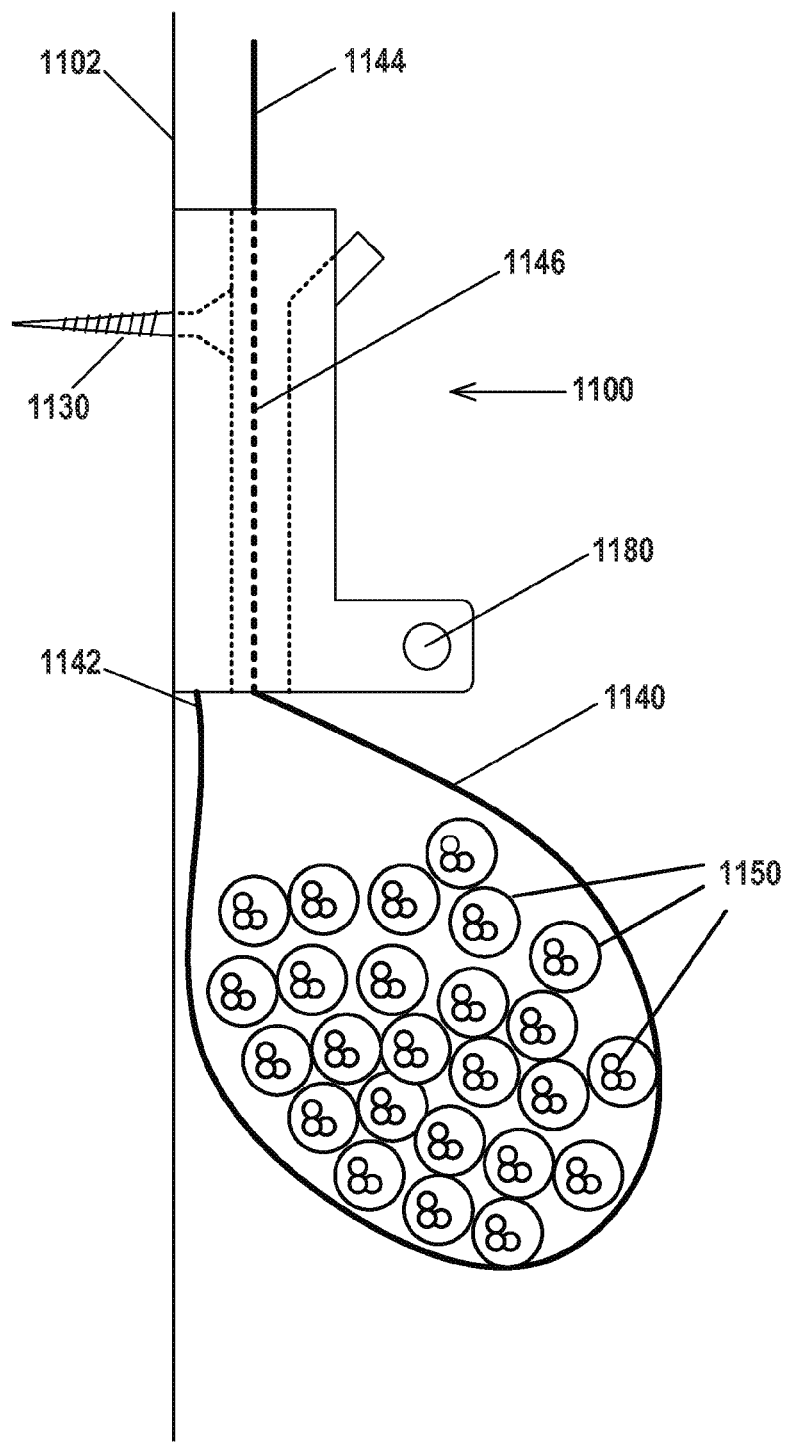
FIG. 11B is a side view of the fixturing apparatus of FIG. 11A shown organizing a plurality of cables.

FIGS. 11A and 11B illustrate Applicant's fixturing apparatus 1100. Assembly 1100 comprises base unit 1110 and fixturing platform 1120 which is pivotably mounted to base unit 1110 using bolt 1180. Base unit is formed to include channel 1115, wherein channel 1115 is dimensioned to accept fixturing platform 1120. Base unit 1110 can be attached to a surface, such as a wall 1102, using attachment means 1130. In the illustrated embodiment of FIGS. 11A and 11B, attachment means 1130 comprises a screw. As those skilled in the art will appreciate, attachment means may 1130 may comprise a screw, nail, bolt, staple, rivet, and the like.

Fixturing platform 1120 comprises fixturing surface 1160. A plurality of locking teeth 1170 are disposed on fixturing surface 1160 such that each of Applicant's locking teeth extend upwardly from surface 1160. In certain embodiments, each of the plurality of locking teeth 1170 comprises a locking tooth 300. In certain embodiments, each of the plurality of locking teeth 1170 comprises a locking tooth 302. In certain embodiments, each of the plurality of locking teeth 1170 comprises a locking tooth 304. In certain embodiments, each of the plurality of locking teeth 1170 comprises a locking tooth 306. In certain embodiments, each of the plurality of locking teeth 1170 is selected from the group consisting of a locking tooth 300, a locking tooth 302, a locking tooth 304, and a locking tooth 306.

In certain embodiments, plurality of locking teeth 1170 comprise orientation 400. In certain embodiments, plurality of locking teeth 1170 comprise orientation 500. In certain embodiments, plurality of locking teeth 1170 comprise orientation 600. In certain embodiments, plurality of locking teeth 1170 comprise orientation 700. In certain embodiments, plurality of locking teeth 1170 comprise orientation 800. In certain embodiments, plurality of locking teeth 1170 comprise orientation 900.

FIG. 11B illustrates strap 1140 encircling a plurality of cables 1150. Strap 1140 comprises a first end 1142 which is attached to a first end of base unit 1110. Strap 1140 is routed through channel 1115 with strap portion 1146 in contact with plurality of locking teeth 1170. Second end 1144 of strap 1140 extends outwardly from a second end of base unit 1110. In use, fixturing platform 1120 is disengaged from base unit 1110, and end 1144 of strap 1140 is pulled upwardly through channel 1115 until strap 1140 tightly encircles plurality of cables 1150. Thereafter, fixturing platform 1120 is rotated into the closed orientation shown in FIG. 11B thereby securing strap portion 1146. In certain embodiments, strap portion 1146 comprises a plurality of loop-type fasteners 130 (FIG. 1B) disposed on the surface in contact with plurality of locking teeth 1170.

Figure 12:
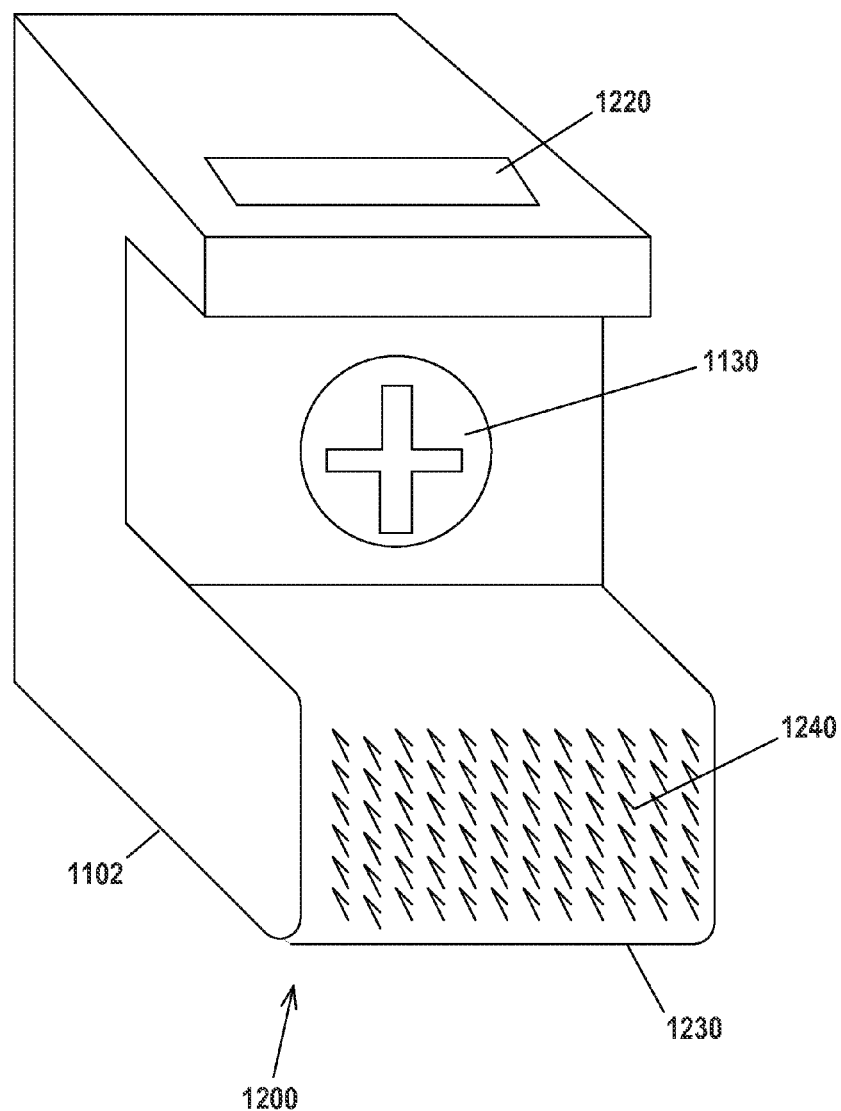
FIG. 12 is a perspective view of Applicant's fixturing apparatus 1200.

FIG. 12 illustrates Applicant's fixturing apparatus 1200. Fixturing apparatus 1200 can be used to, for example and without limitation, organize a plurality of cables 1150 (FIG. 11B). Fixturing apparatus 1200 comprises attachment means 1130 (FIGS. 11A, 11B, 12) to attach assembly 1200 to a surface, such as for example and without limitation a wall, or the inside of a travel case, a rolling cart, and vehicle, and the like.

Fixturing apparatus 1200 comprises fixturing surface 1230. A plurality of locking teeth 1240 are disposed on fixturing surface 1230 such that each of Applicant's locking teeth extend outwardly from surface 1230. In certain embodiments, each of the plurality of locking teeth 1240 comprises a locking tooth 300. In certain embodiments, each of the plurality of locking teeth 1240 comprises a locking tooth 302. In certain embodiments, each of the plurality of locking teeth 1240 comprises a locking tooth 304. In certain embodiments, each of the plurality of locking teeth 1240 comprises a locking tooth 306. In certain embodiments, each of the plurality of locking teeth 1240 is selected from the group consisting of a locking tooth 300, a locking tooth 302, a locking tooth 304, and a locking tooth 306.

In certain embodiments, plurality of locking teeth 1240 comprise orientation 400. In certain embodiments, plurality of locking teeth 1240 comprise orientation 500. In certain embodiments, plurality of locking teeth 1240 comprise orientation 600. In certain embodiments, plurality of locking teeth 1240 comprise orientation 700. In certain embodiments, plurality of locking teeth 1240 comprise orientation 800. In certain embodiments, plurality of locking teeth 1240 comprise orientation 900. In use, a first end of a securing strap, such as strap 1140 is attached to an end 1102 of assembly 1200. That fixturing strap is then disposed around a plurality of cables, and the second end of that strap is threaded through aperture 1220 and pulled tight.

Figure 13:
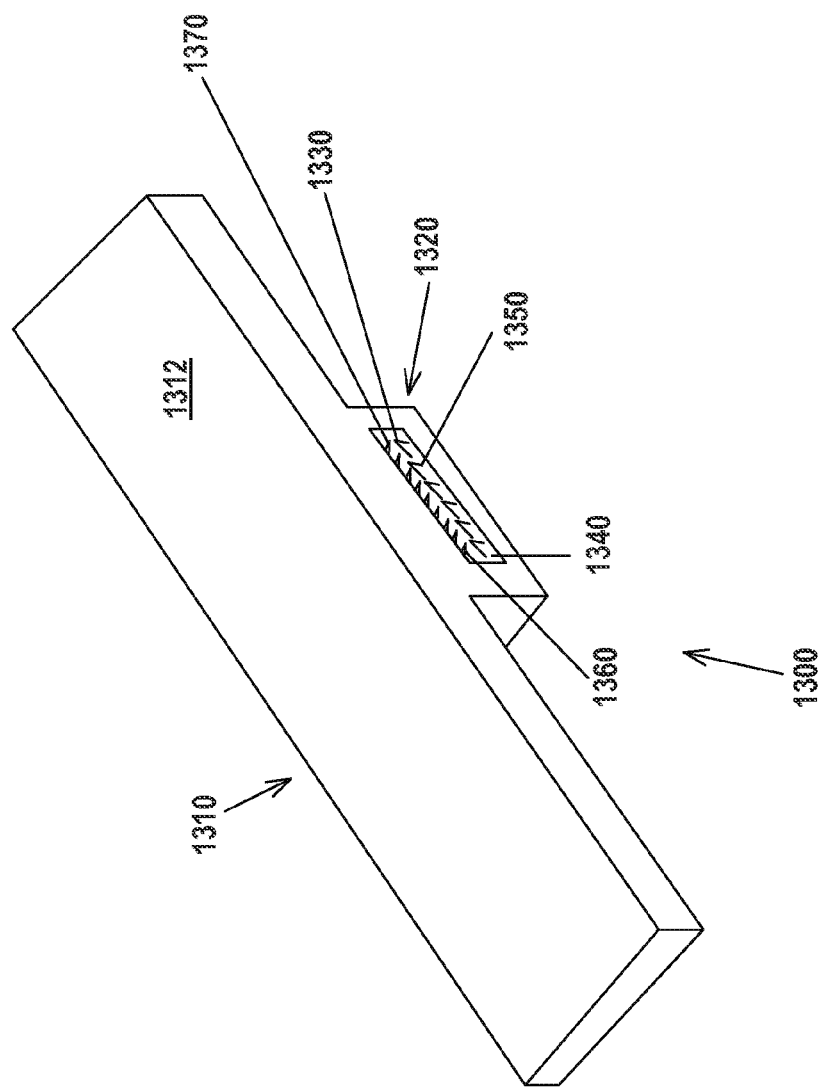
FIG. 13 is a perspective view of Applicant's fixturing apparatus 1300.

FIG. 13 illustrates Applicant's label assembly 1300. Label assembly 1300 comprises member 1310 and locking assembly 1320. Member 1310 comprises a label surface 1312 and an opposing second surface. Locking assembly 1320 is disposed on the second surface of member 1310. Locking assembly 1320 is formed to include aperture 1330 extending therethrough. Fixturing surface 1340 comprises the floor portion of aperture 1330. Fixturing surface 1360 comprises the ceiling portion of aperture 1330.

A plurality of locking teeth 1350 are disposed on fixturing surface 1340. A plurality of locking teeth 1370 are disposed on fixturing surface 1360. Each of Applicant's plurality of locking teeth 1350 and 1370 extend inwardly into aperture 1330 from fixturing surface 1340 and fixturing surface 1360, respectively.

In certain embodiments, each of the plurality of locking teeth 1350 comprises a locking tooth 300. In certain embodiments, each of the plurality of locking teeth 1350 comprises a locking tooth 302. In certain embodiments, each of the plurality of locking teeth 1350 comprises a locking tooth 304. In certain embodiments, each of the plurality of locking teeth 1350 comprises a locking tooth 306. In certain embodiments, each of the plurality of locking teeth 1350 is selected from the group consisting of a locking tooth 300, a locking tooth 302, a locking tooth 304, and a locking tooth 306.

In certain embodiments, each of the plurality of locking teeth 1370 comprises a locking tooth 300. In certain embodiments, each of the plurality of locking teeth 1370 comprises a locking tooth 302. In certain embodiments, each of the plurality of locking teeth 1370 comprises a locking tooth 304. In certain embodiments, each of the plurality of locking teeth 1370 comprises a locking tooth 306. In certain embodiments, each of the plurality of locking teeth 1370 is selected from the group consisting of a locking tooth 300, a locking tooth 302, a locking tooth 304, and a locking tooth 306.

In certain embodiments, plurality of locking teeth 1350 comprise orientation 400. In certain embodiments, plurality of locking teeth 1350 comprise orientation 500. In certain embodiments, plurality of locking teeth 1350 comprise orientation 600. In certain embodiments, plurality of locking teeth 1350 comprise orientation 700. In certain embodiments, plurality of locking teeth 1350 comprise orientation 800. In certain embodiments, plurality of locking teeth 1350 comprise orientation 900.

In certain embodiments, plurality of locking teeth 1370 comprise orientation 400. In certain embodiments, plurality of locking teeth 1370 comprise orientation 500. In certain embodiments, plurality of locking teeth 1370 comprise orientation 600. In certain embodiments, plurality of locking teeth 1370 comprise orientation 700. In certain embodiments, plurality of locking teeth 1370 comprise orientation 800. In certain embodiments, plurality of locking teeth 1370 comprise orientation 900.

Figure 14:
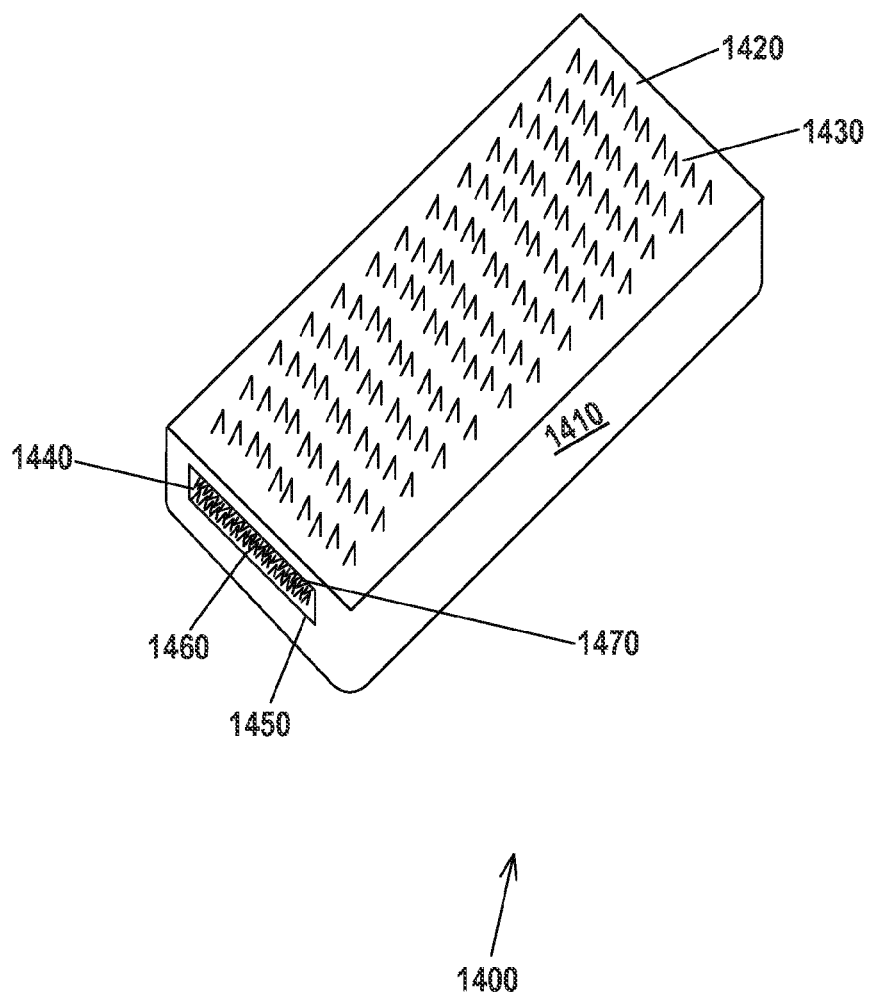
FIG. 14 is a perspective view of Applicant's fixturing apparatus 1400.

FIG. 14 illustrates Applicant's fixturing sleeve assembly 1400. Assembly 1400 comprises member 1410, wherein member 1410 comprises a first fixturing surface 1420, wherein member 1410 is formed to include aperture 1440 extending therethrough.

A first plurality of locking teeth 1430 are disposed on first fixturing surface 1420 and extend outwardly therefrom. In certain embodiments, each of the plurality of locking teeth 1430 comprises a locking tooth 300. In certain embodiments, each of the plurality of locking teeth 1430 comprises a locking tooth 302. In certain embodiments, each of the plurality of locking teeth 1430 comprises a locking tooth 304. In certain embodiments, each of the plurality of locking teeth 1430 comprises a locking tooth 306. In certain embodiments, each of the plurality of locking teeth 1430 is selected from the group consisting of a locking tooth 300, a locking tooth 302, a locking tooth 304, and a locking tooth 306.

In certain embodiments, plurality of locking teeth 1430 comprise orientation 400. In certain embodiments, plurality of locking teeth 1430 comprise orientation 500. In certain embodiments, plurality of locking teeth 1430 comprise orientation 600. In certain embodiments, plurality of locking teeth 1430 comprise orientation 700. In certain embodiments, plurality of locking teeth 1430 comprise orientation 800. In certain embodiments, plurality of locking teeth 1430 comprise orientation 900.

Second fixturing surface 1450 comprises the floor of aperture 1440. Third fixturing surface 1470 comprises the ceiling of aperture 1440. A second plurality and third plurality of locking teeth 1460 are disposed on second fixturing surface 1450 and third fixturing surface 1470, and extend inwardly into aperture 1440 therefrom. In certain embodiments, each of the plurality of locking teeth 1460 comprises a locking tooth 300. In certain embodiments, each of the plurality of locking teeth 1460 comprises a locking tooth 302. In certain embodiments, each of the plurality of locking teeth 1460 comprises a locking tooth 304. In certain embodiments, each of the plurality of locking teeth 1460 comprises a locking tooth 306. In certain embodiments, each of the plurality of locking teeth 1460 is selected from the group consisting of a locking tooth 300, a locking tooth 302, a locking tooth 304, and a locking tooth 306.

In certain embodiments, plurality of locking teeth 1460 comprise orientation 400. In certain embodiments, plurality of locking teeth 1460 comprise orientation 500. In certain embodiments, plurality of locking teeth 1460 comprise orientation 600. In certain embodiments, plurality of locking teeth 1460 comprise orientation 700. In certain embodiments, plurality of locking teeth 1460 comprise orientation 800. In certain embodiments, plurality of locking teeth 1460 comprise orientation 900.

One end of a flexible strap, as described herein, can be threaded through aperture 1440 and fixtured to second plurality and/or third plurality of locking teeth 1460. The strap may then be disposed around, for example and without limitation, a rug, suitcase, box, and the like. The opposite end of the strap may then be fixtured to first plurality of locking teeth 1430.

Figure 15A:
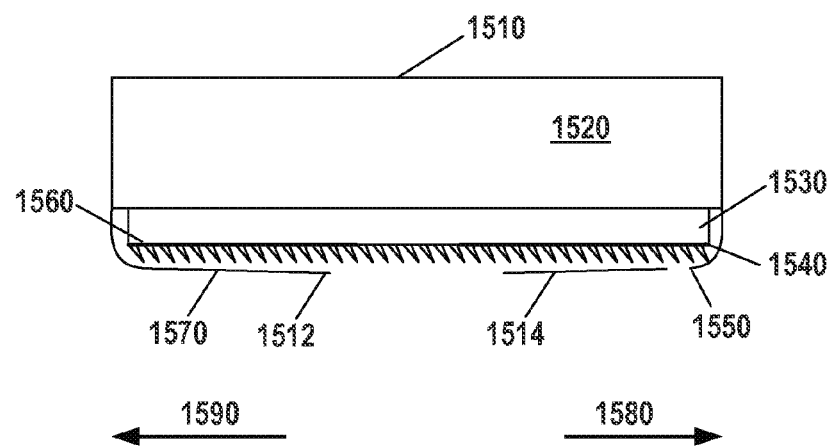
FIG. 15A is a side view showing use of two sets of Applicant's locking teeth used to secure a fabric covering on a furniture item.

Applicant's invention comprises a method using Applicant's gripping teeth to secure a loop-type fabric covering to an item of furniture. Referring to FIG. 15A, furniture item 1500 comprises a cushion portion 1520 and a wood base portion 1530 attached to the bottom portion of cushion 1520. Fabric 1510 is disposed around cushion 1520 and base 1530. First fixturing surface 1540 and second fixturing surface 1560 are each disposed on the bottom portion of base 1530.

In certain embodiments, first fixturing surface 1540 and second fixturing surface 1560 are attached by conventional attachment means such as, but not limited to, snaps, buckles, staples, and the like. In other embodiments, first fixturing surface 1540 and second fixturing surface 1560 comprise an adhesive-backed tape wherein locking teeth 1550 are molded to the adhesive tape to form one integral attachment means.

Figure 15B:
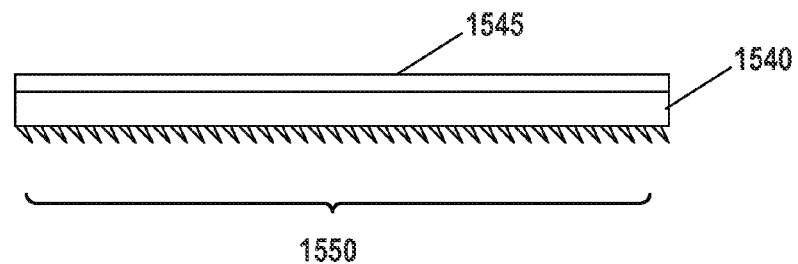
FIG. 15B is a side view of a first portion of FIG. 15A.

Referring now to FIG. 15B, in certain embodiments first fixturing surface 1540 comprises a flexible tape having an adhesive 1545 disposed on a first side, and a plurality of locking teeth 1550 disposed on, and extending outwardly, from the opposing side.

Referring now to FIGS. 15A and 15B, a first plurality of locking teeth 1550 are disposed on first fixturing surface 1540 and extend outwardly therefrom. The first plurality of locking teeth 1550 comprise a first fixturing direction 1580.

In certain embodiments, each of the plurality of locking teeth 1550 comprises a locking tooth 300. In certain embodiments, each of the plurality of locking teeth 1550 comprises a locking tooth 302. In certain embodiments, each of the plurality of locking teeth 1550 comprises a locking tooth 304. In certain embodiments, each of the plurality of locking teeth 1550 comprises a locking tooth 306. In certain embodiments, each of the plurality of locking teeth 1550 is selected from the group consisting of a locking tooth 300, a locking tooth 302, a locking tooth 304, and a locking tooth 306.

In certain embodiments, plurality of locking teeth 1550 comprise orientation 400. In certain embodiments, plurality of locking teeth 1550 comprise orientation 500. In certain embodiments, plurality of locking teeth 1550 comprise orientation 600. In certain embodiments, plurality of locking teeth 1550 comprise orientation 700. In certain embodiments, plurality of locking teeth 1550 comprise orientation 800. In certain embodiments, plurality of locking teeth 1550 comprise orientation 900.

Figure 15C:
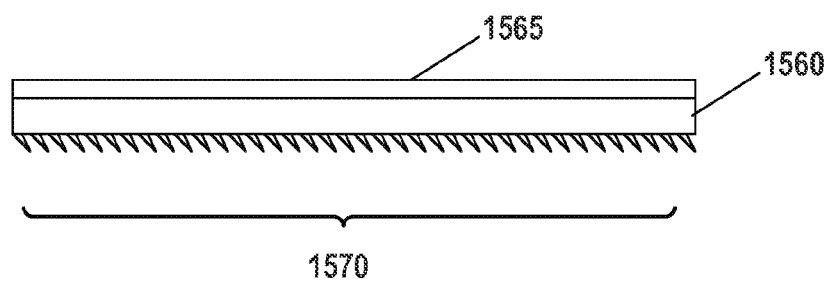
FIG. 15C is a side view of a second portion of FIG. 15A.

Referring now to FIG. 15C, in certain embodiments second fixturing surface 1560 comprises a flexible tape having an adhesive 1565 disposed on a first side, and a plurality of locking teeth 1570 disposed on, and extending outwardly, from the opposing side.

Referring now to FIGS. 15A and 15C, a second plurality of locking teeth 1570 are disposed on second fixturing surface 1560 and extend outwardly therefrom. The second plurality of locking teeth 1570 comprise a second fixturing direction 1590, wherein that second fixturing direction is opposite to the first fixturing direction 1580. In certain embodiments, each of the plurality of locking teeth 1570 comprises a locking tooth 300. In certain embodiments, each of the plurality of locking teeth 1570 comprises a locking tooth 302. In certain embodiments, each of the plurality of locking teeth 1570 comprises a locking tooth 304. In certain embodiments, each of the plurality of locking teeth 1570 comprises a locking tooth 306. In certain embodiments, each of the plurality of locking teeth 1570 is selected from the group consisting of a locking tooth 300, a locking tooth 302, a locking tooth 304, and a locking tooth 306.

In certain embodiments, plurality of locking teeth 1570 comprise orientation 400. In certain embodiments, plurality of locking teeth 1570 comprise orientation 500. In certain embodiments, plurality of locking teeth 1570 comprise orientation 600. In certain embodiments, plurality of locking teeth 1570 comprise orientation 700. In certain embodiments, plurality of locking teeth 1570 comprise orientation 800. In certain embodiments, plurality of locking teeth 1570 comprise orientation 900.

In the illustrated embodiment of FIG. 15A, end 1514 of fabric 1510 is fixtured to first plurality of locking teeth 1550. In the illustrated embodiment of FIG. 15A, end 1512 of fabric 1510 is fixtured to second plurality of locking teeth 1570.

Figure 16A:
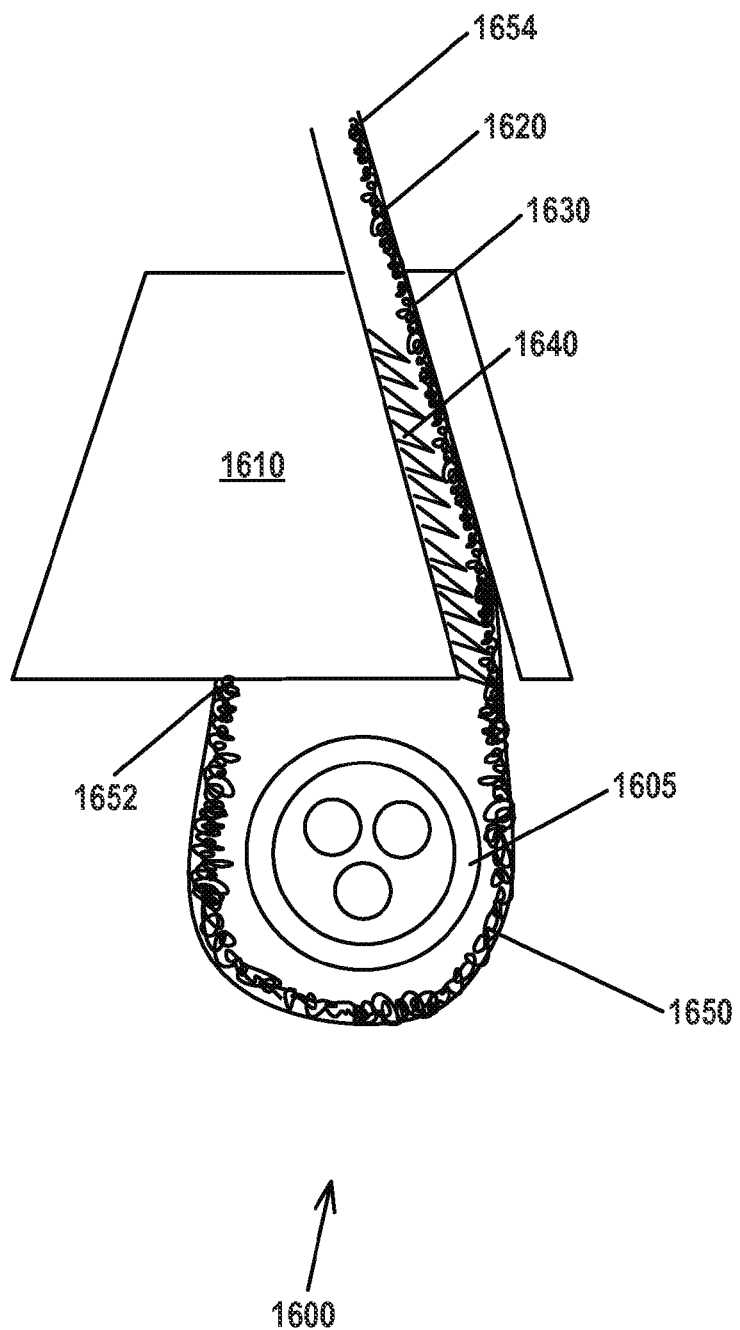
FIG. 16A is a side view of first embodiment of Applicant's fixturing apparatus 1600.
Figure 16B:
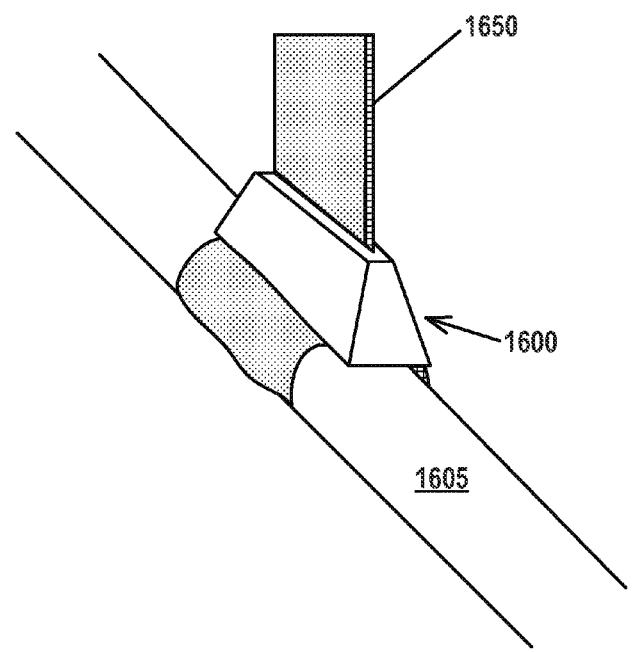
FIG. 16B is a perspective view of the fixturing apparatus of FIGS. 16A and 16C.
Figure 16C:
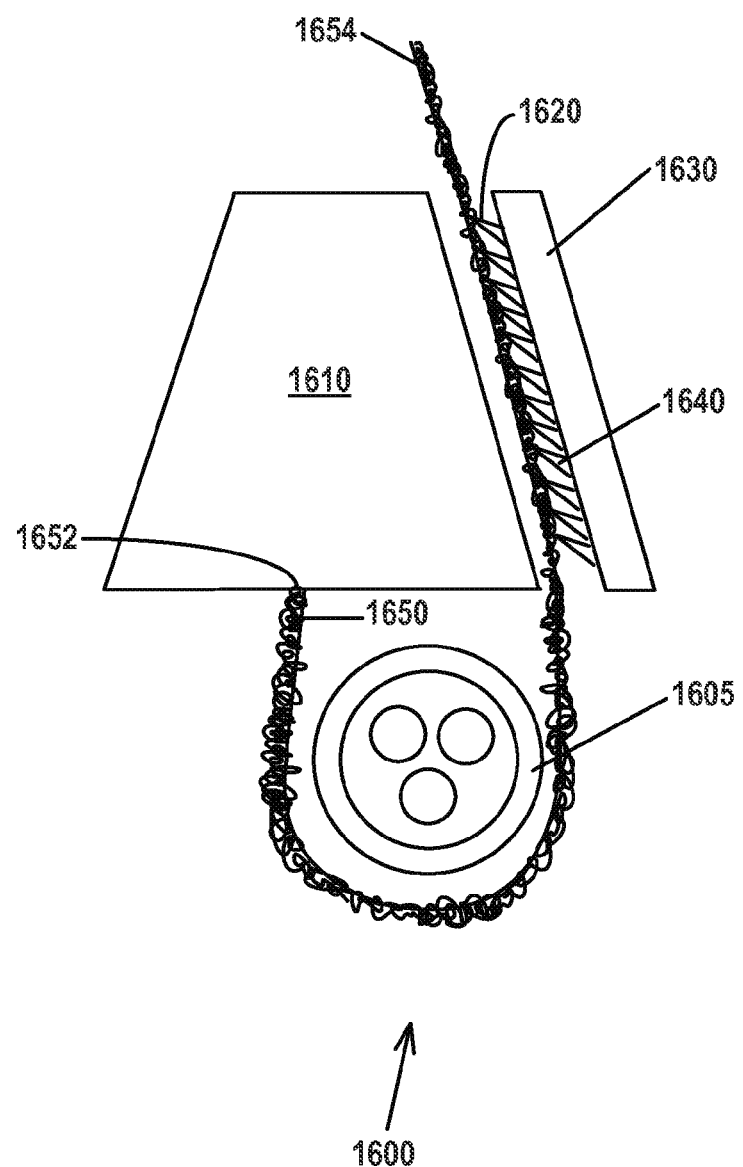
FIG. 16C is a is a side view of second embodiment of Applicant's fixturing apparatus 1600.

FIG. 16A illustrates one embodiment of support assembly 1600, and FIG. 16C illustrates a second embodiment of support assembly 1600. Referring now to FIGS. 16A, 16B, and 16C, support assembly 1600 comprises member 1610 which is formed to include aperture 1620 extending therethrough. Assembly 1600 further comprises a securing strap 1650, wherein that strap comprises first end 1652 and a second end 1654, wherein first end 1652 is attached to member 1610.

A plurality of gripping teeth 1640 are disposed on a portion of the wall 1630 defining aperture 1620. In certain embodiments, each of the plurality of locking teeth 1640 comprises a locking tooth 300. In certain embodiments, each of the plurality of locking teeth 1640 comprises a locking tooth 302. In certain embodiments, each of the plurality of locking teeth 1640 comprises a locking tooth 304. In certain embodiments, each of the plurality of locking teeth 1640 comprises a locking tooth 306. In certain embodiments, each of the plurality of locking teeth 1640 is selected from the group consisting of a locking tooth 300, a locking tooth 302, a locking tooth 304, and a locking tooth 306.

In certain embodiments, plurality of locking teeth 1640 comprise orientation 400. In certain embodiments, plurality of locking teeth 1640 comprise orientation 500. In certain embodiments, plurality of locking teeth 1640 comprise orientation 600. In certain embodiments, plurality of locking teeth 1640 comprise orientation 700. In certain embodiments, plurality of locking teeth 1640 comprise orientation 800. In certain embodiments, plurality of locking teeth 1640 comprise orientation 900.

In the illustrated embodiments of FIGS. 16A, 16B, and 16C, strap 1650 is disposed around conduit 1605, and end 1654 of strap 1650 has been threaded through aperture 1620 thereby fixturing conduit 1605 to support assembly 1600.

Figure 17A:
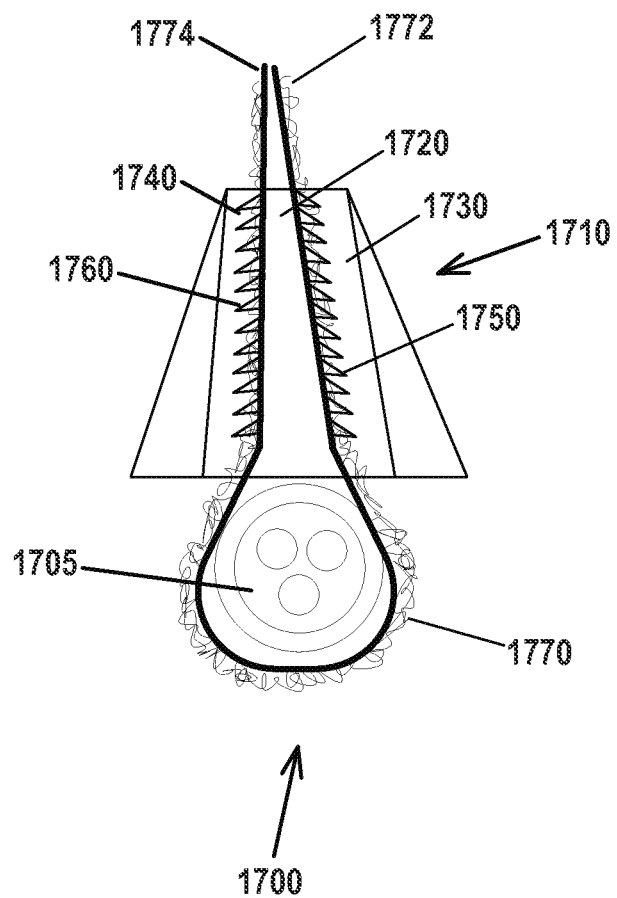
FIG. 17A is a side view of Applicant's fixturing apparatus 1700.
Figure 17B:
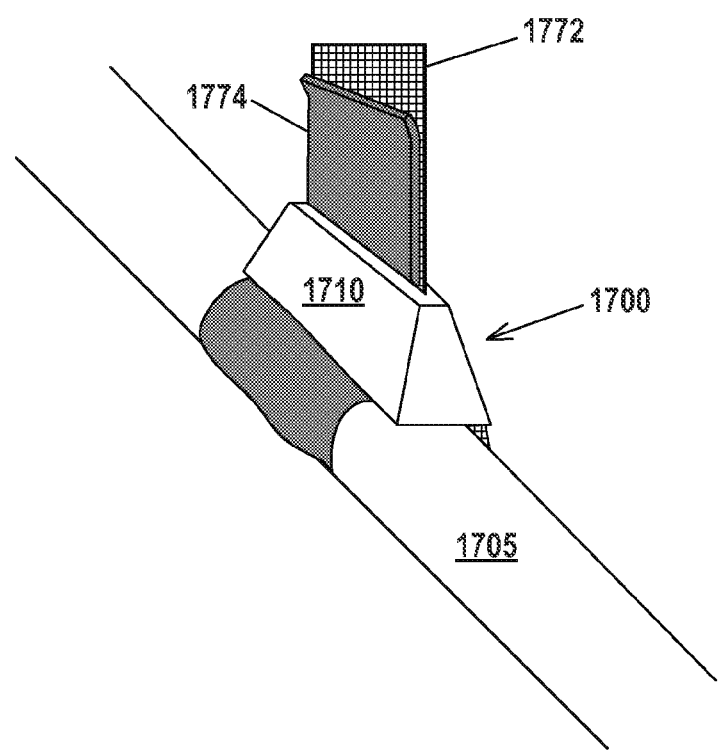
FIG. 17B is a perspective view of the fixturing apparatus of FIG. 17A.

FIGS. 17A and 17B illustrate Applicants' support assembly 1700. Assembly 1700 comprises member 1710 which is formed to include aperture 1720 extending therethrough. First fixturing surface 1730 comprises a first portion of the wall defining aperture 1720. Second fixturing surface 1740 comprises a second portion of the wall defining aperture 1720.

A first plurality of locking teeth 1750 are disposed on first fixturing surface 1730 and extend inwardly into aperture 1720 therefrom. In certain embodiments, each of the plurality of locking teeth 1750 comprises a locking tooth 300. In certain embodiments, each of the plurality of locking teeth 1750 comprises a locking tooth 302. In certain embodiments, each of the plurality of locking teeth 1750 comprises a locking tooth 304. In certain embodiments, each of the plurality of locking teeth 1750 comprises a locking tooth 306. In certain embodiments, each of the plurality of locking teeth 1750 is selected from the group consisting of a locking tooth 300, a locking tooth 302, a locking tooth 304, and a locking tooth 306.

In certain embodiments, plurality of locking teeth 1750 comprise orientation 400. In certain embodiments, plurality of locking teeth 1750 comprise orientation 500. In certain embodiments, plurality of locking teeth 1750 comprise orientation 600. In certain embodiments, plurality of locking teeth 1750 comprise orientation 700. In certain embodiments, plurality of locking teeth 1750 comprise orientation 800. In certain embodiments, plurality of locking teeth 1750 comprise orientation 900.

A second plurality of locking teeth 1760 are disposed on second fixturing surface 1740 and extend inwardly into aperture 1720 therefrom. In certain embodiments, each of the plurality of locking teeth 1760 comprises a locking tooth 300. In certain embodiments, each of the plurality of locking teeth 1760 comprises a locking tooth 302. In certain embodiments, each of the plurality of locking teeth 1760 comprises a locking tooth 304. In certain embodiments, each of the plurality of locking teeth 1760 comprises a locking tooth 306. In certain embodiments, each of the plurality of locking teeth 1760 is selected from the group consisting of a locking tooth 300, a locking tooth 302, a locking tooth 304, and a locking tooth 306.

In certain embodiments, plurality of locking teeth 1760 comprise orientation 400. In certain embodiments, plurality of locking teeth 1760 comprise orientation 500. In certain embodiments, plurality of locking teeth 1760 comprise orientation 600. In certain embodiments, plurality of locking teeth 1760 comprise orientation 700. In certain embodiments, plurality of locking teeth 1760 comprise orientation 800. In certain embodiments, plurality of locking teeth 1760 comprise orientation 900.

In the illustrated embodiment of FIGS. 17A and 17B, strap 1770 comprising ends 1772 and 1774 is disposed around conduit 1705. First end 1772 of strap 1770 is shown threaded through aperture 1720 such that a portion of strap 1770 contacts the first plurality of locking teeth 1750. Second end 1774 of strap 1770 is shown threaded through aperture 1720 such that a portion of strap 1770 contacts second plurality of locking teeth 1760.

Figure 18A:
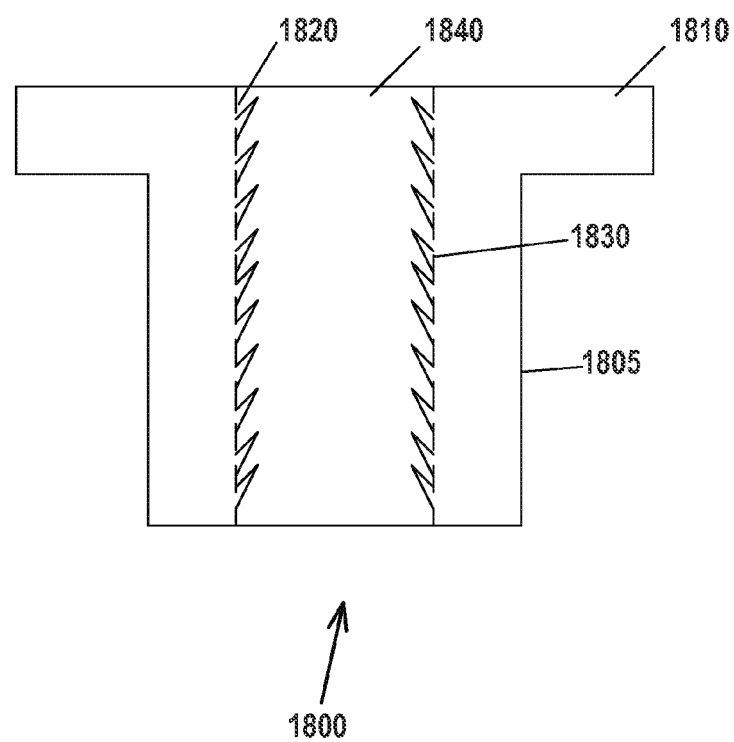
FIG. 18A is a side view of Applicant's fixturing apparatus 1800.
Figure 18B:
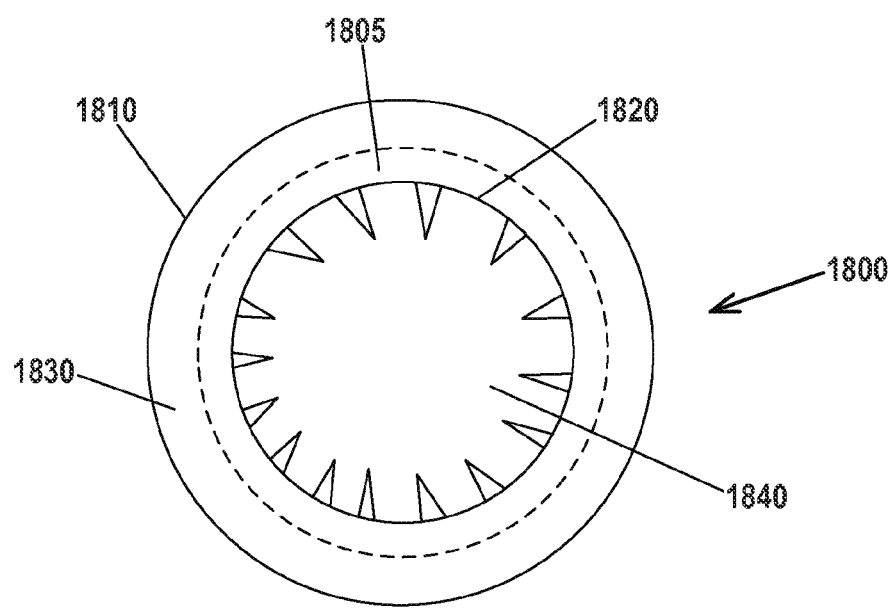
FIG. 18B is a top view of the fixturing apparatus of FIG. 18A.

FIGS. 18A and 18B illustrate Applicant's fixturing apparatus 1800. Fixturing apparatus 1800 is designed to organize a plurality of cables and the like passing through an aperture in a desk, ceiling, and the like. The plurality of cables are first wrapped in a VELCRO loop fabric with the loop side facing outwardly. The bundled plurality of cables is then passed through aperture 1840, such that the VELCRO wrap is fixtured by the plurality of locking teeth 1830, and therefore, remains in place encircling the plurality of cables.

Assembly 1800 comprises tubular member 1805 having flange 1810 disposed around one end. Tubular member 1805 is formed to comprise aperture 1840 extending therethrough. Fixturing surface 1820 comprises the wall defining aperture 1840.

A plurality of locking teeth 1830 are disposed on fixturing surface 1820 and extend inwardly into aperture 1840. In certain embodiments, each of the plurality of locking teeth 1830 comprises a locking tooth 300. In certain embodiments, each of the plurality of locking teeth 1830 comprises a locking tooth 302. In certain embodiments, each of the plurality of locking teeth 1830 comprises a locking tooth 304. In certain embodiments, each of the plurality of locking teeth 1830 comprises a locking tooth 306. In certain embodiments, each of the plurality of locking teeth 1830 is selected from the group consisting of a locking tooth 300, a locking tooth 302, a locking tooth 304, and a locking tooth 306.

In certain embodiments, plurality of locking teeth 1830 comprise orientation 400. In certain embodiments, plurality of locking teeth 1830 comprise orientation 500. In certain embodiments, plurality of locking teeth 1830 comprise orientation 600. In certain embodiments, plurality of locking teeth 1830 comprise orientation 700. In certain embodiments, plurality of locking teeth 1830 comprise orientation 800. In certain embodiments, plurality of locking teeth 1830 comprise orientation 900.

Figure 19A:
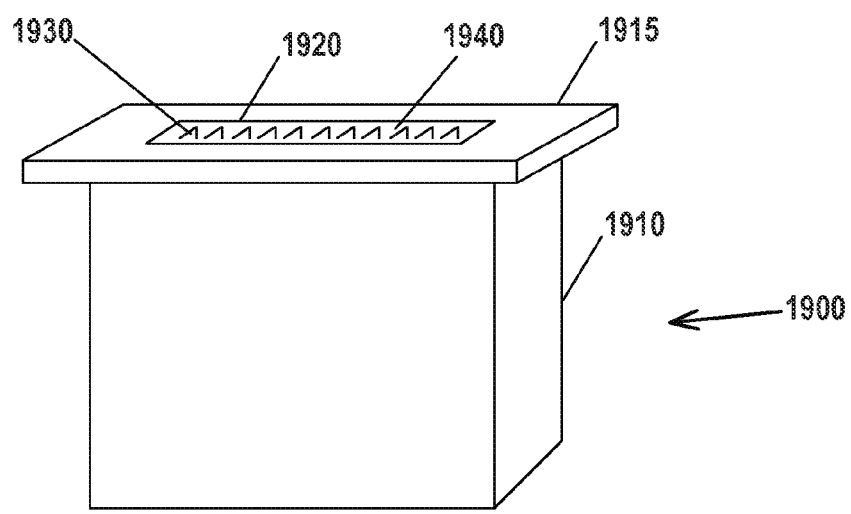
FIG. 19A illustrates Applicant's fixturing apparatus 1900.

Referring now to FIG. 19A, fixturing apparatus 1900 comprises a rectangular body 1910 formed to include rectangular aperture 1940 extending therethrough. Fixturing apparatus 1900 serves the same function as does fixturing apparatus 1800. Fixturing apparatus 1900 differs from apparatus 1800 in shape only. Flange portion 1915 is disposed on a first end of rectangular body 1910. Fixturing apparatus 1900 further comprises fixturing surface 1920, wherein fixturing surface 1920 comprises one or more of the walls defining rectangular aperture 1940.

A plurality of locking teeth 1930 are disposed on fixturing surface 1920 and extend inwardly into aperture 1940. In certain embodiments, each of the plurality of locking teeth 1930 comprises a locking tooth 300. In certain embodiments, each of the plurality of locking teeth 1930 comprises a locking tooth 302. In certain embodiments, each of the plurality of locking teeth 1930 comprises a locking tooth 304. In certain embodiments, each of the plurality of locking teeth 1930 comprises a locking tooth 306. In certain embodiments, each of the plurality of locking teeth 1930 is selected from the group consisting of a locking tooth 300, a locking tooth 302, a locking tooth 304, and a locking tooth 306.

In certain embodiments, plurality of locking teeth 1930 comprise orientation 400. In certain embodiments, plurality of locking teeth 1930 comprise orientation 500. In certain embodiments, plurality of locking teeth 1930 comprise orientation 600. In certain embodiments, plurality of locking teeth 1930 comprise orientation 700. In certain embodiments, plurality of locking teeth 1930 comprise orientation 800. In certain embodiments, plurality of locking teeth 1930 comprise orientation 900.

Figure 19B:
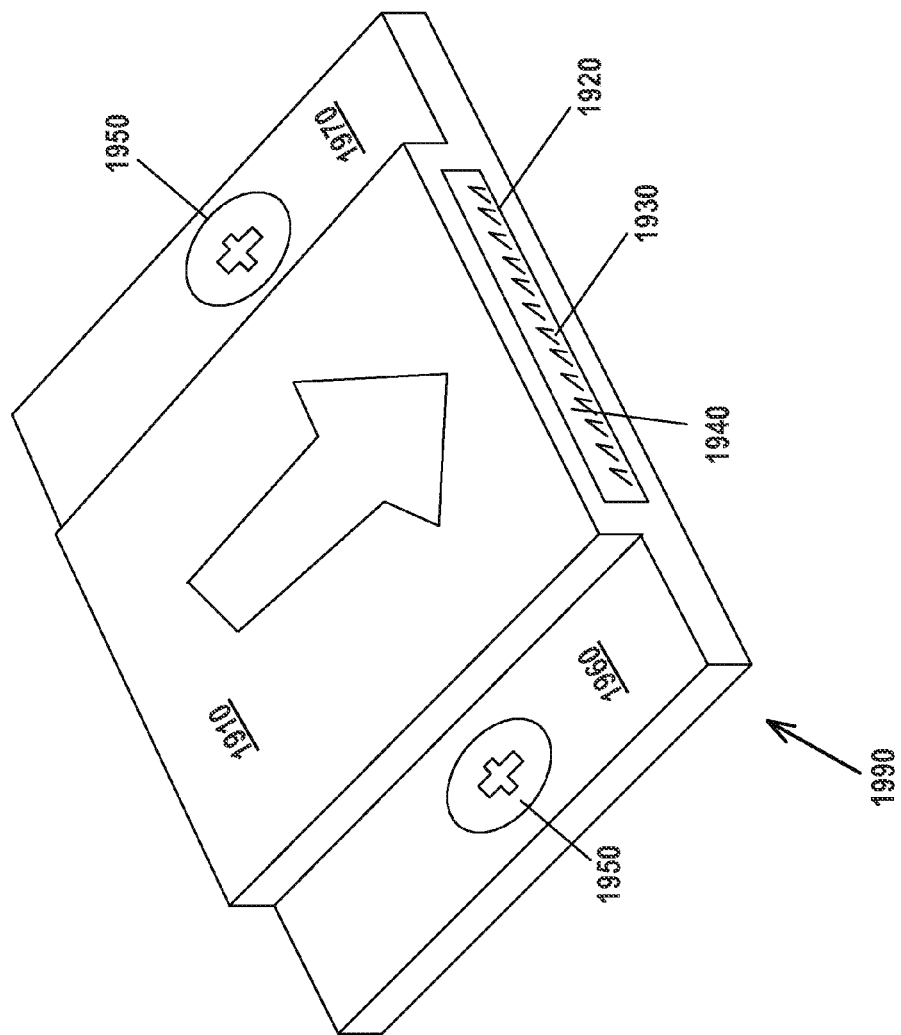
FIG. 19B is a perspective view of fixturing apparatus 1990.

FIG. 19B illustrates fixturing apparatus 1990. Fixturing apparatus 1990 fixtures in place a VELCRO strap comprising a plurality of loop-type fasteners. First planar member 1960 is attached to and extends outwardly from a first side of rectangular body 1910, and wherein a second planar member 1970 is attached to and extends outwardly from the opposing side of rectangular body 1910. In the illustrated embodiment of FIG. 19B, screws 1950 can be used to secure the fixturing apparatus of FIG. 19B to a planar surface.

Figure 20A:
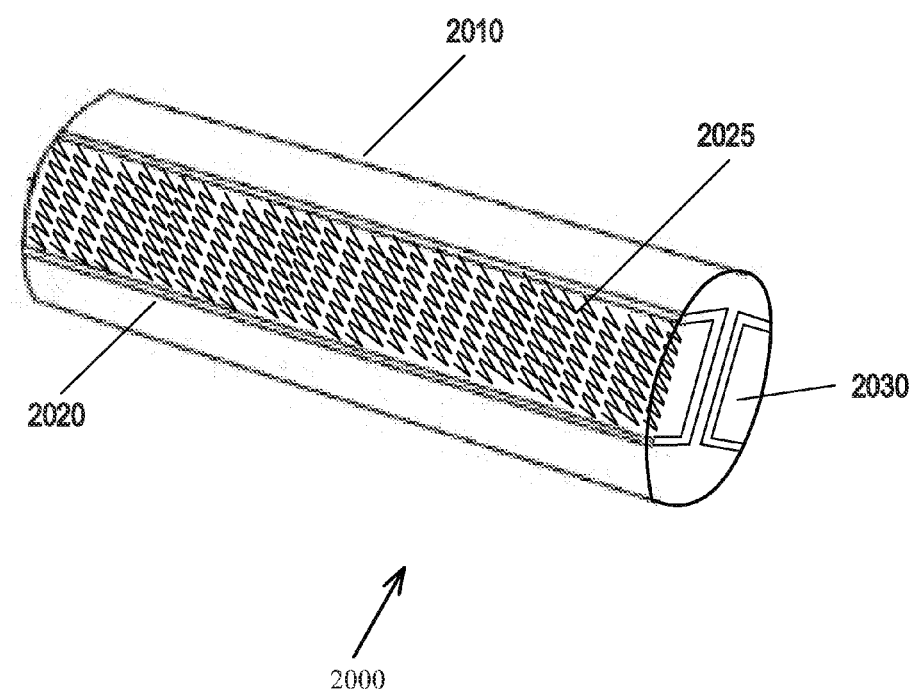
FIG. 20A is a perspective view of Applicant's fixturing apparatus 2000.
Figure 20B:
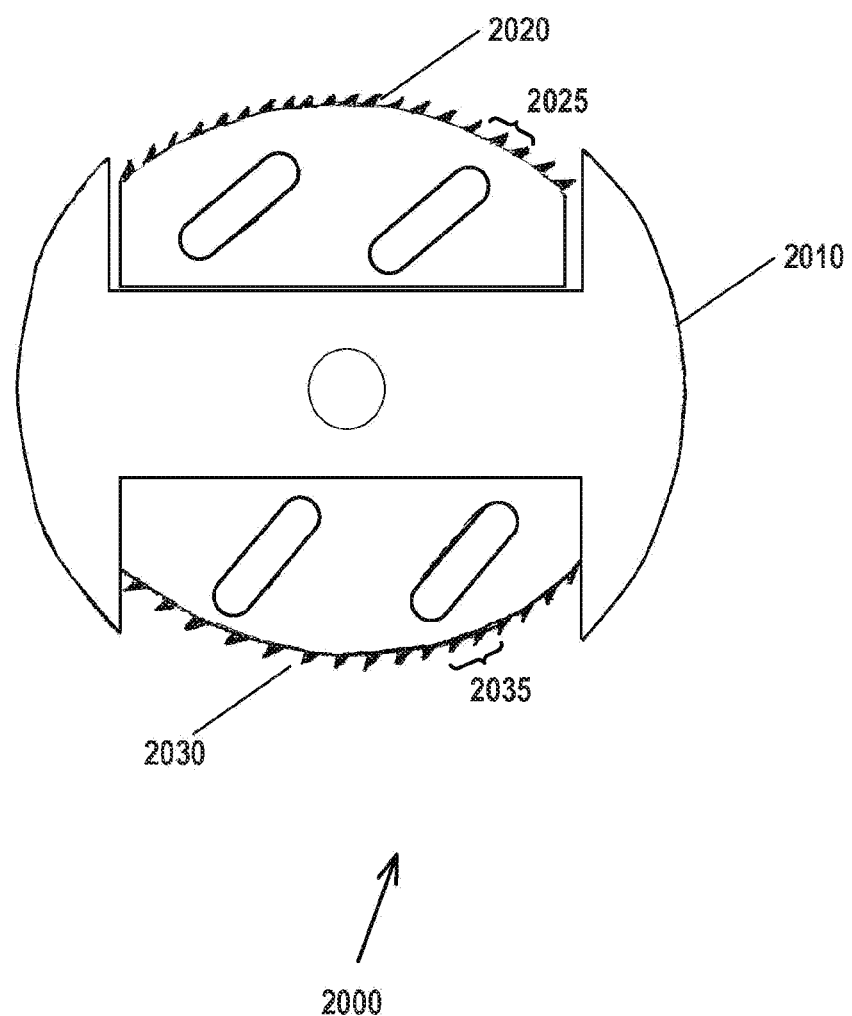
FIG. 20B is an end view of the fixturing apparatus of FIG. 20A, wherein two fixturing assemblies are disposed in a non-securing orientation.
Figure 20C:
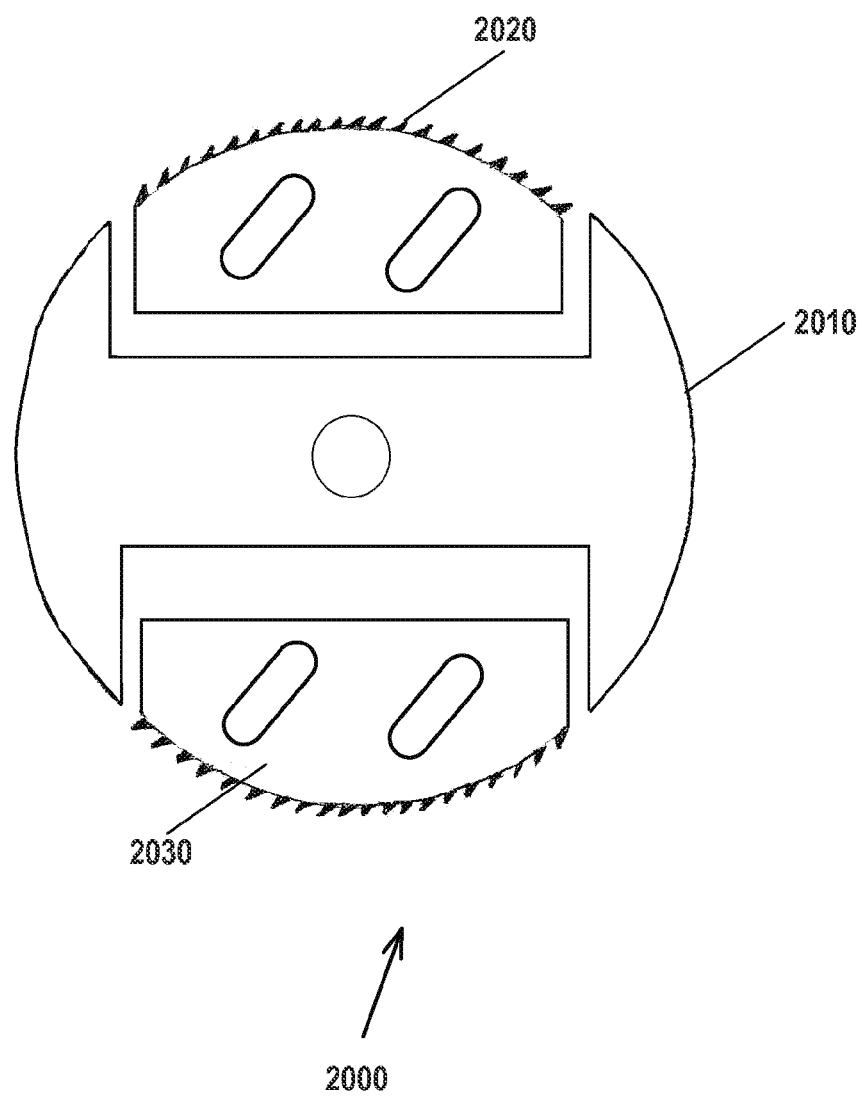
FIG. 20C is an end view of the fixturing apparatus of FIG. 20A, wherein two fixturing assemblies are disposed in a securing orientation.

Referring now to FIGS. 20A, 20B, and 20C, fixturing apparatus 2000 comprises cylindrical housing 2010, first fixturing assembly 2020, and second fixturing assembly 2030. Fixturing assembly 2020 is moveably disposed within housing 2010. Fixturing assembly 2030 is moveably disposed within housing 2010. FIG. 20B shows fixturing assemblies 2020 and 2030 in a first, non-fixturing, orientation. FIG. 20C shows fixturing assemblies 2020 and 2030 in a second, fixturing, orientation.

Fixturing assembly 2020 comprises a plurality of locking teeth 2025. In certain embodiments, each of the plurality of locking teeth 2025 comprises a locking tooth 300. In certain embodiments, each of the plurality of locking teeth 2025 comprises a locking tooth 302. In certain embodiments, each of the plurality of locking teeth 2025 comprises a locking tooth 304. In certain embodiments, each of the plurality of locking teeth 2025 comprises a locking tooth 306. In certain embodiments, each of the plurality of locking teeth 2025 is selected from the group consisting of a locking tooth 300, a locking tooth 302, a locking tooth 304, and a locking tooth 306.

In certain embodiments, plurality of locking teeth 2025 comprise orientation 400. In certain embodiments, plurality of locking teeth 2025 comprise orientation 500. In certain embodiments, plurality of locking teeth 2025 comprise orientation 600. In certain embodiments, plurality of locking teeth 2025 comprise orientation 700. In certain embodiments, plurality of locking teeth 2025 comprise orientation 800. In certain embodiments, plurality of locking teeth 2025 comprise orientation 900.

Fixturing assembly 2030 comprises a plurality of locking teeth 2035. In certain embodiments, each of the plurality of locking teeth 2035 comprises a locking tooth 300. In certain embodiments, each of the plurality of locking teeth 2035 comprises a locking tooth 302. In certain embodiments, each of the plurality of locking teeth 2035 comprises a locking tooth 304. In certain embodiments, each of the plurality of locking teeth 2035 comprises a locking tooth 306. In certain embodiments, each of the plurality of locking teeth 2035 is selected from the group consisting of a locking tooth 300, a locking tooth 302, a locking tooth 304, and a locking tooth 306.

In certain embodiments, plurality of locking teeth 2035 comprise orientation 400. In certain embodiments, plurality of locking teeth 2035 comprise orientation 500. In certain embodiments, plurality of locking teeth 2035 comprise orientation 600. In certain embodiments, plurality of locking teeth 2035 comprise orientation 700. In certain embodiments, plurality of locking teeth 2035 comprise orientation 800. In certain embodiments, plurality of locking teeth 2035 comprise orientation 900.

Figure 21A:
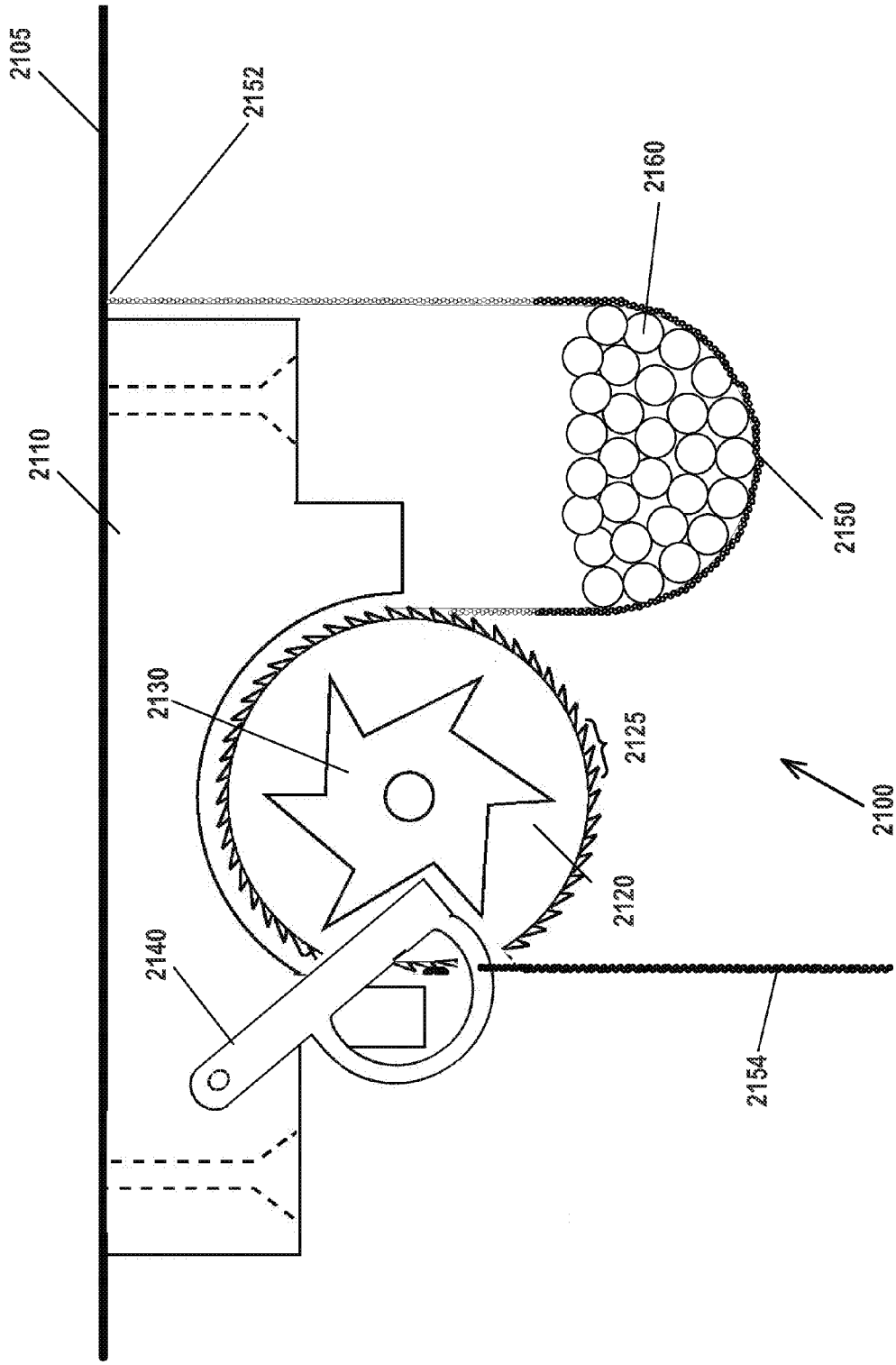
FIG. 21A is a side view of Applicant's fixturing apparatus 2100, wherein a brake is engaged with a rotation limiter.
Figure 21B:
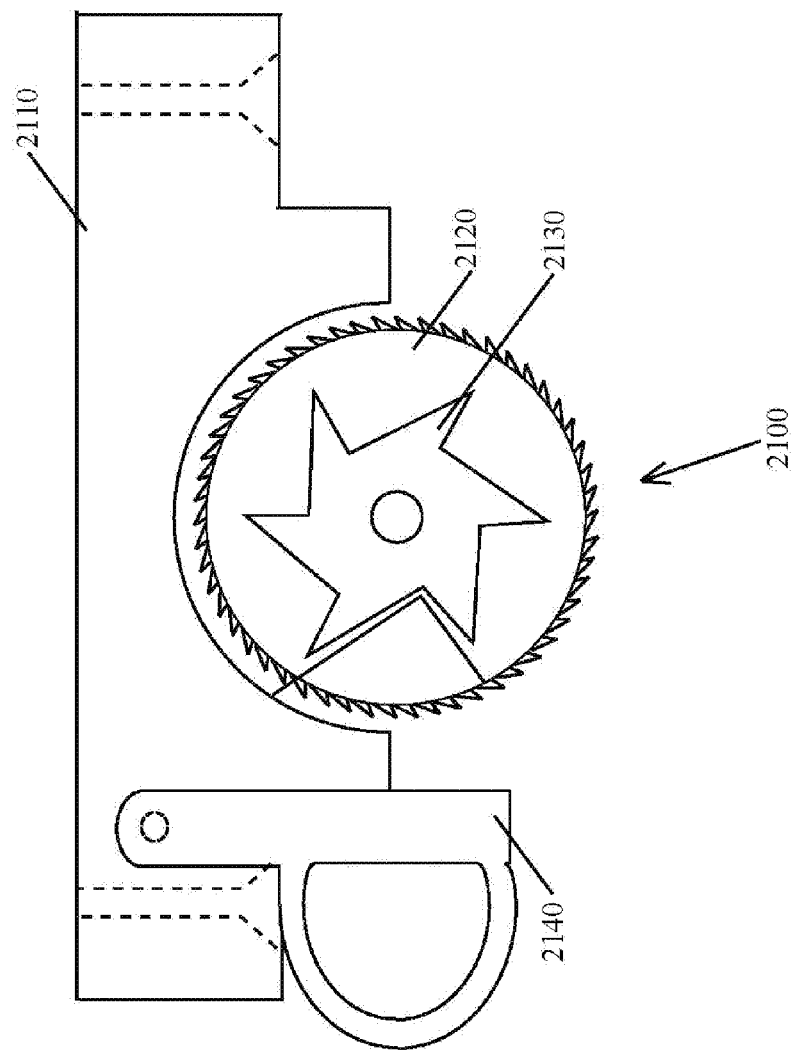
FIG. 21B shows the fixturing apparatus of FIG. 21A with the brake disengaged from the rotation limiter.

Referring now to FIGS. 21A and 21B, fixturing apparatus 2100 comprises housing 2110, rotatable member 2120, rotation limiter 2130, and brake 2140. A plurality of locking teeth 2125 are disposed on the external surface of rotatable member 2120. In the illustrated embodiment of FIG. 21A, flexible strap 2150 comprising a plurality of loop-type fasteners disposed on one surface comprises a first end 2152 and a second end 2154. First end 2152 is attached to surface 2105 and second end 2154 has been passed over rotatable member 2120. Flexible strap 2150 is shown encircles a plurality of cables 2160. FIG. 21A shows brake 2140 engaged with rotation limiter 2130. FIG. 21B shows brake disengaged from rotation limiter 2130.

In certain embodiments, each of the plurality of locking teeth 2125 comprises a locking tooth 300. In certain embodiments, each of the plurality of locking teeth 2125 comprises a locking tooth 302. In certain embodiments, each of the plurality of locking teeth 2125 comprises a locking tooth 304. In certain embodiments, each of the plurality of locking teeth 2125 comprises a locking tooth 306. In certain embodiments, each of the plurality of locking teeth 2125 is selected from the group consisting of a locking tooth 300, a locking tooth 302, a locking tooth 304, and a locking tooth 306.

In certain embodiments, plurality of locking teeth 2125 comprise orientation 400. In certain embodiments, plurality of locking teeth 2125 comprise orientation 500. In certain embodiments, plurality of locking teeth 2125 comprise orientation 600. In certain embodiments, plurality of locking teeth 2125 comprise orientation 700. In certain embodiments, plurality of locking teeth 2125 comprise orientation 800. In certain embodiments, plurality of locking teeth 2125 comprise orientation 900.

Figure 22A:
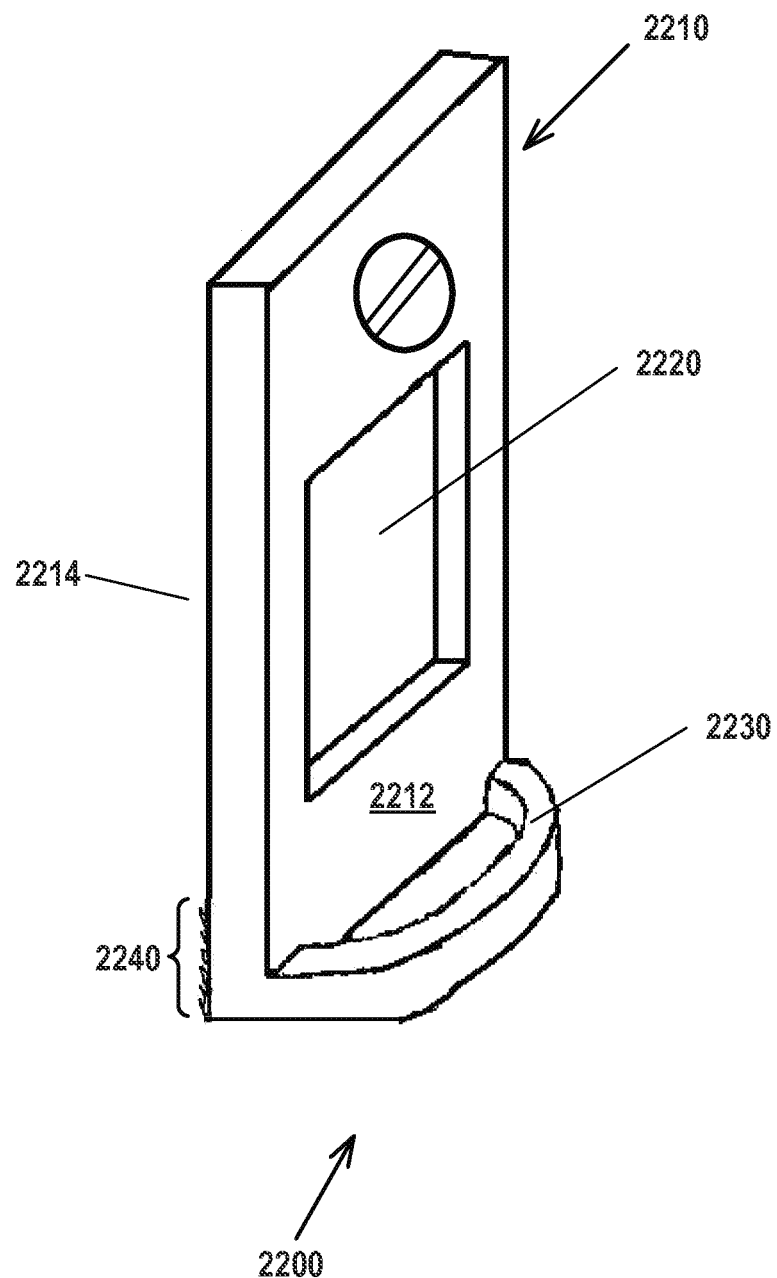
FIG. 22A is a perspective view of Applicant's fixturing assembly 2200.
Figure 22B:
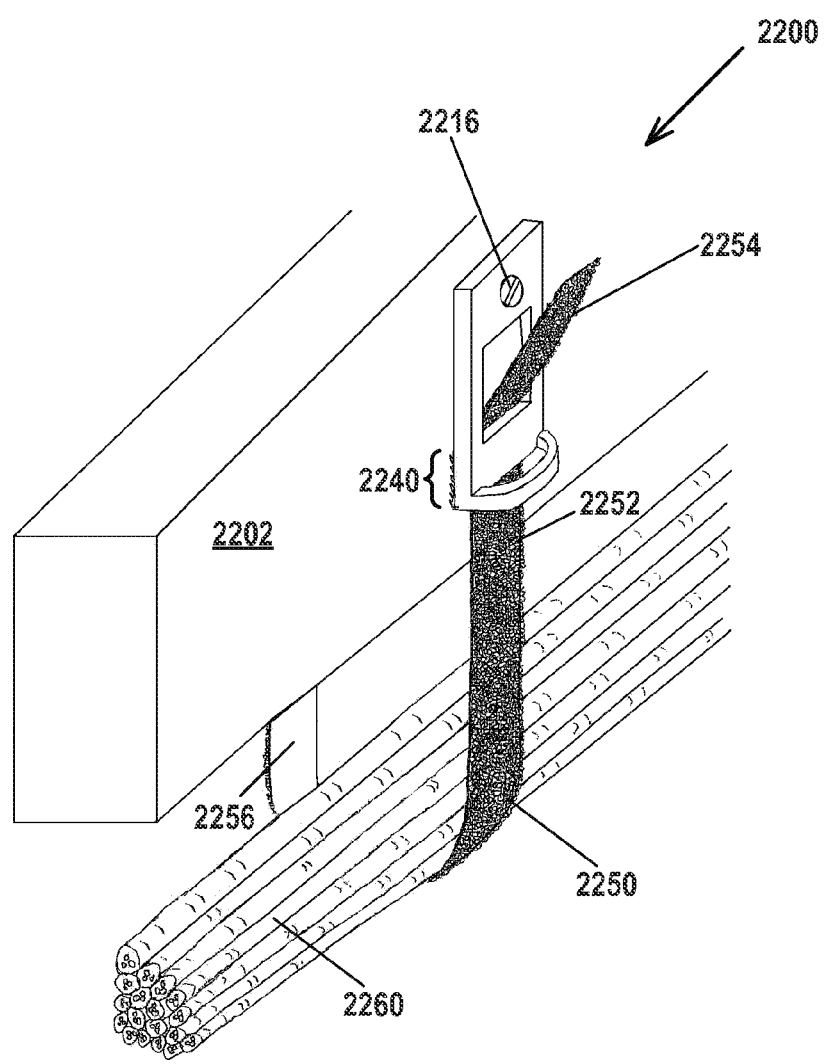
FIG. 22B shows the fixturing apparatus of FIG. 22A being used to hold a plurality of cables.

Referring now to FIG. 22A, fixturing assembly 2200 comprises member 2210. Member 2210 is formed to include aperture 2220 extending therethrough. Handle 2230 is disposed on front surface 2212 of member 2210. A plurality of locking teeth 2240 are disposed on the rear surface 2214. In the illustrated embodiment of FIG. 22B, fixturing assembly 2210 is attached to structural member 2202 using attachment device 2216, wherein attachment device 2216 comprises a screw, nut and bolt, and the like.

A first end 2256 of flexible strap 2250 is attached to structural member 2202. A second end 2254 of flexible strap 2250 extends outwardly from aperture 2220. In the illustrated embodiment of FIG. 22B, flexible strap 2250 is disposed partially around a plurality of cables 2260. The outer surface of strap 2250 comprises a plurality of loop-type fasteners 2252. A portion of the plurality of loop-type fasteners 2252 are engaged with the plurality of locking teeth 2240 thereby preventing distal end 2254 of flexible strap 2250 from being pulled downwardly through aperture 2220.

In certain embodiments, each of the plurality of locking teeth 2240 comprises a locking tooth 300. In certain embodiments, each of the plurality of locking teeth 2240 comprises a locking tooth 302. In certain embodiments, each of the plurality of locking teeth 2240 comprises a locking tooth 304. In certain embodiments, each of the plurality of locking teeth 2240 comprises a locking tooth 306. In certain embodiments, each of the plurality of locking teeth 2240 is selected from the group consisting of a locking tooth 300, a locking tooth 302, a locking tooth 304, and a locking tooth 306.

In certain embodiments, plurality of locking teeth 2240 comprise orientation 400. In certain embodiments, plurality of locking teeth 2240 comprise orientation 500. In certain embodiments, plurality of locking teeth 2240 comprise orientation 600. In certain embodiments, plurality of locking teeth 2240 comprise orientation 700. In certain embodiments, plurality of locking teeth 2240 comprise orientation 800. In certain embodiments, plurality of locking teeth 2240 comprise orientation 900.

Figure 23A:
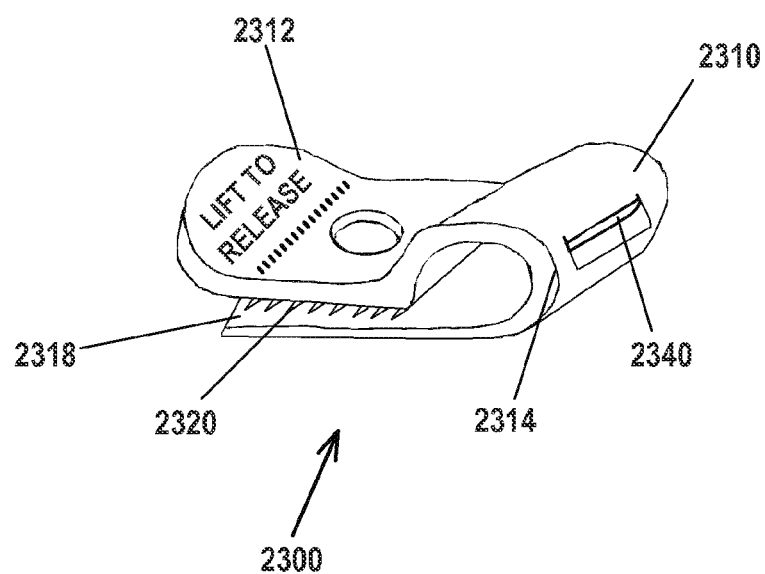
FIG. 23A is a perspective view of Applicant's fixturing apparatus 2300.

Referring to FIG. 23A, fixturing assembly 2300 comprises serpentine member 2310, wherein a first end 2312 of serpentine member 2310 is disposed over a second end 2318 of serpentine member 2310. In certain embodiments, serpentine member is formed from a semi-rigid material, such that first end 2312 can be lifted and separated from second end 2318. Serpentine member 2310 is formed to include aperture 2340 extending therethrough at fold area 2314. A plurality of locking teeth 2320 are disposed on inner surface 2316 adjacent second end 2318.

Figure 23B:
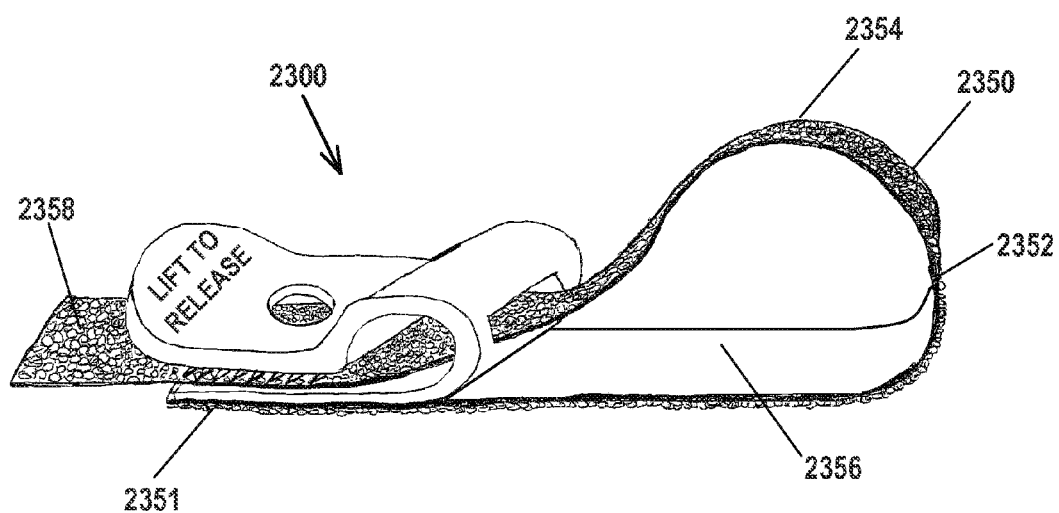
FIG. 23B shows the fixturing apparatus of FIG. 23A being used to secure a flexible strap.

In the illustrated embodiment of FIG. 23B, flexible strap 2350 comprises a first end 2351 which is shown disposed underneath fixturing assembly 2300. Flexible strap 2350 comprises surface 2352, wherein a plurality of loop-type fasteners 2354 are disposed on surface 2352. In the illustrated embodiment of FIG. 23B, second end 2358 of flexible strap 2350 is shown extending through aperture 2340 such that the plurality of loop-type fasteners adjacent to end 2358 are in contact with plurality of locking teeth 2320.

In certain embodiments, each of the plurality of locking teeth 2320 comprises a locking tooth 300. In certain embodiments, each of the plurality of locking teeth 2320 comprises a locking tooth 302. In certain embodiments, each of the plurality of locking teeth 2320 comprises a locking tooth 304. In certain embodiments, each of the plurality of locking teeth 2320 comprises a locking tooth 306. In certain embodiments, each of the plurality of locking teeth 2320 is selected from the group consisting of a locking tooth 300, a locking tooth 302, a locking tooth 304, and a locking tooth 306.

In certain embodiments, plurality of locking teeth 2320 comprise orientation 400. In certain embodiments, plurality of locking teeth 2320 comprise orientation 500. In certain embodiments, plurality of locking teeth 2320 comprise orientation 600. In certain embodiments, plurality of locking teeth 2320 comprise orientation 700. In certain embodiments, plurality of locking teeth 2320 comprise orientation 800. In certain embodiments, plurality of locking teeth 2320 comprise orientation 900.

Figure 24A:
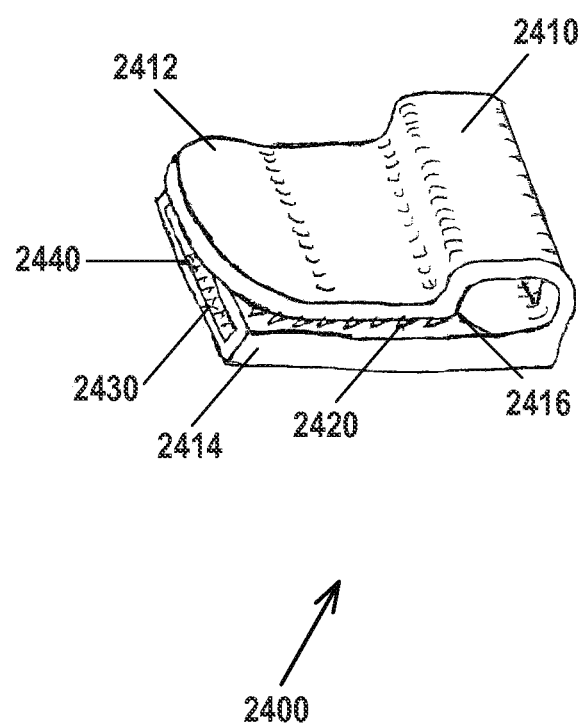
FIG. 24A shows Applicant's fixturing apparatus 2400.

Referring now to FIG. 24A, fixturing assembly 2400 comprises serpentine member 2410, wherein serpentine member 2410 is formed such that a first end 2412 is disposed over a second end 2414. A plurality of locking teeth 2420 are disposed on inner surface 2416 of serpentine member 2410 adjacent first end 2412. Second end 2414 is formed to include an aperture 2430 extending inwardly therein. A plurality of locking teeth 2440 are disposed on the walls of aperture 2430.

Figure 24B:
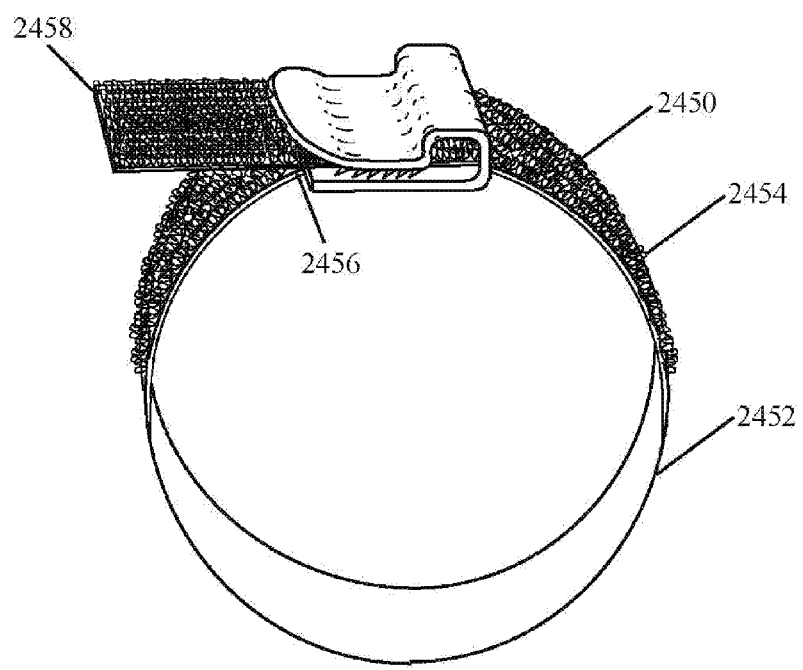
FIG. 24B shows the fixturing apparatus of FIG. 24A being used to secure a flexible strap.

In the illustrated embodiment of FIG. 24B, flexible strap 2450 comprises a first end 2456 and a second end 2458. Flexible strap further comprises a plurality of loop-type fasteners 2454 disposed on surface 2452 of strap 2450. Further in the illustrated embodiment of FIG. 24B, first end 2456 of flexible strap 2450 is shown inserted into aperture 2430 such that the loop-type fasteners disposed on that first end 2456 are engaged with the plurality of locking teeth 2440. Further in the illustrated embodiment of FIG. 24B, second end 2458 of flexible strap 2450 is shown extending outwardly from serpentine member 2410 such that the plurality of loop-type fasteners disposed adjacent to second end 2458 are engaged with the plurality of locking teeth 2420.

In certain embodiments, each of the plurality of locking teeth 2420 comprises a locking tooth 300. In certain embodiments, each of the plurality of locking teeth 2420 comprises a locking tooth 302. In certain embodiments, each of the plurality of locking teeth 2420 comprises a locking tooth 304. In certain embodiments, each of the plurality of locking teeth 2420 comprises a locking tooth 306. In certain embodiments, each of the plurality of locking teeth 2420 is selected from the group consisting of a locking tooth 300, a locking tooth 302, a locking tooth 304, and a locking tooth 306.

In certain embodiments, plurality of locking teeth 2420 comprise orientation 400. In certain embodiments, plurality of locking teeth 2420 comprise orientation 500. In certain embodiments, plurality of locking teeth 2420 comprise orientation 600. In certain embodiments, plurality of locking teeth 2420 comprise orientation 700. In certain embodiments, plurality of locking teeth 2420 comprise orientation 800. In certain embodiments, plurality of locking teeth 2420 comprise orientation 900.

In certain embodiments, each of the plurality of locking teeth 2440 comprises a locking tooth 300. In certain embodiments, each of the plurality of locking teeth 2440 comprises a locking tooth 302. In certain embodiments, each of the plurality of locking teeth 2440 comprises a locking tooth 304. In certain embodiments, each of the plurality of locking teeth 2440 comprises a locking tooth 306. In certain embodiments, each of the plurality of locking teeth 2440 is selected from the group consisting of a locking tooth 300, a locking tooth 302, a locking tooth 304, and a locking tooth 306.

In certain embodiments, plurality of locking teeth 2440 comprise orientation 400. In certain embodiments, plurality of locking teeth 2440 comprise orientation 500. In certain embodiments, plurality of locking teeth 2440 comprise orientation 600. In certain embodiments, plurality of locking teeth 2440 comprise orientation 700. In certain embodiments, plurality of locking teeth 2440 comprise orientation 800. In certain embodiments, plurality of locking teeth 2440 comprise orientation 900.

FIG. 25A shows a member 2500 comprising a plurality of locking teeth 2555 attached to and extending outwardly from surface 2550 of member 2500 at distal end 2505. FIG. 25A further shows a plurality of locking teeth 2565 attached to and extending outwardly from surface 2560 of member 2540 at distal end 2505, wherein the surface 2550 opposes the surface 2560.

Referring now to FIGS. 4A and 25A, in the illustrated embodiment of FIGS. 4A Column 4 includes locking teeth 4.1, 4.2, 4.3, and 4.4. The Column Orientation for Column 4 is defined in the direction from locking tooth 4.1 in the direction of locking tooth 4.4. In the illustrated embodiment of FIG. 25A, plurality of locking teeth 2555 comprises a Column Orientation 2557, wherein Column Orientation 2557 comprises an upward orientation. Further in the illustrated embodiment of FIG. 25A, plurality of locking teeth 2565 comprises a Column Orientation 2567, wherein Column Orientation 2567 comprises an upward orientation.

Figure 25B:
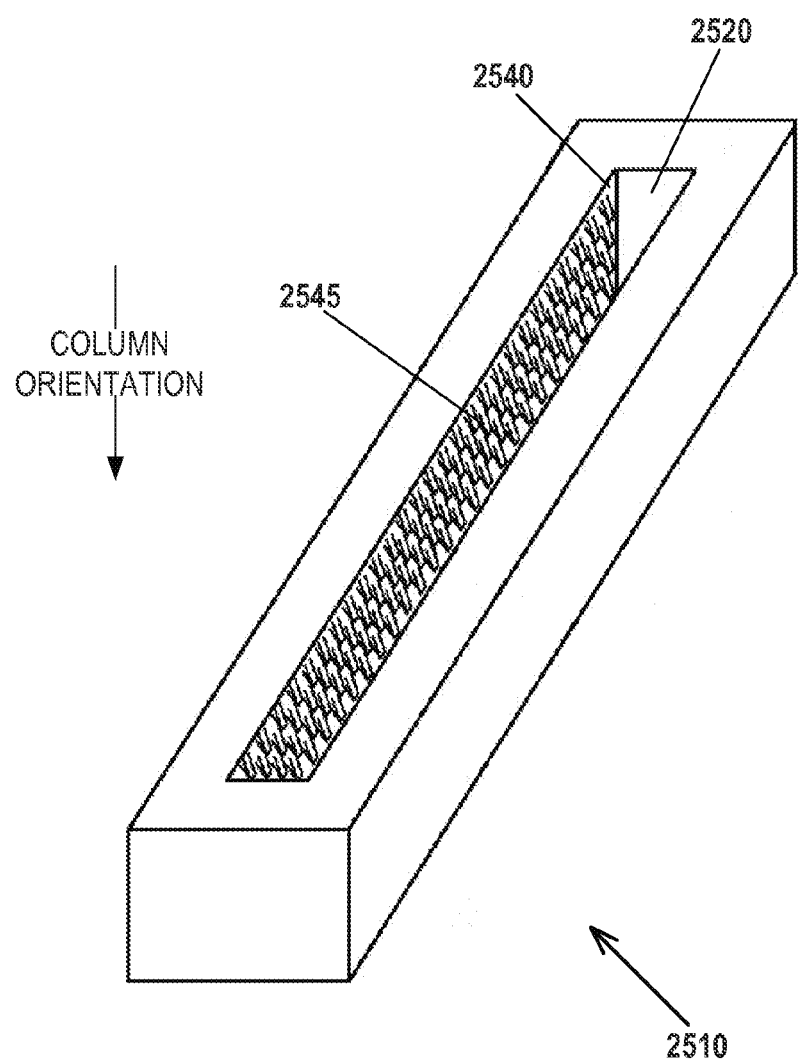
FIG. 25B is a perspective view showing a portion of the fixturing assembly of FIG. 25A.

Referring now to FIGS. 25A and 25B, fixturing assembly 2510 is formed to include a fixturing slot 2520. Fixturing slot 2520 is defined by, inter alia, first wall 2530 and second wall 2540, wherein first wall 2530 faces wall 2540. A plurality of locking teeth 2535 is disposed on wall 2530, wherein that plurality of locking teeth 2535 comprise a Column Orientation 2537, wherein that Column Orientation 2537 is downward. A plurality of locking teeth 2545 is disposed on wall 2540, wherein that plurality of locking 2545 teeth comprise a Column Orientation 2547, wherein that Column Orientation 2547 is downward.

Figure 25C:
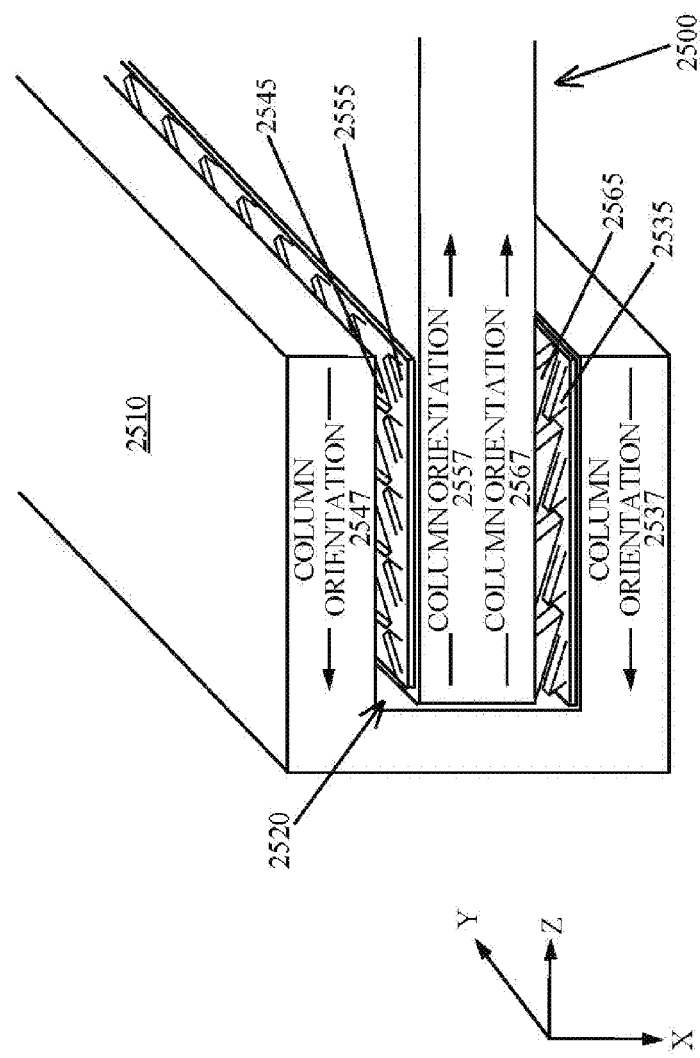
FIG. 25C shows the first end of the member of FIG. 25A inserted into the fixturing assembly of FIG. 25A.
Figure 25D:
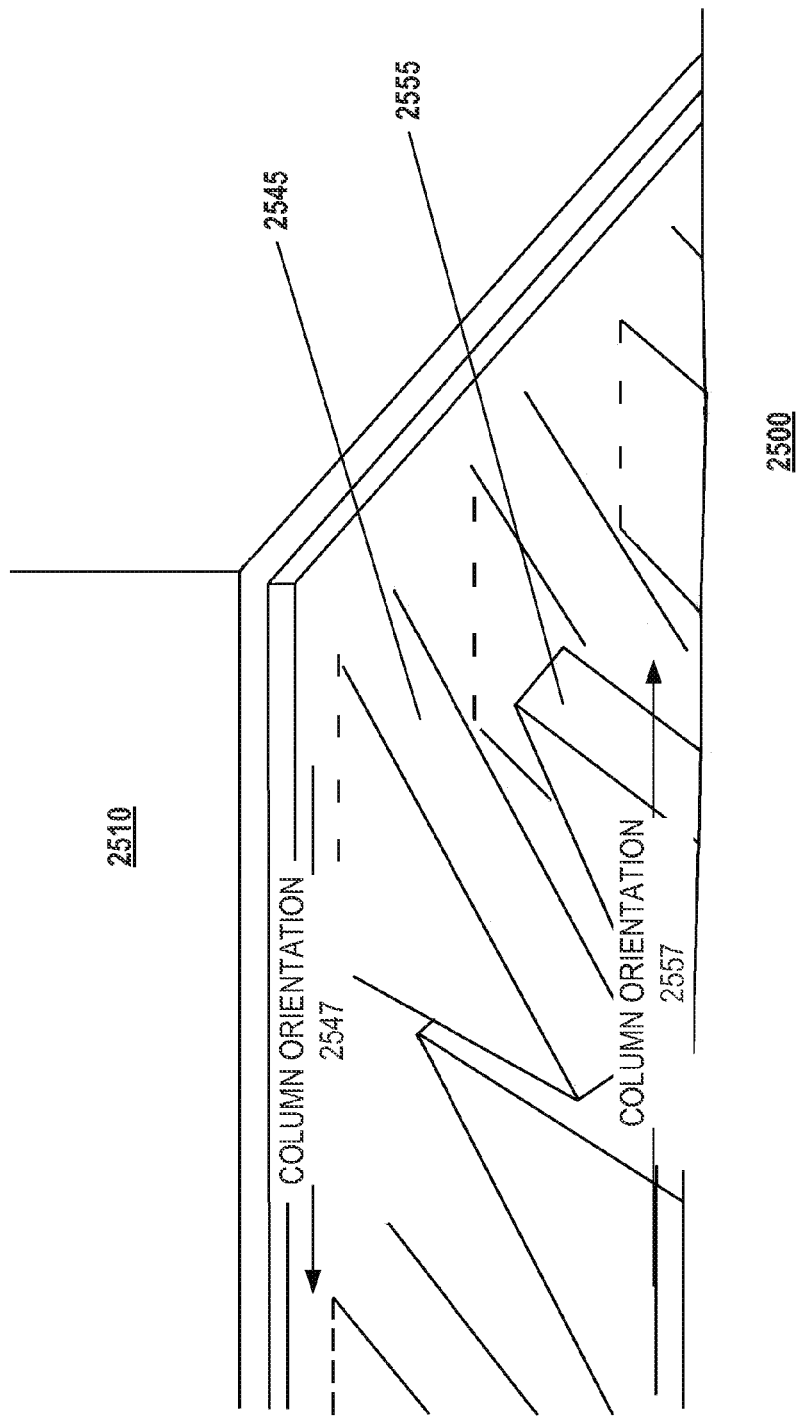
FIG. 25D shows a portion of the first plurality of locking teeth disposed on the first surface of the member of FIG. 25A interlocking with a portion of the third plurality of locking teeth disposed on the first wall defining the fixturing slot of FIG. 25A.

Referring now to FIGS. 25C and 25D, FIG. 25C shows member 2500 inserted into fixturing slot 2520, such that the plurality of locking teeth 2565 mechanically interlock with the plurality of locking teeth 2535, and such that the plurality of locking teeth 2555 mechanically interlock with the plurality of locking teeth 2545. FIG. 25D shows a portion of the plurality of locking teeth 2555 interlocking with a portion of the plurality of locking teeth 2545 to secure member 2500 to fixturing assembly 2510.

The interlocking of plurality of locking teeth 2535 with the plurality of locking teeth 2565, and the interlocking of plurality of locking teeth 2545 with plurality of locking teeth 2555, prevents movement of member 2500 in a vertical direction, i.e. +Z direction. In addition, the interlocking of plurality of locking teeth 2535 with the plurality of locking teeth 2565, and the interlocking of plurality of locking teeth 2545 with plurality of locking teeth 2555, prevents movement of member 2500 in a lateral direction, i.e. in either a +Y direction or in a −Y direction.

In certain embodiments, plurality of locking teeth 2535 comprise orientation 400. In certain embodiments, plurality of locking teeth 2535 comprise orientation 500. In certain embodiments, plurality of locking teeth 2535 comprise orientation 600. In certain embodiments, plurality of locking teeth 2535 comprise orientation 700. In certain embodiments, plurality of locking teeth 2535 comprise orientation 800. In certain embodiments, plurality of locking teeth 2535 comprise orientation 900.

In certain embodiments, each of the plurality of locking teeth 2535 comprises a locking tooth 300. In certain embodiments, each of the plurality of locking teeth 2535 comprises a locking tooth 302. In certain embodiments, each of the plurality of locking teeth 2535 comprises a locking tooth 304. In certain embodiments, each of the plurality of locking teeth 2535 comprises a locking tooth 306. In certain embodiments, each of the plurality of locking teeth 2535 is selected from the group consisting of a locking tooth 300, a locking tooth 302, a locking tooth 304, and a locking tooth 306.

In certain embodiments, plurality of locking teeth 2545 comprise orientation 400. In certain embodiments, plurality of locking teeth 2545 comprise orientation 500. In certain embodiments, plurality of locking teeth 2545 comprise orientation 600. In certain embodiments, plurality of locking teeth 2545 comprise orientation 700. In certain embodiments, plurality of locking teeth 2545 comprise orientation 800. In certain embodiments, plurality of locking teeth 2545 comprise orientation 900.

In certain embodiments, each of the plurality of locking teeth 2545 comprises a locking tooth 300. In certain embodiments, each of the plurality of locking teeth 2545 comprises a locking tooth 302. In certain embodiments, each of the plurality of locking teeth 2545 comprises a locking tooth 304. In certain embodiments, each of the plurality of locking teeth 2545 comprises a locking tooth 306. In certain embodiments, each of the plurality of locking teeth 2545 is selected from the group consisting of a locking tooth 300, a locking tooth 302, a locking tooth 304, and a locking tooth 306.

In certain embodiments, plurality of locking teeth 2555 comprise orientation 400. In certain embodiments, plurality of locking teeth 2555 comprise orientation 500. In certain embodiments, plurality of locking teeth 2555 comprise orientation 600. In certain embodiments, plurality of locking teeth 2555 comprise orientation 700. In certain embodiments, plurality of locking teeth 2555 comprise orientation 800. In certain embodiments, plurality of locking teeth 2555 comprise orientation 900.

In certain embodiments, each of the plurality of locking teeth 2555 comprises a locking tooth 300. In certain embodiments, each of the plurality of locking teeth 2555 comprises a locking tooth 302. In certain embodiments, each of the plurality of locking teeth 2555 comprises a locking tooth 304. In certain embodiments, each of the plurality of locking teeth 2555 comprises a locking tooth 306. In certain embodiments, each of the plurality of locking teeth 2555 is selected from the group consisting of a locking tooth 300, a locking tooth 302, a locking tooth 304, and a locking tooth 306.

In certain embodiments, plurality of locking teeth 2565 comprise orientation 400. In certain embodiments, plurality of locking teeth 2565 comprise orientation 500. In certain embodiments, plurality of locking teeth 2565 comprise orientation 600. In certain embodiments, plurality of locking teeth 2565 comprise orientation 700. In certain embodiments, plurality of locking teeth 2565 comprise orientation 800. In certain embodiments, plurality of locking teeth 2565 comprise orientation 900.

In certain embodiments, each of the plurality of locking teeth 2565 comprises a locking tooth 300. In certain embodiments, each of the plurality of locking teeth 2565 comprises a locking tooth 302. In certain embodiments, each of the plurality of locking teeth 2565 comprises a locking tooth 304. In certain embodiments, each of the plurality of locking teeth 2565 comprises a locking tooth 306. In certain embodiments, each of the plurality of locking teeth 2565 is selected from the group consisting of a locking tooth 300, a locking tooth 302, a locking tooth 304, and a locking tooth 306.

Figure 26:
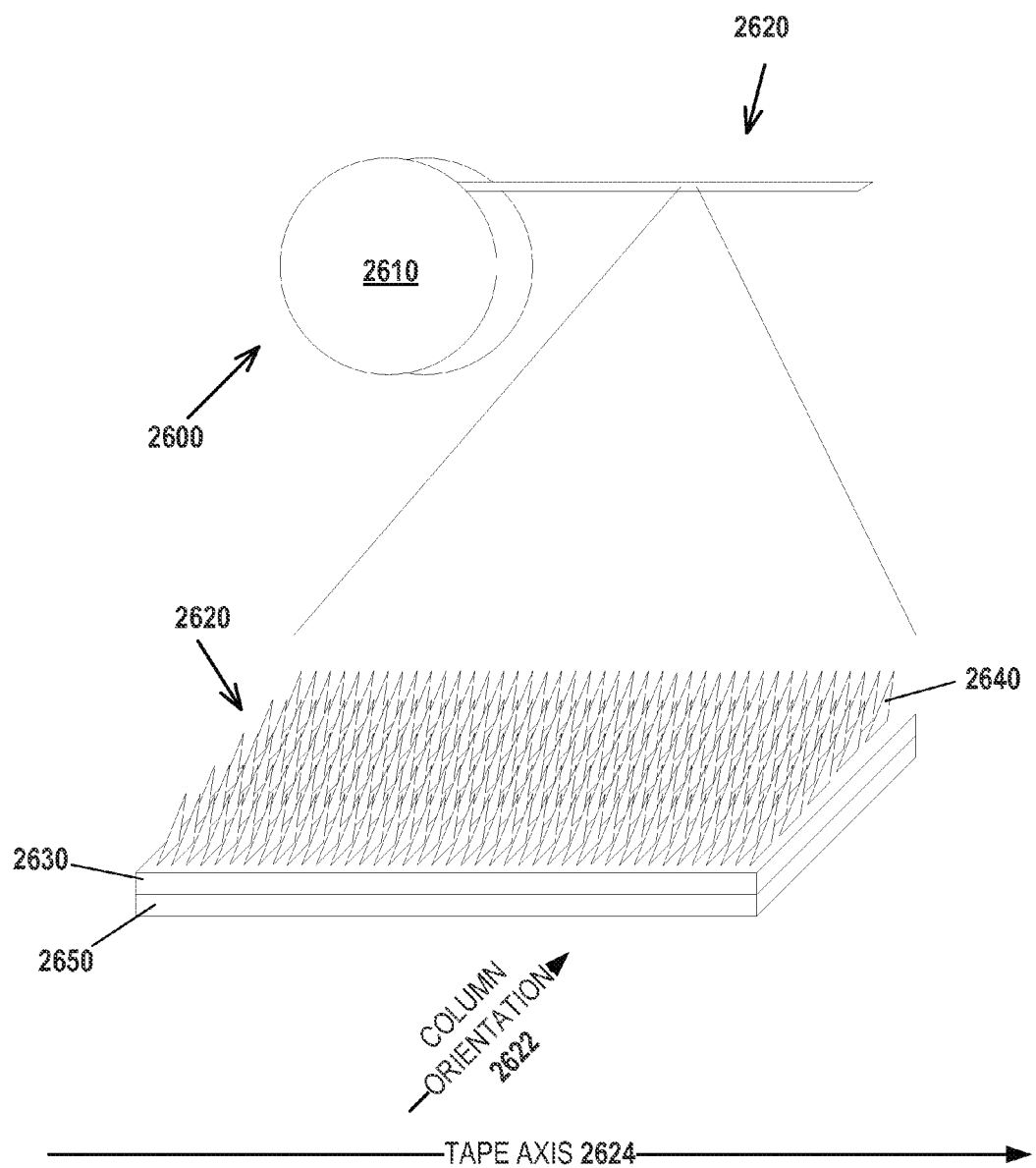
FIG. 26 illustrates a fixturing assembly comprising a flexible tape substrate in combination with a plurality of Applicant's locking teeth, wherein that plurality of locking teeth are arranged in a first column orientation.

Referring now to FIG. 26, fixturing assembly 2600 comprises a tape reel 2610 and tape 2620 disposed therein. As those skilled in the art will appreciate, reel 2610 comprises two parallel flanges interconnected by a central hub. Tape 2620 is wound around that hub.

In the illustrated embodiments of FIG. 26, tape 2620 comprises a flexible substrate 2630, and a plurality of Applicant's locking teeth 2640 attached to, and extending outwardly from, one surface of flexible substrate 2630. In the illustrated embodiment of FIG. 26, tape 2620 further comprises an optional adhesive 2650 disposed on an opposing surface of flexible substrate 2630. In certain embodiments, adhesive 2650 comprises a pressure sensitive adhesive.

In certain embodiments, Applicant's flexible substrate is formed from one or more metals. In certain embodiments, Applicant's flexible substrate is formed from a polymeric material, such as and without limitation, a polyolefinic film, such as polypropylene, polyethylene, an ethylene propylene copolymer, and the like. In certain embodiments, Applicant's flexible substrate further comprises a thermoplastic elastomer, usually in an amount below 30 parts by weight per hundred parts of polyolefin, such as for example, polyisobutylene or styrene butadiene block copolymer In certain embodiments, each of the plurality of locking teeth 2640 comprises a locking tooth 300. In certain embodiments, each of the plurality of locking teeth 2640 comprises a locking tooth 302. In certain embodiments, each of the plurality of locking teeth 2640 comprises a locking tooth 304. In certain embodiments, each of the plurality of locking teeth 2640 comprises a locking tooth 306. In certain embodiments, each of the plurality of locking teeth 2640 is selected from the group consisting of a locking tooth 300, a locking tooth 302, a locking tooth 304, and a locking tooth 306.

In certain embodiments, plurality of locking teeth 2640 comprise orientation 400. In certain embodiments, plurality of locking teeth 2640 comprise orientation 500. In certain embodiments, plurality of locking teeth 2640 comprise orientation 600. In certain embodiments, plurality of locking teeth 2640 comprise orientation 700. In certain embodiments, plurality of locking teeth 2640 comprise orientation 800. In certain embodiments, plurality of locking teeth 2640 comprise orientation 900.

Tape 2620 further comprises a tape axis 2624 which runs from one end of the tape the other end of the tape. The plurality of locking teeth 2640 extending outwardly from flexible substrate 2630 define a Column Orientation 2622. In the illustrated embodiment of FIG. 26, Column Orientation 2622 is orthogonal to the tape axis 2624.

In certain embodiments, a first portion of tape 2620 can be disposed on a surface of a first object. A second portion of tape 2620 can be disposed on a surface of a second object. If the first object is brought into contact with the second object such that the plurality of locking teeth extending outwardly from the first portion of tape 2620 intermesh with the plurality of locking teeth extending outwardly from the second portion of tape 2620, then the first object can be releaseably fixtured to the second object.

In certain embodiments, the Column Orientation of the plurality of locking teeth extending outwardly from the first portion of tape 2620 is offset by 90 degrees from the Column Orientation of the plurality of locking teeth extending outwardly from the first portion of tape 2620. In certain embodiments, the Column Orientation of the plurality of locking teeth extending outwardly from the first portion of tape 2620 is offset by 180 degrees from the Column Orientation of the plurality of locking teeth extending outwardly from the first portion of tape 2620. In certain embodiments, the Column Orientation of the plurality of locking teeth extending outwardly from the first portion of tape 2620 is offset by from about 45 degrees to about 315 degrees from the Column Orientation of the plurality of locking teeth extending outwardly from the first portion of tape 2620.

Figure 27:
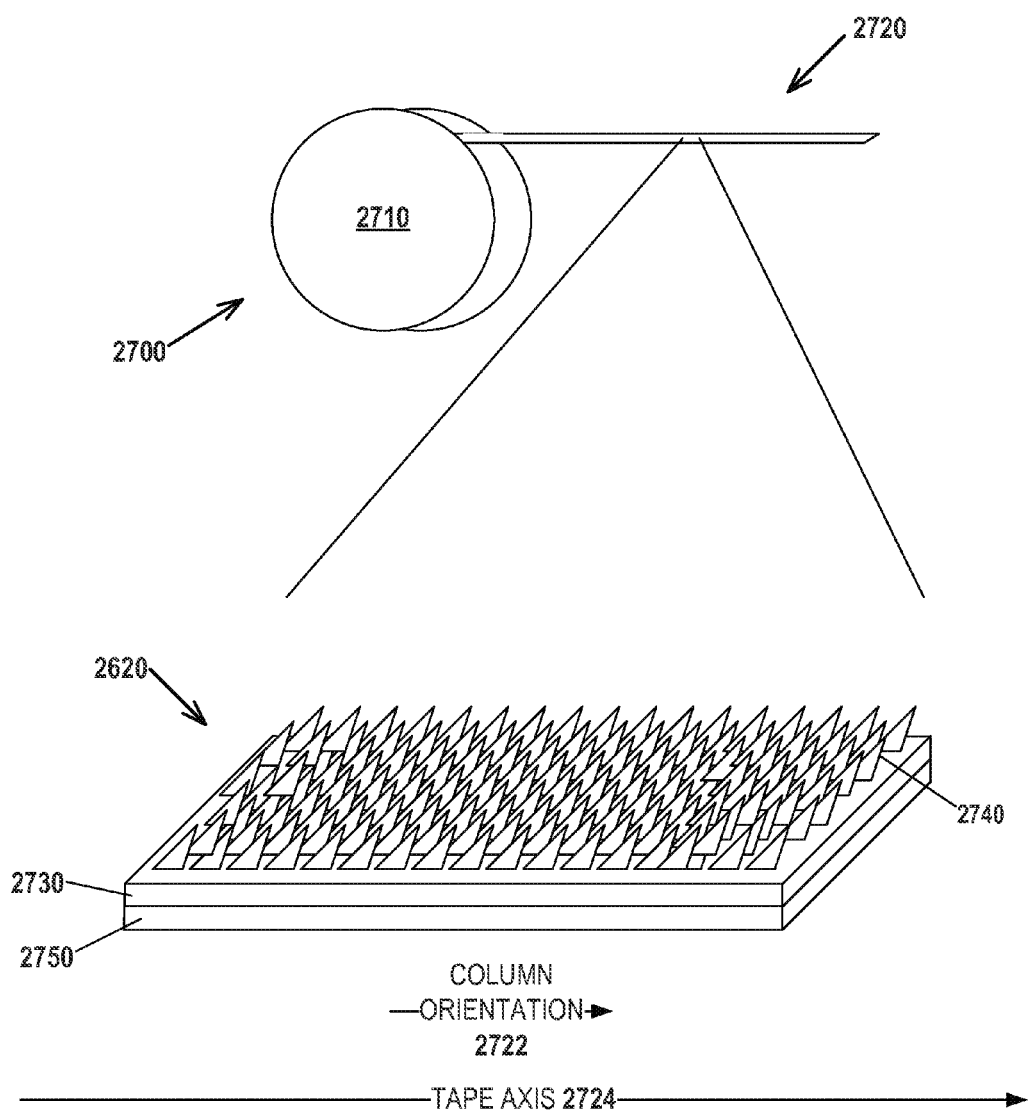
FIG. 27 illustrates a fixturing assembly comprising a flexible tape substrate in combination with a plurality of Applicant's locking teeth, wherein that plurality of locking teeth are arranged in a second column orientation.

Referring now to FIG. 27, fixturing assembly 2700 comprises a tape reel 2710 and tape 2720 disposed therein. As those skilled in the art will appreciate, reel 2710 comprises two parallel flanges interconnected by a central hub. Tape 2720 is wound around that hub.

In the illustrated embodiments of FIG. 27, tape 2720 comprises a flexible substrate 2730, and a plurality of Applicant's locking teeth 2740 attached to, and extending outwardly from, one surface of flexible substrate 2730. In the illustrated embodiment of FIG. 27, tape 2720 further comprises an optional adhesive 2750 disposed on an opposing surface of flexible substrate 2730. In certain embodiments, adhesive 2750 comprises a pressure sensitive adhesive.

In certain embodiments, each of the plurality of locking teeth 2740 comprises a locking tooth 300. In certain embodiments, each of the plurality of locking teeth 2740 comprises a locking tooth 302. In certain embodiments, each of the plurality of locking teeth 2740 comprises a locking tooth 304. In certain embodiments, each of the plurality of locking teeth 2740 comprises a locking tooth 307. In certain embodiments, each of the plurality of locking teeth 2740 is selected from the group consisting of a locking tooth 300, a locking tooth 302, a locking tooth 304, and a locking tooth 307.

In certain embodiments, plurality of locking teeth 2740 comprise orientation 400. In certain embodiments, plurality of locking teeth 2740 comprise orientation 500. In certain embodiments, plurality of locking teeth 2740 comprise orientation 700. In certain embodiments, plurality of locking teeth 2740 comprise orientation 700. In certain embodiments, plurality of locking teeth 2740 comprise orientation 800. In certain embodiments, plurality of locking teeth 2740 comprise orientation 900.

Tape 2720 further comprises a tape axis 2724 which runs from one end of the tape the other end of the tape. The plurality of locking teeth 2740 extending outwardly from flexible substrate 2730 define a Column Orientation 2722. In the illustrated embodiment of FIG. 27, Column Orientation 2722 is orthogonal to the tape axis 2724.

In certain embodiments, a first portion of tape 2720 can be disposed on a surface of a first object. A second portion of tape 2720 can be disposed on a surface of a second object. If the first object is brought into contact with the second object such that the plurality of locking teeth extending outwardly from the first portion of tape 2720 intermesh with the plurality of locking teeth extending outwardly from the second portion of tape 2720, then the first object can be releaseably fixtured to the second object.

In certain embodiments, the Column Orientation of the plurality of locking teeth extending outwardly from the first portion of tape 2720 is offset by 90 degrees from the Column Orientation of the plurality of locking teeth extending outwardly from the first portion of tape 2720. In certain embodiments, the Column Orientation of the plurality of locking teeth extending outwardly from the first portion of tape 2720 is offset by 180 degrees from the Column Orientation of the plurality of locking teeth extending outwardly from the first portion of tape 2720. In certain embodiments, the Column Orientation of the plurality of locking teeth extending outwardly from the first portion of tape 2720 is offset by from about 45 degrees to about 315 degrees from the Column Orientation of the plurality of locking teeth extending outwardly from the first portion of tape 2720.

In certain embodiments, tape 2620 can be disposed on a surface of a first object. Tape 2720 can be disposed on a surface of a second object. If the first object is brought into contact with the second object such that the plurality of locking teeth extending outwardly from tape 2620 intermesh with the plurality of locking teeth extending outwardly from tape 2720, then the first object can be releaseably fixtured to the second object.

In certain embodiments, the Column Orientation of the plurality of locking teeth extending outwardly from the tape 2620 is offset by 90 degrees from the Column Orientation of the plurality of locking teeth extending outwardly from tape 2720. In certain embodiments, the Column Orientation of the plurality of locking teeth extending outwardly from tape 2720 is offset by 180 degrees from the Column Orientation of the plurality of locking teeth extending outwardly from tape 2720. In certain embodiments, the Column Orientation of the plurality of locking teeth extending outwardly from tape 2620 is offset by from about 45 degrees to about 315 degrees from the Column Orientation of the plurality of locking teeth extending outwardly from tape 2720.

Figure 28A:
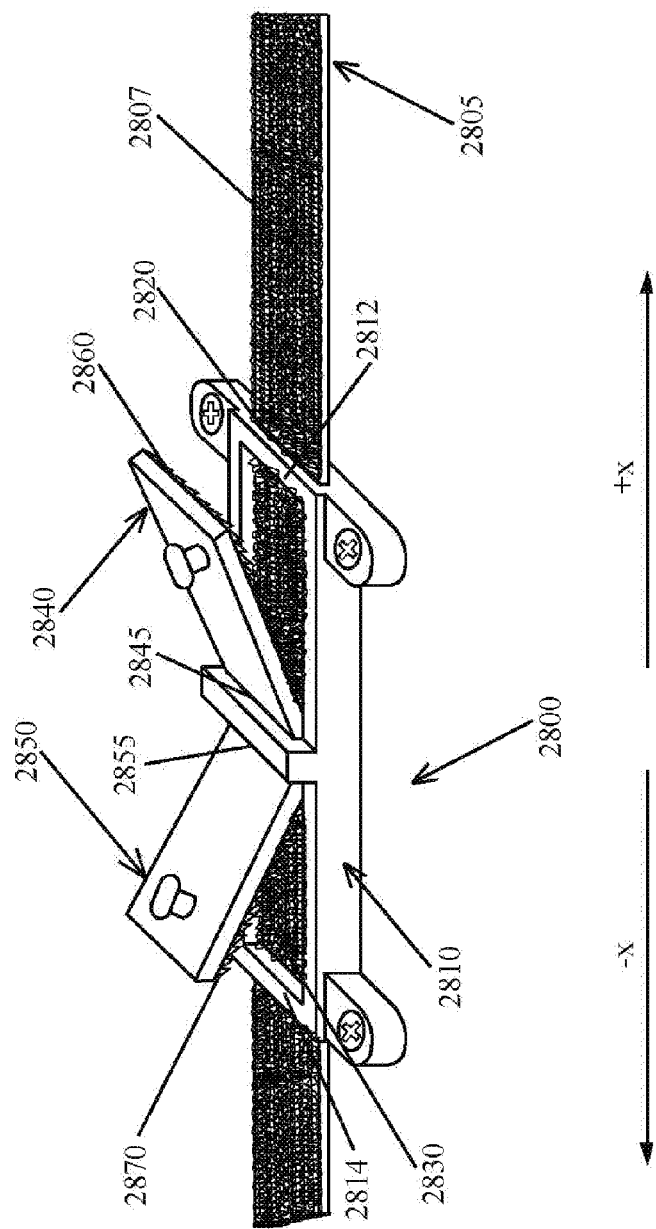
FIG. 28A illustrates assembly 2800 which comprises bi-directional fixturing device 2810 and flexible strap 2805.

FIG. 28A illustrates bi-directional fixturing device 2810, which comprises a rectangular frame 2810 formed to include a first aperture 2820 formed in a first end 2812, and a second aperture 2830 formed in a second end 2814. In the illustrated embodiment of FIG. 28A, flexible strap 2805 passes through both first aperture 2820 and second aperture 2830. Further in the illustrated embodiment of FIG. 28A, flexible strap 2805 comprises a plurality of loop-type fasteners disposed on at least one surface thereof.

Bi-directional fixturing device 2800 further comprises a first latch 2840 hingedly attached to a top portion of frame 2810 by hinge 2845. In certain embodiments, bi-directional fixturing device 2810 comprises an integral device formed by injection molding, wherein hinge 2845 comprises an integral hinge. Latch 2840 further comprises a plurality of locking teeth 2860 disposed on a bottom surface, such that when latch 2840 is moved downwardly, the plurality of locking teeth 2860 engage the plurality of loop-type fasteners 2807.

Bi-directional fixturing device 2800 further comprises a second latch 2850 hingedly attached to a top portion of frame 2810 by hinge 2855. In certain embodiments, bi-directional fixturing device 2810 comprises an integral device formed by injection molding, wherein hinge 2855 comprises an integral hinge. Latch 2850 further comprises a plurality of locking teeth 2870 disposed on a bottom surface, such that when latch 2850 is moved downwardly, the plurality of locking teeth 2870 engage the plurality of loop-type fasteners 2807.

In certain embodiments, plurality of locking teeth 2860 comprise orientation 400. In certain embodiments, plurality of locking teeth 2860 comprise orientation 500. In certain embodiments, plurality of locking teeth 2860 comprise orientation 600. In certain embodiments, plurality of locking teeth 2860 comprise orientation 700. In certain embodiments, plurality of locking teeth 2860 comprise orientation 800. In certain embodiments, plurality of locking teeth 2860 comprise orientation 900.

In certain embodiments, each of the plurality of locking teeth 2860 comprises a locking tooth 300. In certain embodiments, each of the plurality of locking teeth 2860 comprises a locking tooth 302. In certain embodiments, each of the plurality of locking teeth 2860 comprises a locking tooth 304. In certain embodiments, each of the plurality of locking teeth 2860 comprises a locking tooth 306. In certain embodiments, each of the plurality of locking teeth 2860 is selected from the group consisting of a locking tooth 300, a locking tooth 302, a locking tooth 304, and a locking tooth 306.

In certain embodiments, plurality of locking teeth 2870 comprise orientation 400. In certain embodiments, plurality of locking teeth 2870 comprise orientation 500. In certain embodiments, plurality of locking teeth 2870 comprise orientation 600. In certain embodiments, plurality of locking teeth 2870 comprise orientation 700. In certain embodiments, plurality of locking teeth 2870 comprise orientation 800. In certain embodiments, plurality of locking teeth 2870 comprise orientation 900.

In certain embodiments, each of the plurality of locking teeth 2870 comprises a locking tooth 300. In certain embodiments, each of the plurality of locking teeth 2870 comprises a locking tooth 302. In certain embodiments, each of the plurality of locking teeth 2870 comprises a locking tooth 304. In certain embodiments, each of the plurality of locking teeth 2870 comprises a locking tooth 306. In certain embodiments, each of the plurality of locking teeth 2870 is selected from the group consisting of a locking tooth 300, a locking tooth 302, a locking tooth 304, and a locking tooth 306.

When latch 2840 is placed in a locking position such that plurality of locking teeth 2860 engage the plurality of loop-type fasteners 2807, flexible strap 2805 cannot be moved in the +X direction. When latch 2850 is placed in a locking position such that plurality of locking teeth 2870 engage the plurality of loop-type fasteners 2807, flexible strap 2805 cannot be moved in the −X direction. When latch 2840 is placed in a locking position such that plurality of locking teeth 2860 engage the plurality of loop-type fasteners 2807, and latch 2850 is placed in a locking position such that plurality of locking teeth 2870 engage the plurality of loop-type fasteners 2807, flexible strap 2805 cannot be moved in either the +X direction or the −X direction.

Figure 28B:
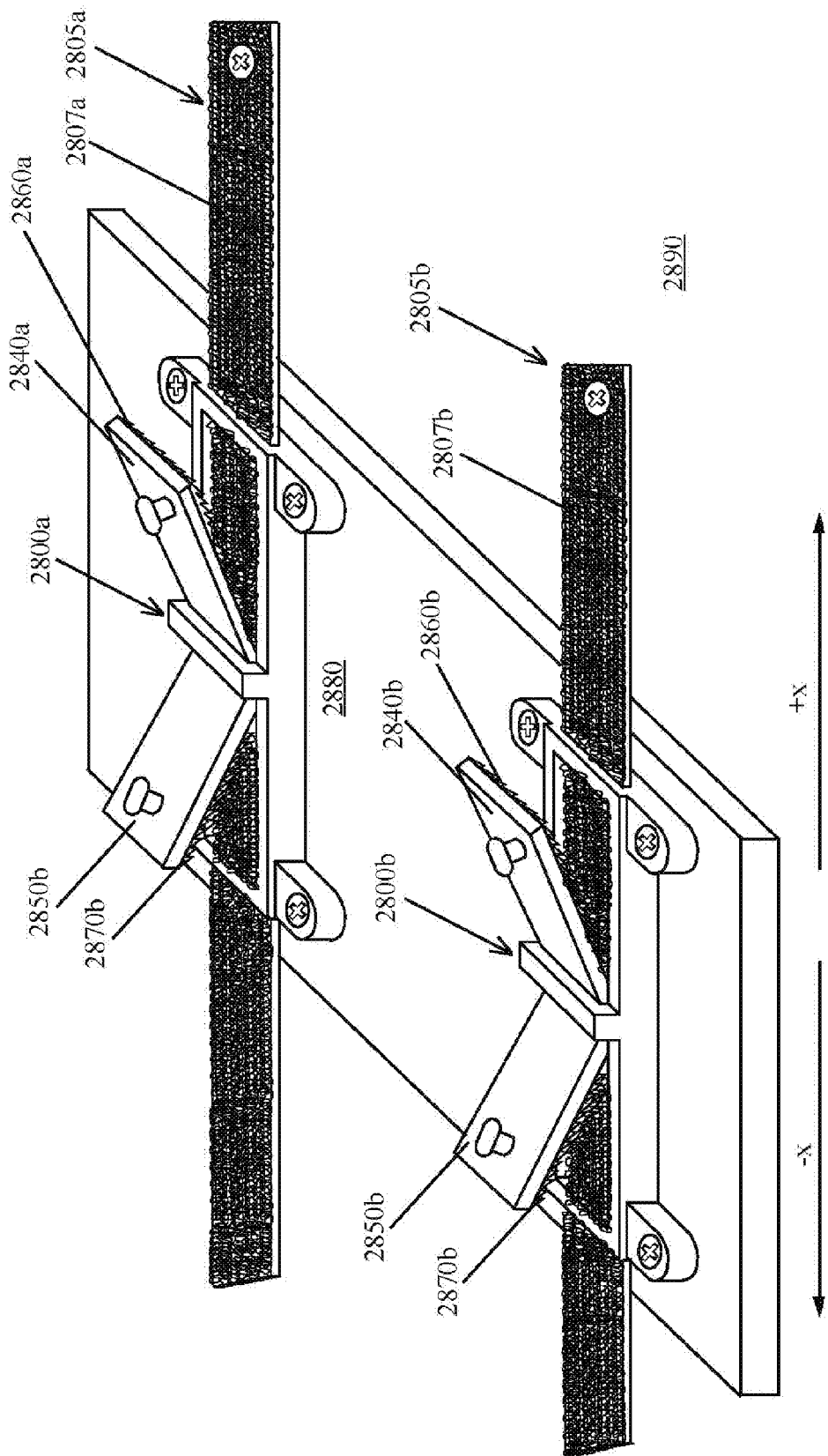
FIG. 28B shows a pair of assemblies 2800 being used to secure a platform 2880 on a substrate 2890.

Referring now to FIGS. 28A and 28B, in the illustrated embodiment of FIG. 28B flexible strap 2805a and flexible strap 2805b are attached to substrate 2890. In certain embodiments, substrate 2890 comprises a table top, bench top, floor, wall, and the like. Further in the illustrated embodiment of FIG. 28B, bi-directional fixturing device 2800a and bi-directional fixturing device 2800b, are attached to platform 2880. In certain embodiments platform 2880 comprises a frame, machine, assembly, and the like.

When latches 2840a and 2840b are placed in a locking position such that plurality of locking teeth 2860a engage the plurality of loop-type fasteners 2807a, and plurality of locking teeth 2860b engage the plurality of loop-type fasteners 2807b, then platform 2880 cannot be moved in the +X direction across substrate 2890. When latches 2850a and 2850b are placed in a locking position such that plurality of locking teeth 2870a engage the plurality of loop-type fasteners 2807a, and such that plurality of locking teeth 2870b engage the plurality of loop-type fasteners 2807b, then platform 2880 cannot be moved in the –X direction across substrate 2890. When latches 2840a and 2840b are placed in a locking position such that plurality of locking teeth 2860a engage the plurality of loop-type fasteners 2807a, and plurality of locking teeth 2860b engage the plurality of loop-type fasteners 2807b, and when latches 2850a and 2850b are placed in a locking position such that plurality of locking teeth 2870a engage the plurality of loop-type fasteners 2807a, and such that plurality of locking teeth 2870b engage the plurality of loop-type fasteners 2807b, then platform 2880 cannot be moved in either the +X direction, or in the –X direction, across substrate 2890.

While the preferred embodiments of the present invention have been illustrated in detail, it should be apparent that modifications and adaptations to those embodiments may occur to one skilled in the art without departing from the scope of the present invention, which is defined by claims appended hereinbelow.

I claim:

1. A fixturing apparatus, comprising:
a flexible fabric strap comprising a first end, a second end, a first surface, and an opposing second surface, wherein a first plurality of loop-type fasteners are disposed on said first surface;
a housing comprising a rectangular cross-section, a first side, and an opposing second side, and formed to include an aperture extending through said housing from said first side to said second side, wherein said aperture comprise a first end formed in said first side and a second end formed in said second side, and wherein said aperture is defined by four walls, and wherein said first end of said fabric strap is attached to said housing;
a first plurality of locking teeth attached to and extending outwardly from one of said four aperture walls and into said aperture;
wherein each locking tooth comprises a parallelepiped comprising a rectangular base, a first rectangular side attached to a first end of said rectangular base and extending outwardly therefrom, and a second rectangular side attached to an opposing end of said rectangular base and extending outwardly therefrom, wherein a first rectangular side distal end is attached to a said second rectangular side distal end to form a gripping edge;
wherein;
said second end of said flexible strap can be inserted into said first end of said aperture, and moved in a first direction through said aperture and outwardly from said housing through second end of said aperture; and
after insertion in and through said aperture in said first direction, said flexible strap cannot be moved backwardly through said aperture in a second and 180 degree opposite direction.

2. The fixturing apparatus of claim 1, further comprising:
a second plurality of loop-type fasteners disposed on said second surface of said flexible strap;
a second plurality of locking teeth attached to and extending outwardly from a second aperture wall.

3. The fixturing apparatus of claim 1, wherein:
said first rectangular side comprises a first surface area;
said second rectangular side comprises a second surface area;
said first surface area is less than said second surface area.

4. The fixturing apparatus of claim 3, wherein said first rectangular side comprises a length between about 0.0001 mm and about 5.0 mm.

5. The fixturing apparatus of claim 1, wherein said first side in combination with said base define a dihedral angle greater than 90 degrees.

6. The fixturing apparatus of claim 5, wherein said first side in combination with said base define a dihedral angle of about 110 degrees.

7. The fixturing apparatus of claim 6, wherein said first rectangular side in combination with said rectangular base define a dihedral angle of about 120 degrees.

8. The fixturing apparatus of claim 1, wherein said first rectangular side in combination with said rectangular base define a dihedral angle of about 90 degrees.

9. The fixturing apparatus of claim 1, wherein:
said rectangular base comprises two parallel opposing short sides in combination with two parallel and opposing long sides;
each locking tooth comprises a long axis parallel to said long sides and which bisects each short side;
each locking tooth comprises a short axis parallel to said short sides and which bisects each long side;
said plurality of locking teeth are arranged in a plurality of columns and a plurality of rows.

10. The fixturing apparatus of claim 9, wherein the long axes of each locking teeth disposed in a column are aligned with one another.

11. The fixturing apparatus of claim 10, wherein the short axis of each locking tooth disposed in a row are aligned with one another.

12. The fixturing apparatus of claim 10, wherein the short axis of each locking tooth disposed in a row are not aligned with one another.

13. The fixturing apparatus of claim 9, wherein the long axes of each locking teeth disposed in a column are not aligned with one another.

14. The fixturing apparatus of claim 13, wherein the short axis of each locking tooth disposed in a row are aligned with one another.

15. The fixturing apparatus of claim 13, wherein the short axis of each locking tooth disposed in a row are not aligned with one another.

* * * * *